(12) United States Patent
Purdy et al.

(10) Patent No.: US 10,221,612 B2
(45) Date of Patent: Mar. 5, 2019

(54) INFILL ELECTROCHROMIC WINDOWS

(71) Applicant: View, Inc., Milpitas, CA (US)

(72) Inventors: Daniel Loy Purdy, Benicia, CA (US); Ronald M. Parker, Olive Branch, MS (US); Trevor Frank, San Jose, CA (US); Scott Schmidt, Reno, NV (US)

(73) Assignee: View, Inc., Milpitas, CA (US)

( * ) Notice: Subject to any disclaimer, the term of this patent is extended or adjusted under 35 U.S.C. 154(b) by 0 days.

(21) Appl. No.: 15/528,071

(22) PCT Filed: Nov. 24, 2015

(86) PCT No.: PCT/US2015/062530
§ 371 (c)(1),
(2) Date: May 18, 2017

(87) PCT Pub. No.: WO2016/086062
PCT Pub. Date: Jun. 2, 2016

(65) Prior Publication Data
US 2017/0328121 A1  Nov. 16, 2017

Related U.S. Application Data

(63) Continuation-in-part of application No. PCT/US2015/014453, filed on Feb. 4, 2015.
(Continued)

(51) Int. Cl.
*E06B 3/66* (2006.01)
*E06B 9/24* (2006.01)
(Continued)

(52) U.S. Cl.
CPC .......... *E06B 3/6612* (2013.01); *E06B 3/645* (2013.01); *E06B 3/66304* (2013.01);
(Continued)

(58) Field of Classification Search
CPC .......... E06B 3/6612; E06B 7/02; E06B 3/645; E06B 9/24; E06B 3/677; E06B 3/66304;
(Continued)

(56) References Cited

U.S. PATENT DOCUMENTS 2,756,467 A * 7/1956 Etling ................... A47F 3/0434
428/34
3,971,178 A * 7/1976 Mazzoni ............... E06B 3/5418
52/172
(Continued)

FOREIGN PATENT DOCUMENTS

CN  2590732 Y  12/2003
CN  101501757 A  8/2009
(Continued)

OTHER PUBLICATIONS

U.S. Office Action dated Jan. 18, 2013 in U.S. Appl. No. 13/049,756.
(Continued)

*Primary Examiner* — Joshua K Ihezie
(74) *Attorney, Agent, or Firm* — Weaver Austin Villeneuve & Sampson LLP; Brian D. Griedel

(57) ABSTRACT

Various embodiments herein relate to methods, structures, tools, installation systems, etc. for retrofitting a new electrochromic window in a pre-existing window recess. In many cases, the new electrochromic window is installed parallel to a lite of a pre-existing window, with the resulting structure including the new electrochromic window, the pre-existing window, and a pocket that forms between them. Installation of a new electrochromic window in tandem with a pre-existing window results in many benefits including improved insulation (e.g., due to the presence of the additional air pocket(s) and lite(s)), improved climate control
(Continued)

(e.g., due to the ability to control the amount of sunlight entering the building via the electrochromic window), and enhanced aesthetics.

14 Claims, 25 Drawing Sheets

Related U.S. Application Data

(60) Provisional application No. 62/085,105, filed on Nov. 26, 2014, provisional application No. 62/182,292, filed on Jun. 19, 2015, provisional application No. 62/194,107, filed on Jul. 17, 2015, provisional application No. 61/935,771, filed on Feb. 4, 2014.

(51) Int. Cl.
*E06B 3/663* (2006.01)
*E06B 3/677* (2006.01)
*E06B 3/64* (2006.01)
*E06B 7/02* (2006.01)
*G02F 1/163* (2006.01)
*G02F 1/153* (2006.01)

(52) U.S. Cl.
CPC ............... *E06B 3/677* (2013.01); *E06B 7/02* (2013.01); *E06B 9/24* (2013.01); *G02F 1/163* (2013.01); *E06B 2007/023* (2013.01); *E06B 2007/026* (2013.01); *E06B 2009/247* (2013.01); *E06B 2009/2464* (2013.01); *G02F 1/153* (2013.01)

(58) Field of Classification Search
CPC ....... E06B 2009/2464; E06B 2009/247; E06B 2007/023; E06B 2007/026; G02F 1/163; G02F 1/153
USPC ........................ 52/1, 172, 202, 204.5; 428/34
See application file for complete search history.

(56) References Cited

U.S. PATENT DOCUMENTS

| | | | |
|---|---|---|---|
| 3,971,668 A * | 7/1976 | Pickard | ............ B32B 17/10834 |
| | | | 156/104 |
| 5,027,574 A * | 7/1991 | Phillip | ................. E06B 3/6612 |
| | | | 52/171.3 |
| 5,124,833 A | 6/1992 | Barton et al. | |
| 5,170,108 A | 12/1992 | Peterson et al. | |
| 5,204,778 A | 4/1993 | Bechtel | |
| 5,220,317 A | 6/1993 | Lynam et al. | |
| 5,290,986 A | 3/1994 | Colon et al. | |
| 5,353,148 A | 10/1994 | Eid et al. | |
| 5,365,365 A | 11/1994 | Ripoche et al. | |
| 5,379,146 A | 1/1995 | Defendini | |
| 5,384,578 A | 1/1995 | Lynam et al. | |
| 5,402,144 A | 3/1995 | Ripoche | |
| 5,451,822 A | 9/1995 | Bechtel et al. | |
| 5,598,000 A | 1/1997 | Popat | |
| 5,621,526 A | 4/1997 | Kuze | |
| 5,673,028 A | 9/1997 | Levy | |
| 5,694,144 A | 12/1997 | Lefrou et al. | |
| 5,764,402 A | 6/1998 | Thomas et al. | |
| 5,822,107 A | 10/1998 | Lefrou et al. | |
| 5,900,720 A | 5/1999 | Kallman et al. | |
| 5,956,012 A | 9/1999 | Turnbull et al. | |
| 5,973,818 A | 10/1999 | Sjursen et al. | |
| 5,973,819 A | 10/1999 | Pletcher et al. | |
| 5,978,126 A | 11/1999 | Sjursen et al. | |
| 6,002,511 A | 12/1999 | Varaprasad et al. | |
| 6,039,850 A | 3/2000 | Schulz et al. | |
| 6,055,089 A | 4/2000 | Schulz et al. | |
| 6,084,700 A | 7/2000 | Knapp et al. | |
| 6,130,448 A | 10/2000 | Bauer et al. | |
| 6,130,772 A | 10/2000 | Cava | |
| 6,222,177 B1 | 4/2001 | Bechtel et al. | |
| 6,262,831 B1 | 7/2001 | Bauer et al. | |
| 6,386,713 B1 | 5/2002 | Turnbull et al. | |
| 6,407,468 B1 | 6/2002 | LeVesque et al. | |
| 6,407,847 B1 | 6/2002 | Poll et al. | |
| 6,429,961 B1 * | 8/2002 | Harary | ............ B32B 17/10055 |
| | | | 359/265 |
| 6,449,082 B1 | 9/2002 | Agrawal et al. | |
| 6,471,360 B2 | 10/2002 | Rukavina et al. | |
| 6,493,128 B1 | 12/2002 | Agrawal et al. | |
| 6,535,126 B2 | 3/2003 | Lin et al. | |
| 6,567,708 B1 | 5/2003 | Bechtel et al. | |
| 6,614,577 B1 | 9/2003 | Yu et al. | |
| 6,795,226 B2 | 9/2004 | Agrawal et al. | |
| 6,829,511 B2 | 12/2004 | Bechtel et al. | |
| 6,856,444 B2 | 2/2005 | Ingalls et al. | |
| 6,897,936 B1 | 5/2005 | Li et al. | |
| 6,940,627 B2 | 9/2005 | Freeman et al. | |
| 6,946,171 B1 * | 9/2005 | Aggas | ................... E06B 3/6612 |
| | | | 428/34 |
| 7,085,609 B2 | 8/2006 | Bechtel et al. | |
| 7,133,181 B2 | 11/2006 | Greer | |
| 7,215,318 B2 | 5/2007 | Turnbull et al. | |
| 7,277,215 B2 | 10/2007 | Greer | |
| 7,304,787 B2 | 12/2007 | Whitesides et al. | |
| 7,417,397 B2 | 8/2008 | Berman et al. | |
| 7,542,809 B2 | 6/2009 | Bechtel et al. | |
| 7,548,833 B2 | 6/2009 | Ahmed | |
| 7,567,183 B2 | 7/2009 | Schwenke | |
| 7,610,910 B2 | 11/2009 | Ahmed | |
| 7,763,334 B2 * | 7/2010 | Berkowitz | ............ E06B 3/5418 |
| | | | 428/34 |
| 7,817,326 B1 | 10/2010 | Rennig et al. | |
| 7,822,490 B2 | 10/2010 | Bechtel et al. | |
| 7,873,490 B2 | 1/2011 | MacDonald | |
| 7,941,245 B1 | 5/2011 | Popat | |
| 7,941,982 B2 | 5/2011 | Merica | |
| 7,972,021 B2 | 7/2011 | Scherer | |
| 7,990,603 B2 | 8/2011 | Ash et al. | |
| 8,004,739 B2 | 8/2011 | Letocart | |
| 8,018,644 B2 | 9/2011 | Gustaysson et al. | |
| 8,102,586 B2 | 1/2012 | Albahri | |
| 8,213,074 B1 | 7/2012 | Shrivastava et al. | |
| 8,254,013 B2 | 8/2012 | Mehtani et al. | |
| 8,292,228 B2 | 10/2012 | Mitchell et al. | |
| 8,456,729 B2 | 6/2013 | Brown et al. | |
| 8,547,624 B2 | 10/2013 | Ash et al. | |
| 8,705,162 B2 * | 4/2014 | Brown | ................... G02F 1/1523 |
| | | | 359/275 |
| 8,723,467 B2 | 5/2014 | Berman et al. | |
| 8,800,221 B1 | 8/2014 | Header | |
| 8,836,263 B2 | 9/2014 | Berman et al. | |
| 8,864,321 B2 | 10/2014 | Mehtani et al. | |
| 8,902,486 B1 | 12/2014 | Chandrasekhar | |
| 8,976,440 B2 * | 3/2015 | Berland | .................. G02F 1/163 |
| | | | 244/129.3 |
| 9,030,725 B2 | 5/2015 | Pradhan et al. | |
| 9,081,247 B1 | 7/2015 | Pradhan et al. | |
| 9,523,902 B2 | 12/2016 | Parker | |
| 2002/0075472 A1 | 6/2002 | Holton | |
| 2002/0152298 A1 | 10/2002 | Kikta et al. | |
| 2003/0210449 A1 | 11/2003 | Ingalls et al. | |
| 2003/0210450 A1 | 11/2003 | Yu et al. | |
| 2003/0227663 A1 | 12/2003 | Agrawal et al. | |
| 2003/0227664 A1 | 12/2003 | Agrawal et al. | |
| 2004/0001056 A1 | 1/2004 | Atherton et al. | |
| 2004/0135989 A1 | 7/2004 | Klebe | |
| 2004/0160322 A1 | 8/2004 | Stilp | |
| 2005/0200934 A1 | 9/2005 | Callahan et al. | |
| 2005/0225830 A1 | 10/2005 | Huang et al. | |
| 2005/0268629 A1 | 12/2005 | Ahmed | |
| 2005/0270620 A1 | 12/2005 | Bauer et al. | |
| 2005/0278047 A1 | 12/2005 | Ahmed | |
| 2006/0018000 A1 | 1/2006 | Greer | |
| 2006/0107616 A1 | 5/2006 | Ratti et al. | |
| 2006/0170376 A1 | 8/2006 | Piepgras et al. | |

(56) References Cited

U.S. PATENT DOCUMENTS

| | | | |
|---|---|---|---|
| 2006/0179922 A1* | 8/2006 | Sacca | G01M 3/3218 73/49.2 |
| 2006/0187608 A1* | 8/2006 | Stark | C03C 27/08 361/202 |
| 2006/0209007 A1 | 9/2006 | Pyo et al. | |
| 2006/0245024 A1 | 11/2006 | Greer | |
| 2007/0002007 A1 | 1/2007 | Tam | |
| 2007/0067048 A1 | 3/2007 | Bechtel et al. | |
| 2007/0162233 A1 | 7/2007 | Schwenke | |
| 2007/0285759 A1 | 12/2007 | Ash et al. | |
| 2008/0018979 A1 | 1/2008 | Mahe et al. | |
| 2008/0092456 A1* | 4/2008 | Millett | C09K 9/02 52/1 |
| 2009/0027759 A1 | 1/2009 | Albahri | |
| 2009/0066157 A1 | 3/2009 | Tarng et al. | |
| 2009/0143141 A1 | 6/2009 | Wells et al. | |
| 2009/0243732 A1 | 10/2009 | Tarng et al. | |
| 2009/0243802 A1 | 10/2009 | Wolf et al. | |
| 2010/0039410 A1 | 2/2010 | Becker et al. | |
| 2010/0066484 A1 | 3/2010 | Hanwright et al. | |
| 2010/0082081 A1 | 4/2010 | Niessen et al. | |
| 2010/0172009 A1 | 7/2010 | Matthews | |
| 2010/0172010 A1 | 7/2010 | Gustavsson et al. | |
| 2010/0188057 A1 | 7/2010 | Tarng | |
| 2010/0193067 A1* | 8/2010 | Coignet | E06B 3/6775 141/4 |
| 2010/0208326 A1 | 8/2010 | Kwak et al. | |
| 2010/0235206 A1 | 9/2010 | Miller et al. | |
| 2010/0243427 A1 | 9/2010 | Kozlowski et al. | |
| 2010/0245972 A1 | 9/2010 | Wright | |
| 2010/0315693 A1 | 12/2010 | Lam et al. | |
| 2011/0026091 A1 | 2/2011 | Brown et al. | |
| 2011/0038030 A1 | 2/2011 | Roosendaal et al. | |
| 2011/0046810 A1 | 2/2011 | Bechtel et al. | |
| 2011/0063708 A1 | 3/2011 | Letocart | |
| 2011/0148218 A1 | 6/2011 | Rozbicki | |
| 2011/0164304 A1 | 7/2011 | Brown et al. | |
| 2011/0167617 A1 | 7/2011 | Letocart | |
| 2011/0167741 A1 | 7/2011 | Surace et al. | |
| 2011/0235152 A1 | 9/2011 | Letocart | |
| 2011/0249313 A1 | 10/2011 | Letocart | |
| 2011/0255142 A1 | 10/2011 | Ash et al. | |
| 2011/0266419 A1 | 11/2011 | Jones et al. | |
| 2011/0292488 A1 | 12/2011 | McCarthy et al. | |
| 2011/0296771 A1* | 12/2011 | Miller | E06B 3/66342 52/171.3 |
| 2011/0304898 A1 | 12/2011 | Letocart | |
| 2012/0190386 A1 | 1/2012 | Anderson | |
| 2012/0026573 A1 | 2/2012 | Collins et al. | |
| 2012/0062975 A1 | 3/2012 | Mehtani et al. | |
| 2012/0133315 A1 | 5/2012 | Berman et al. | |
| 2012/0194895 A1 | 8/2012 | Podbelski et al. | |
| 2012/0200908 A1 | 8/2012 | Bergh et al. | |
| 2012/0236386 A1 | 9/2012 | Mehtani et al. | |
| 2012/0239209 A1 | 9/2012 | Brown et al. | |
| 2012/0268803 A1 | 10/2012 | Greer | |
| 2012/0293855 A1 | 11/2012 | Shrivastava et al. | |
| 2013/0057937 A1 | 3/2013 | Berman et al. | |
| 2013/0158790 A1 | 6/2013 | McIntyre, Jr. et al. | |
| 2013/0242370 A1 | 9/2013 | Wang | |
| 2013/0263510 A1 | 10/2013 | Gassion | |
| 2013/0271812 A1 | 10/2013 | Brown et al. | |
| 2013/0271813 A1 | 10/2013 | Brown | |
| 2013/0271814 A1 | 10/2013 | Brown | |
| 2013/0271815 A1 | 10/2013 | Pradhan et al. | |
| 2013/0278989 A1 | 10/2013 | Lam et al. | |
| 2014/0067733 A1 | 3/2014 | Humann | |
| 2014/0116516 A1* | 5/2014 | Jones | F17D 5/00 137/1 |
| 2014/0160550 A1 | 6/2014 | Brown et al. | |
| 2014/0236323 A1 | 8/2014 | Brown et al. | |
| 2014/0247475 A1 | 9/2014 | Parker et al. | |
| 2014/0259931 A1 | 9/2014 | Plummer | |
| 2014/0268287 A1 | 9/2014 | Brown et al. | |
| 2014/0300945 A1 | 10/2014 | Parker | |
| 2014/0330538 A1 | 11/2014 | Conklin et al. | |
| 2014/0371931 A1 | 12/2014 | Lin et al. | |
| 2015/0002919 A1 | 1/2015 | Jack et al. | |
| 2015/0049378 A1 | 2/2015 | Shrivastava et al. | |
| 2015/0060648 A1 | 3/2015 | Brown et al. | |
| 2015/0070745 A1 | 3/2015 | Pradhan | |
| 2015/0077832 A1 | 3/2015 | Berland et al. | |
| 2015/0116811 A1 | 4/2015 | Shrivastava et al. | |
| 2015/0122474 A1 | 5/2015 | Peterson | |
| 2015/0185581 A1 | 7/2015 | Pradhan et al. | |
| 2017/0123286 A1 | 5/2017 | Parker | |
| 2017/0191304 A1* | 7/2017 | Petit | E06B 3/667 |

FOREIGN PATENT DOCUMENTS

| | | |
|---|---|---|
| CN | 101969207 A | 2/2011 |
| CN | 102203370 A | 9/2011 |
| DE | 10124673 A1 | 11/2002 |
| EP | 0445314 | 9/1991 |
| EP | 0869032 | 10/1998 |
| EP | 0835475 B1 | 9/2004 |
| EP | 1510854 A1 | 3/2005 |
| EP | 1417535 | 11/2005 |
| EP | 1619546 A2 | 1/2006 |
| EP | 0920210 | 6/2009 |
| EP | 2161615 | 3/2010 |
| EP | 2357544 | 8/2011 |
| EP | 2764998 A1 | 8/2014 |
| JP | 63-208830 | 8/1988 |
| JP | 02-132420 | 5/1990 |
| JP | 05-178645 | 7/1993 |
| JP | 10-063216 | 3/1998 |
| JP | 2004-245985 | 9/2004 |
| JP | 4694816 B2 | 6/2011 |
| JP | 4799113 B2 | 10/2011 |
| JP | 2013-057975 A | 3/2013 |
| KR | 20-0412640 | 3/2006 |
| KR | 10-752041 B1 | 8/2007 |
| KR | 10-2008-0022319 | 3/2008 |
| KR | 10-2009-0026181 | 3/2009 |
| KR | 10-0904847 B1 | 6/2009 |
| KR | 10-0931183 | 12/2009 |
| KR | 10-2010-0034361 | 4/2010 |
| KR | 10-2011-0003698 | 1/2011 |
| KR | 10-2011-0094672 | 8/2011 |
| WO | WO1998/016870 | 4/1998 |
| WO | WO02/09338 A2 | 1/2002 |
| WO | WO2002/013052 | 2/2002 |
| WO | WO2004/003649 | 1/2004 |
| WO | WO2005/098811 | 10/2005 |
| WO | WO2005/103807 | 11/2005 |
| WO | WO2007/016546 A2 | 2/2007 |
| WO | WO2007/146862 | 12/2007 |
| WO | WO2008/030018 | 3/2008 |
| WO | WO2008/147322 | 12/2008 |
| WO | WO2009/124647 | 10/2009 |
| WO | WO2010/120771 | 10/2010 |
| WO | WO2011/020478 | 2/2011 |
| WO | WO2011/087684 | 7/2011 |
| WO | WO2011/087687 | 7/2011 |
| WO | WO2011/124720 | 10/2011 |
| WO | WO2011/127015 | 10/2011 |
| WO | WO2012/079159 | 6/2012 |
| WO | WO2012/080618 | 6/2012 |
| WO | WO2012/080656 | 6/2012 |
| WO | WO2012/080657 | 6/2012 |
| WO | WO2012/145155 | 10/2012 |
| WO | WO2013/059674 | 4/2013 |
| WO | WO2013/109881 | 7/2013 |
| WO | WO2013/155467 | 10/2013 |
| WO | WO2014/121863 | 8/2014 |
| WO | WO2014/130471 | 8/2014 |
| WO | WO2014/134451 | 9/2014 |
| WO | WO2014/209812 A1 | 12/2014 |
| WO | WO2015/077097 A1 | 5/2015 |

(56) References Cited

FOREIGN PATENT DOCUMENTS

| WO | WO2016/086062 | 6/2016 |
|---|---|---|
| WO | WO2016/191406 | 12/2016 |

OTHER PUBLICATIONS

U.S. Final Office Action dated Aug. 19, 2013 in U.S. Appl. No. 13/049,756.
U.S. Office Action dated Oct. 6, 2014 in U.S. Appl. No. 13/049,756.
U.S. Final Office Action dated Jul. 2, 2015 in U.S. Appl. No. 13/049,756.
U.S. Office Action dated Oct. 6, 2014 in U.S. Appl. No. 13/968,258.
U.S. Final Office Action dated Jun. 5, 2015 U.S. Appl. No. 13/968,258.
U.S. Office Action dated Feb. 3, 2012 in U.S. Appl. No. 13/049,750.
U.S. Final Office Action dated Apr. 30, 2012 in U.S. Appl. No. 13/049,750.
U.S. Notice of Allowance dated May 8, 2012 in U.S. Appl. No. 13/049,750.
U.S. Office Action dated Sep. 23, 2013 in U.S. Appl. No. 13/479,137.
U.S. Final Office Action dated Jan. 27, 2014 in U.S. Appl. No. 13/479,137.
U.S. Office Action dated Jul. 3, 2014 in U.S. Appl. No. 13/479,137.
U.S. Final Office Action dated Feb. 26, 2015 in U.S. Appl. No. 13/479,137.
U.S. Notice of Allowance dated May 14, 2015 in U.S. Appl. No. 13/479,137.
U.S. Notice of Allowance (supplemental) dated Jun. 12, 2015 in U.S. Appl. No. 13/479,137.
U.S. Office Action dated Jan. 16, 2015 in U.S. Appl. No. 14/468,778.
U.S. Office Action dated Mar. 27, 2012 in U.S. Appl. No. 13/049,623.
U.S. Notice of Allowance dated Jul. 20, 2012 in U.S. Appl. No. 13/049,623.
U.S. Office Action dated Dec. 24, 2013 in U.S. Appl. No. 13/309,990.
Notice of Allowanced dated Jun. 17, 2014 in U.S. Appl. No. 13/309,990.
U.S. Office Action dated Nov. 27, 2015 in U.S. Appl. No. 14/352,973.
U.S. Notice of Allowance dated Aug. 12, 2016 in U.S. Appl. No. 14/352,973.
U.S. Office Action dated Oct. 11, 2013 in U.S. Appl. No. 13/449,235.
U.S. Notice of Allowance dated Jan. 10, 2014 in U.S. Appl. No. 13/449,235.
U.S. Office Action dated Feb. 24, 2015 in U.S. Appl. No. 14/163,026.
U.S. Office Action dated Nov. 29, 2013 in U.S. Appl. No. 13/449,248.
U.S. Office Action dated Nov. 29, 2013 in U.S. Appl. No. 13/449,251.
U.S. Final Office Action dated May 16, 2014 in U.S. Appl. No. 13/449,248.
U.S. Office Action dated Sep. 29, 2014 in U.S. Appl. No. 13/449,248.
U.S. Final Office Action dated May 15, 2014 in U.S. Appl. No. 13/449,251.
U.S. Office Action dated Oct. 28, 2014 in U.S. Appl. No. 13/449,251.
U.S. Office Action dated Jun. 3, 2015 in U.S. Appl. No. 13/449,251.
U.S. Office Action dated Sep. 15, 2014 in U.S. Appl. No. 13/682,618.
U.S. Notice of Allowance dated Jan. 22, 2015 in U.S. Appl. No. 13/682,618.
U.S. Notice of Allowance dated Apr. 13, 2015 in U.S. Appl. No. 14/657,380.
Letter dated Dec. 1, 2014 re Prior Art re U.S. Appl. No. 13/772,969 from Ryan D. Ricks representing MechoShade Systems, Inc.
Third-Party Submission dated Feb. 2, 2015 and Feb. 18, 2015 PTO Notice re Third-Party Submission for U.S. Appl. No. 13/772,969.
International Search Report and Written Opinion dated Sep. 26, 2012, issued in PCT/US2012/027828.
International Preliminary Report on Patentability dated Sep. 26, 2013, issued in PCT/US2012/027828.
International Search Report and Written Opinion dated Sep. 24, 2012, issued in PCT/US2012/027909.
International Preliminary Report on Patentability dated Sep. 26, 2013, issued in PCT/US2012/027909.
International Search Report and Written Opinion dated Sep. 24, 2012, issued in PCT/US2012/027742.
International Preliminary Report on Patentability dated Sep. 26, 2013, issued in PCT/US2012/027742.
International Search Report and Written Opinion dated Mar. 28, 2013 in PCT/US2012/061137.
International Preliminary Report on Patentability dated May 1, 2014 in PCT/US2012/061137.
International Search Report and Written Opinion dated Jul. 23, 2013, issued in PCT/US2013/036235.
International Preliminary Report on Patentability dated Oct. 30, 2014 issued in PCT/US2013/036235.
International Search Report and Written Opinion dated Jul. 26, 2013, issued in PCT/US2013/036456.
International Preliminary Report on Patentability dated Oct. 23, 2014 issued in PCT/US2013/036456.
International Search Report and Written Opinion dated Jul. 11, 2013, issued in PCT/US2013/034998.
International Preliminary Report on Patentability dated Oct. 30, 2014 issued in PCT/US2013/034998.
International Search Report and Written Opinion dated Dec. 26, 2013, issued in PCT/US2013/053625.
International Preliminary Report on Patentability dated Feb. 19, 2015 issued in PCT/US2013/053625.
International Search Report and Written Opinion dated May 26, 2014, issued in PCT/US2014/016974.
Communication re Third-Party Observation dated Dec. 4, 2014 and Third-Party Observation dated Dec. 3, 2014 in PCT/US2014/016974.
International Search Report and Written Opinion dated Oct. 16, 2014, issued in PCT/US2014/043514.
International Search Report and Written Opinion dated Feb. 23, 2016, issued in PCT/US2015/062530.
Chinese Office Action dated Mar. 26, 2015 in Chinese Application No. 2015032301101560.
Chinese Office Action dated Nov. 27, 2015 in Chinese Application No. 2015032301101560.
European Search Report dated Aug. 11, 2014 in EP Application No. 12757877.1.
European Search Report dated Jul. 29, 2014 in EP Application No. 12758250.0.
European Search Report dated Jul. 23, 2014 in EP Application No. 12756917.6.
European Search Report dated Mar. 5, 2015 in EP Application No. 12841714.4.
European Office Action dated Dec. 2, 2015 in EP Application No. 12841714.4.
Lim, Sunnie H.N. et al., "Modeling of optical and energy performance of tungsten-oxide-based electrochromic windows including their intermediate states," Solar Energy Materials & Solar Cells, vol. 108, Oct. 16, 2012, pp. 129-135.
"SageGlass helps Solar Decathlon—and AIA award-winning home achieve net-zero energy efficiency" in MarketWatch.com, http://www.marketwatch.com/story/sageglass-helps-solar-decathlon-and-aia-award-winning-home-achieve-net-zero-energy-efficiency-2012-06-07, Jun. 7, 2012.
"New from Pella: Windows with Smartphone-run blinds", Pella Corp., http://www.desmoinesregister.com/article/20120114/BUSINESS/301140031/0/biggame/?odyssey=nav%7Chead, Jan. 13, 2012.
"How Cleantech wants to make a 2012 comeback" http://mountainview.patch.com/articles/how-cleantech-wants-to-make-a-2012-comeback, Jan. 23, 2012.
APC by Schneider Electric, Smart-UPS 120V Product Brochure, 2013, 8 pp.
Hoosier Energy, "How do they do that? Measuring Real-Time Cloud Activity" Hoosier Energy Current Connections, undated. (http://members.questline.com/Article.aspx?articleID=18550&accountID=196000&nl=11774).
Kleissl, Jan et al., "Recent Advances in Solar Variability Modeling and Solar Forecasting at UC San Diego," Proceedings, American Solar Energy Society, 2013 Solar Conference, Apr. 16-20, 2013, Baltimore, MD.

(56) References Cited

OTHER PUBLICATIONS

Haby, Jeff, "Cloud Detection (IR v. VIS)," (undated) [http://theweatherprediction.com/habyhints2/512/].
Graham, Steve, "Clouds & Radiation," Mar. 1, 1999. [http://earthobservatory.nasa.gov/Features/Clouds/].
National Aeronautics & Space Administration, "Cloud Radar System (CRS)," (undated) [http://har.gsfc.nasa.gov/index.php?section=12].
Science and Technology Facilities Council. "Cloud Radar: Predicting the Weather More Accurately." ScienceDaily, Oct. 1, 2008. [www.sciencedaily.com/releases/2008/09/080924085200.htm].
"Remote Sensing: Clouds," Department of Atmospheric and Ocean Science, University of Maryland, (undated) [http://www.atmos.umd.edu/~pinker/remote_sensing_clouds.htm].
National Aeronautics & Space Administration, "Cloud Remote Sensing and Modeling," (undated) [http://atmospheres.gsfc.nasa.gov/climate/index.php?section=134].
Kipp & Zonen, "Solar Radiation" (undated) [http://www.kippzonen.com/Knowledge-Center/Theoretical-info/Solar-Radiation].
Duchon, Claude E. et al., "Estimating Cloud Type from Pyranometer Observations," Journal of Applied Meteorology, vol. 38, Jan. 1999, pp. 132-141.
Cardinal IG Technical Service Bulletin #IG13-05/08, "Capillary Tubes & Breather Tubes", May 2008, 2 pp.
Renovate by Berkowitz advertisement for "Glass Retrofit System", www.RbBwindow.com, 1 page [undated].
Preliminary Amendment dated Feb. 2, 2017 for U.S. Appl. No. 15/349,860.
International Preliminary Report on Patentability dated Jun. 8, 2017, in PCT/US15/62530.
U.S. Office Action dated Nov. 2, 2017 in U.S. Appl. No. 15/349,860.
European Office Action dated May 15, 2017 in EP Application No. EP 12841714.4.
U.S. Notice of Allowance dated Aug. 16, 2018 in U.S. Appl. No. 15/349,860.
Chinese Office Action dated Jul. 2, 2018 in Chinese Application No. 201710111979.3.
US Notice of Allowance dated Nov. 16, 2018 in U.S. Appl. No. 15/349,860.

* cited by examiner

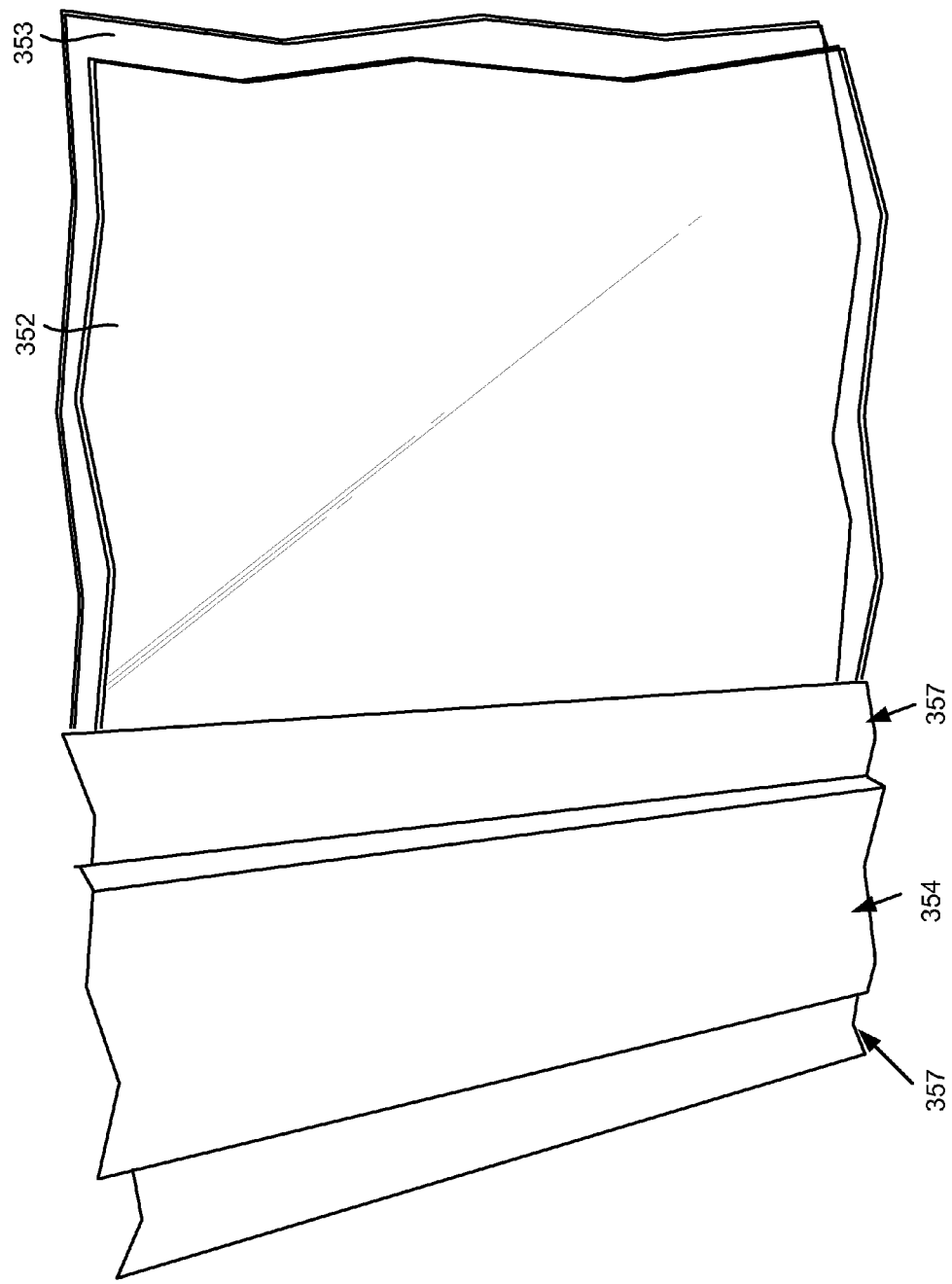

First View

Second View

First View

Second View

INFILL ELECTROCHROMIC WINDOWS

CROSS-REFERENCE TO RELATED APPLICATIONS

This is an application under 35 U.S.C. 371, which claims priority to PCT Application No. PCT/US15/62530, filed Nov. 24, 2015, and titled "COUNTER ELECTRODE FOR ELECTROCHROMIC DEVICES," which claims benefit of priority to the following U.S. Provisional Patent Applications, each of which is herein incorporated by reference in its entirety and for all purposes: Application No. 62/085,105, filed Nov. 26, 2014, and titled "INFILL ELECTROCHROMIC WINDOWS"; Application No. 62/182,292, filed Jun. 19, 2015, and titled "INFILL ELECTROCHROMIC WINDOWS"; and Application No. 62/194,107, filed Jul. 17, 2015, and titled "INFILL ELECTROCHROMIC WINDOWS." PCT Application No. PCT/US15/62530 also claims benefit of priority to P.C.T. Application No. PCT/US15/14453, filed Feb. 4, 2015, and titled "FORCED AIR SMART WINDOWS," which is herein incorporated by reference in its entirety and for all purposes.

BACKGROUND

At the highest level, this patent application presents the concept of retrofitting existing buildings with new windows such as optically switchable windows. In various embodiments, an existing building is retrofit with optically switchable window having a controller for controlling the switching of the optical state of the window.

There are a number of reasons that it may be desirable to retrofit new windows into an existing building. The new windows may provide better energy management, be more aesthetically pleasing, and/or provide additional functionality compared to the pre-existing windows. Also, retrofitting is generally more cost effective than window replacement and can be accomplished one window at a time with limited disruption to occupants of the building.

The design of windows on a building can strongly influence the amount of energy used by that building. For instance, heat loss through windows in the winter can result in substantial energy wasted keeping the building warm, and heat gain through windows in the summer can result in substantial energy being used to keep the building cool. Newer windows tend to have much better heat management performance than older windows. For instance, newer windows may have additional panes, additional coatings for blocking or reflecting certain types of radiation, an inner volume of inert gas or vacuum to reduce heat exchange, etc. These improvements, among others, make it particularly desirable to retrofit old windows.

SUMMARY

Various embodiments herein relate to electrochromic windows that can be installed proximate pre-existing windows, as well as methods, tools, and systems for such installations. The disclosed embodiments provide useful infill designs for retrofitting new electrochromic windows in a building having pre-existing windows and window recesses.

In one aspect of the disclosed embodiments, an electrochromic window is provide, the electrochromic window including a frame or other structure adapted to retrofit a window recess in a previously-constructed building. In some cases, the window recess is adapted to house a pre-existing non-electrochromic window. In many cases, the window recess retrofitted with the frame or other structure may be adapted to house both the non-electrochromic window and the electrochromic window. The window may be an IGU having at least one lite that includes an electrochromic device. In some such cases, the window has a single lite including an electrochromic device. The frame or other structure may have a shape and size configured to mate with the window recess. In some cases, an inner frame may be provided surrounding the edges of one or more lites of the electrochromic window. A controller that controls an optical state of the electrochromic window may also be provided, and in some cases the controller is located about 1 meter or less from the electrochromic window.

In some embodiments, the electrochromic window is an IGU having two lites, and further includes a controller that controls an optical state of an electrochromic device on at least one of the two lites, where the controller is located on the electrochromic window, between the lites of the electrochromic window, directly below the lites of the electrochromic window, directly to the side of the lites of the electrochromic window, between the electrochromic window and the non-electrochromic window, or in the frame or other structure. In some cases, after retrofitting with the electrochromic window, the electrochromic window is configured to open such that a region behind the electrochromic window is accessible. The electrochromic window may include an inner frame configured to mate with the frame adapted to retrofit the window recess, where a hollow pin forms a portion of a hinge and extends between the inner frame and the frame adapted to retrofit the window recess, the hollow pin housing one or more electrical connections to power bus bars of the electrochromic window. In these or other embodiments, wiring to the electrochromic window may reside within and/or passes through at least one of an inner frame surrounding the electrochromic window, the frame adapted to retrofit the window recess, and/or a spacer between the electrochromic window and a non-electrochromic window. In some cases, the window may further include a retainer, where the retainer is configured to be installed without applying force to the electrochromic window. The retainer may include at least a first portion and a second portion, the first and second portions extending substantially perpendicularly from one another, where the first portion of the retainer is configured to be positioned proximate and parallel to a lite of the electrochromic window, and the second portion of the retainer is configured to be positioned over, under, or alongside an edge of the electrochromic window, and where the second portion of the retainer is configured to engage with a fastening member attached to window framing.

In another aspect of the disclosed embodiments, an electrochromic window configured for installation in a pre-existing window recess is provided, the electrochromic window including: at least one electrochromic lite having an electrochromic device thereon; an inner frame that surrounds the periphery of the electrochromic lite; an outer frame configured to mate with the inner frame and with the pre-existing window recess; and a hinge that extends between the inner frame and the outer frame, the hinge including a hollow pin housing one or more electrical connections to power bus bars of the electrochromic window, where the hinge allows the electrochromic lite to rotate to thereby provide access to a region behind the electrochromic lite.

In some such embodiments, wiring to the electrochromic window may reside within and/or passes through at least one of an inner frame surrounding the electrochromic window, the outer frame, and/or a spacer between the electrochromic window and a non-electrochromic window.

In a further aspect of the disclosed embodiments, a method of installing a new window in a building registered with a pre-existing window is provided, the method including: providing a spacer between the pre-existing window and the new window, the spacer being provided proximate a peripheral region of the pre-existing window and the new window, where a pocket is formed between the pre-existing window and the new window and is defined at its edges by the spacer; piercing the spacer with a tube; and applying vacuum to the pocket to adhere the spacer to the pre-existing window and the new window, via a vacuum pump in fluidic communication with the tube, where gas leaving the pocket passes through a check valve after passing through the tube.

In certain embodiments, the tube is a hollow needle and the new window is an optically switchable window. The hollow needle and check valve may be provided together in a spacer piercing pressure valve, and the method may further include leaving the spacer piercing pressure valve to remain installed through the spacer during operation. In various cases, the spacer includes a separation structure that physically separates the pre-existing window from the new window, and an adhesive on the separation structure to adhere the separation structure to each of the pre-existing window and the new window.

The pocket may be maintained at a sub-atmospheric pressure for a duration sufficient to allow an adhesive on the spacer to set. In many cases, the method is completed without applying more than 20 psi of force outward on the face of the pre-existing window. Feedback may be used in some cases. For example, the method may include using feedback from at least one of a vacuum sensor and/or an optical detection mechanism to monitor and control application of vacuum to the pocket. In some embodiments, the pre-existing window and new window each include one or more lites, and the optical detection mechanism measures the deflection of one of the lites and/or a distance between the lites of the pre-existing window and the new window. In some such cases, vacuum may be applied until a pressure within the pocket is reduced to about a target pressure or until a deflection of a lite of the pre-existing window or the new window is at about a maximum deflection. The target pressure may be determined at least in part based on characteristics of the pre-existing window including at least one of an area of the pre-existing window, a thickness of the pre-existing window, and/or a material of the pre-existing window. In some cases, the target pressure is between about 50-300 Torr.

The method may further include ceasing application of vacuum and monitoring a leak up rate. In some such cases, ceasing application of vacuum and monitoring the leakup rate may be performed periodically, and vacuum may no longer be applied after the leakup rate reaches a value that is lower than a target leakup rate. In some cases, a leak up rate may be monitored using a flow meter while applying vacuum. In these or other embodiments, the method may further include installing a retainer, where the retainer is installed without applying force on the new window. The retainer may include at least a first portion and a second portion, the first and second portions extending substantially perpendicularly from one another, where during installation of the retainer, the first portion of the retainer is positioned proximate and parallel to a lite of the new window, and the second portion of the retainer is slid over, under, or alongside an edge of the new window, and where the second portion of the retainer engages with a fastening member positioned in a window frame in which the pre-existing window and new window are installed.

In a further aspect of the disclosed embodiments, a spacer piercing pressure valve for use in installing a new window registered with a pre-existing window is provided, the spacer piercing pressure valve including: a hollow needle having an inner diameter between about 0.01 and about 0.25 inches, where the hollow needle is capable of piercing a spacer that is positioned between the pre-existing window and the new window; a passage in fluidic communication with the hollow portion of the hollow needle, and a mechanism for ensuring that gas passes through the passage in at least one direction; and a vacuum port fluidically connected with the passage and the hollow portion of the hollow needle, where the vacuum port is configured to be connected with a vacuum pump via tubing.

In certain embodiments, the mechanism for ensuring that gas passes through the passage substantially in one direction is a check valve. In these or other cases, the mechanism for ensuring that gas passes through the passage substantially in one direction includes a vacuum port block that is optionally removable. The spacer piercing pressure valve may further include a pressure drop path fluidically connected between the hollow needle and an external environment, where the pressure drop path is configured to provide a pressure drop between the ends of the pressure drop path to maintain pressure equilibrium with the external environment. The pressure drop path may include at least one of (a) a capillary tube, (b) two check valves, and/or (c) a porous media. In certain embodiments, the spacer piercing pressure valve further includes a window controller including circuitry for driving an optical transition on the new window.

In another aspect of the disclosed embodiments, a system for retrofitting a new window onto a pre-existing window installed in a building is provided, the system including: a spacer piercing pressure valve including: a hollow needle having an inner diameter between about 0.01 and 0.25 inches, where the hollow needle is capable of piercing a spacer adapted to be located between the pre-existing window and the new window; a passage in fluidic communication with the hollow portion of the hollow needle, and a mechanism for ensuring that gas passes through the passage substantially in at least one direction; and a vacuum port fluidically connected with the passage and the hollow portion of the hollow needle; a vacuum pump; and tubing to connect the vacuum pump to the vacuum port of the spacer piercing pressure valve.

In some embodiments, the system further includes the spacer adapted to be located between the pre-existing window and the new window, where the spacer may be cut to an appropriate length based on the size of the pre-existing window and new window. The spacer may include a separation structure and adhesive on the separation structure, the adhesive being positioned to attach to both the pre-existing window and the new window.

In a number of embodiments, a pocket is formed between the pre-existing window and the new window during installation, the pocket being defined on its edges by the spacer, where the system further includes a controller for controlling application of vacuum to the pocket. A feedback system may also be included, and may include a vacuum regulator; and at least one of a vacuum sensor and an optical detection mechanism, the optical detection mechanism configured to measure a distance between the pre-existing window and the new window.

The system may further include an applicator for applying the spacer to either the pre-existing window or the new window. In some embodiments, the system further includes at least a second spacer piercing pressure valve and a vacuum manifold for allowing the vacuum pump to simultaneously act on two or more spacer piercing pressure valves. In certain implementations, the system further includes a feedback system including: a vacuum regulator; at least one of a vacuum sensor and an optical detection mechanism, the optical detection mechanism configured to measure a distance between the pre-existing window and the new window; and a flow meter configured to measure a flow rate while pulling vacuum to determine evacuation of moisture.

These and other features will be described below with reference to the associated drawings.

BRIEF DESCRIPTION OF THE DRAWINGS

FIG. 3A-3C illustrate a new electrochromic IGU installed proximate a pre-existing IGU according to one embodiment.

DETAILED DESCRIPTION

Figure 1:
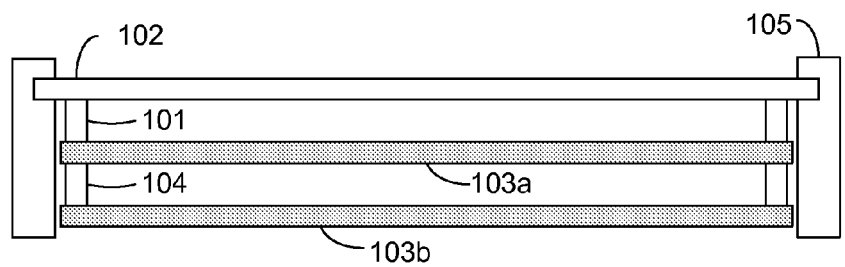
FIG. 1 illustrates a top-down view of an embodiment where a new electrochromic IGU is installed proximate a pre-existing window.

As noted above, there are a number of reasons to retrofit new windows into an existing building such as providing better energy management, being more aesthetically pleasing and providing a healthier environment for occupants by controlling the transmission of natural light into the building, and/or providing additional functionality compared to the pre-existing windows. The new windows may provide superior heat exchange performance e.g., increased R-value, keeping the building warm in the winter and cool in the summer. Additionally, where the new windows are optically switchable windows, they can provide additional functionality that was not achievable in the pre-existing windows. This additional functionality may be provided by various types of optically switchable windows, but for simplicity is described in certain examples in terms of electrochromic (EC) windows.

Certain aspects involve retrofitting existing windows from the inside of the building. Retrofitting from the inside could be desirable in, for example, historically significant buildings where changes to the exterior are to be avoided or in upper floors of a high-rise building. Retrofitting windows from the inside could also help reduce the need for certain building permits that would be required for work on the outside of a building. This also allows for uninterrupted traffic and pedestrian flow as well as enhanced safety because no cranes or other equipment are needed to remove the glass envelope on a building, but rather EC windows are brought inside the building and installed within the existing glass façade.

Electrochromism is a phenomenon in which a material exhibits a reversible electrochemically-mediated change in an optical property when placed in a different electronic state, typically by being subjected to a voltage change. The optical property is typically one or more of color, transmittance, absorbance, and reflectance. One well-known electrochromic material, for example, is tungsten oxide ($WO_3$). Tungsten oxide is a cathodic electrochromic material in which a coloration transition (transparent to blue) occurs by electrochemical reduction. Another well-known electrochromic material is nickel oxide (NiO). Nickel oxide is an anodic electrochromic material in which a coloration transition (transparent to brown) occurs by electrochemical oxidation. Tandem EC devices may include both tungsten oxide and nickel oxide as complimentary coloring layers, i.e., when one is oxidized the other is reduced, thus their colorations can be combined for a more neutral color and a deeper coloration.

Electrochromic and other optically switchable windows can be provided to a building to help control the amount of light and corresponding heat load that enters the building, which can help minimize the amount of energy spent on heating and cooling the building and in other ways improve occupants' comfort. By changing the optical state of these windows, the amount of light allowed to enter the building through the windows may be controlled. The optical state can be changed based on various factors including the current amount of light shining through the window (including factors that inherently influence the amount of light shining on the window, e.g., position of the sun, location of the window, size of the window, weather condition, etc.) as well as user preferences (e.g., a building occupant can specify that they desire the windows to be clear, tinted, or somewhere in between). Based on these heat management, aesthetic, and functional properties, electrochromic windows are particularly desirable when retrofitting pre-existing windows.

The new electrochromic window may be an electrochromic IGU having two or more lites separated by spacer(s), or it may be an electrochromic window having only a single electrochromic lite of a single substrate or multiple substrates laminated together. The new electrochromic window can be laminated to the pre-existing window or can be installed with a space between the new window and the pre-existing window. Electrochromic IGUs are further discussed and described in U.S. patent application Ser. No. 14/196,895, filed Mar. 4, 2014, and titled "SPACERS AND CONNECTORS FOR INSULATED GLASS UNITS," which is hereby incorporated by reference in its entirety. Laminated electrochromic windows are further discussed and described in PCT Patent Application No. PCT/US14/73081, filed Dec. 31, 2014, and titled "THIN-FILM DEVICES AND FABRICATION," which is hereby incorporated by reference in its entirety. While various embodiments herein are shown in the context of retrofitting a preexisting window to include an electrochromic IGU, similar embodiments utilizing laminating the preexisting window with electrochromic device lite(s) are also within the scope of the present embodiments. As used herein, the terms electrochromic window and optically switchable window are intended to include both IGU and laminate embodiments. Further, retrofitting to include other types of new windows (e.g., other optically switchable windows, windows having low emissivity (low-E) coating(s), windows having reflective coating(s), etc. are also considered to be within the scope of the present embodiments.

Regardless of the type of electrochromic window, electrical leads/wiring may be provided in order to provide electricity to electrodes (e.g., bus bars) of the device. These electrical leads may be positioned at various locations near the perimeter of the electrochromic device. The electrical leads/wiring can be designed in a number of ways. In one example, an electrical lead wraps around a portion of the perimeter of an electrochromic window to exit at a location proximate a second electrical lead (where each electrical lead provides power to one of two bus bars, for instance). The electrical lead that wraps around the perimeter may be positioned within a frame in some cases. Many other wiring options are available, some of which are explicitly shown herein.

In some implementations, power may be delivered wirelessly to a local (in some cases onboard) window controller/window. In these or other embodiments, communication signals may be delivered wirelessly to a local window controller. Some examples of wireless powered windows are discussed further below in the context of onboard controllers. Wireless power and communication may be particularly advantageous in the context of infill windows because these features greatly simplify installation by eliminating the need to run power/communication wires to each individual window. Self-powered windows may also be used in some cases. For example, the new optically switchable IGU may include a photovoltaic device to capture energy from the sun to drive transitions on the new optically switchable IGU.

Other options for self-powered windows are also available, as discussed further in U.S. Provisional Application No. 62/085,179, which is hereby incorporated by reference in its entirety. Some examples of wireless powered windows with a receiver at the window for wirelessly receiving remote power from a wireless transmitter can be found in U.S. patent application Ser. No. 12/971,576, filed Dec. 17, 2010, and titled "WIRELESS POWERED ELECTROCHROMIC DEVICES," which is hereby incorporated by reference in its entirety.

When retrofitting new windows into an existing building, a number of different considerations come into play. For example, a new window should be installed in a manner that is both safe and secure, during and after installation. Window-related construction can present safety concerns when performed in certain contexts, for example in high rise buildings/old buildings/buildings in crowded cities. In these examples, a window that breaks or pops out could fall several stories and injure people on the ground. Therefore, methods that reduce this risk during installation are advantageous. In urban settings where replacing existing windows is expensive and problematic; certain embodiments herein allow the existing windows to remain while adding additional glazing panes, e.g., IGUs or single panes, to the existing windows. This allows for retrofit upgrades to the existing windows for energy savings and occupant comfort, without costly and problematic removal of existing windows. Some of the embodiments herein provide methods and hardware for retrofitting in a way that minimize installation risks. For instance, certain methods are disclosed which can be used to install a new window onto a pre-existing window, where the method regulates the amount of force pressing outward or vacuum pulling inward on the pre-existing window and/or the associated deflection of the window. For example, certain installation methods install a new window either without pressing outwards on the pre-existing window, or without pressing outwards on the pre-existing window at more than a particular level of force. These methods may take into account certain characteristics about the new and pre-existing windows to minimize the risk of breaking or popping out the pre-existing window. The disclosed hardware may be used to practice the methods described herein.

Another consideration when retrofitting new windows into an existing building is the hermeticity achieved during installation. In certain embodiments (particularly certain non-custodial designs, as described further below), it is beneficial to achieve a high quality hermetic seal between the new window and the pre-existing window structure. Such seals can reduce the likelihood that moisture becomes trapped between a new window and a pre-existing window. In other embodiments, the air pocket formed between existing windows and the EC windows installed is vented, e.g., using fans or other air circulation means. In such embodiments, the warm air within the pocket can be used to heat the interior of the building or be vented away e.g., in warmer climates.

A further factor to take into account when retrofitting a building to include new optically switchable windows is the additional heat load resulting from the new windows. For instance, electrochromic and other optically switchable windows typically include a layer or layers thereon that can absorb radiation and become warm. This heat can become trapped between the pre-existing window and the new optically switchable window, which may be undesirable. Certain methods and designs herein address these heat gain considerations, for example, by providing a mechanism for achieving heat exchange to actively or passively cool the space between the pre-existing window and the new window. In another example, certain methods and designs relieve the internal pressure that may arise from a change in the temperature of the gas between the preexisting window and the new optically switchable window. For example, a capillary tube or a pressure relief valve can be used to relieve the internal pressure. Some examples of pressure relief valves include a check valve, a duck bill valve, and other types of one-way passive or active valves. In certain implementations that use one-way pressure relief valves, two one-way values may be implemented in opposing directions to enable two-way pressure relief. In some cases, a two-way valve can be used.

I. Types of Retrofitting: Infill and Replacement

There are two basic types of retrofitting. In the first type, the pre-existing window is kept in place and a new window is positioned adjacent the pre-existing window. In many cases the new window is positioned on the interior side of the pre-existing window such that the pre-existing window faces the outside environment and the new window faces the inside of the building. This setup provides advantages in terms of ease of installation, particularly in multi-story buildings, and especially in densely populated urban settings where replacement of exterior facades and glazings can be very costly and problematic, e.g., disrupting the flow of traffic, slowing commerce, and providing safety measures for people on the street below. In certain embodiments, however, a new window can also be installed on the exterior side of the pre-existing window.

II. Types of infill: Custodial Access and Non-Custodial Access

With the infill type of retrofit, there are effectively two types: (A) non-custodial access, and (B) custodial access. With custodial access, the new/infill optically switchable window can temporarily move away from the pre-existing window to permit access to the region between the pre-existing window and the new window. This movement allows a custodian to clean or otherwise service a window or the region between the windows. Further, the movement may allow a controller for a new optically switchable window to be serviced more easily. By contrast, in the non-custodial access type of retrofit, an optically switchable window is installed in a more or less stationary position with respect to the existing window or window space. Though stationary, non-custodial access type retrofits can typically be removed, e.g., to use as a demonstration of the EC glass and where removal leaves the pre-existing window and framing substantially as it was prior to the infill.

A. Non-Custodial Infill Designs

As mentioned, in non-custodial infill designs, new windows are installed to be relatively stationary. In other words, the new window does not readily open up to expose the pre-existing window.

(i) Framing Considerations

The new window should be installed in an aesthetically pleasing manner that securely supports the new window. In some cases, the new window comes with a frame that houses the perimeter of the lite or lites. This frame immediately surrounding the new electrochromic window is referred to as an inner frame. In other cases, this inner frame may be omitted. An outer frame (also sometimes referred to herein as an infill frame) may be provided to interface with a pre-existing window or window space. The infill (outer) frame may interface with the inner frame in some cases. In other cases where the inner frame is omitted, the infill frame may interface directly with the new electrochromic window.

In one embodiment of a non-custodial design, the optically switchable window may be provided in its native state without any kind of additional framing or containment around its perimeter or elsewhere. An adhesive may be applied to a surface of a new electrochromic window (e.g., near the periphery of a lite) to directly join the new electrochromic window to a pre-existing window or window frame. Generally, this adhesive is used in combination with a sealing spacer, e.g., a foam spacer (though other materials may also be used). The existing window is cleaned, the sealing spacer is applied to the EC window, and then the assembly (EC window, adhesive, and spacer) is adhered to the existing window using the adhesive sealant on the sealing spacer. Similarly, the sealing spacer can be applied to the existing window, and the EC window can be added after the sealing spacer is applied to the existing window. The new window may be positioned to face the interior of the building and the pre-existing window may be positioned to face the exterior of the building. In another embodiment, the position of the new window and the pre-existing window are swapped, the new window being provided on the exterior of the building. In various embodiments, the new window may be closely matched (in terms of size) to the pre-existing window. If there is a mismatch in size between the two windows, additional framing or other structural components may be provided to hide the mismatch. In certain embodiments, existing framing is used to support the exterior-mounted EC windows. While many embodiments are discussed herein with respect to a window frame located at the interface between the exterior and interior of a building, it would be understood that these embodiments would also apply to a window frame located between interior spaces within the building.

In a similar embodiment, a new electrochromic window is provided with a small inner frame. The inner frame covers the edges of the lite(s) of the electrochromic window. Adhesive may be applied to the inner frame, which may be adhered to the pre-existing window and/or window frame.

In another similar embodiment shown in FIG. 1, a spacer 101 is provided between a new electrochromic window and a pre-existing window. The pre-existing window, e.g., includes a single lite 102, while the new electrochromic window includes two lites 103a and 103b separated by an IGU spacer 104. Thus, in this example, the EC window has the form factor of a conventional double pane IGU, although it could be a laminate, for example. The pre-existing window and the new electrochromic window are installed in a frame 105. The frame 105 originally held only the pre-existing window. Spacer 101 may be similar or identical to the spacer 104 used to separate panes 103a and 103b in the new electrochromic IGU. The spacer 101 may also be referred to as an infill spacer. As used herein, the terms "pane" and "lite" are interchangeable. The spacer 101 (and/or 104) may be foam, metal, plastic, etc. The spacer 101 may be situated wholly or partially between the lite 103a of the new electrochromic window and the lite 102 of the pre-existing window. The spacer 101 may be attached to each of the new window and the pre-existing window by adhesives and/or sealants (not shown). The adhesives/sealants may be the same as those used to fabricate an IGU, though there may be greater flexibility in the available materials since in many embodiments this seal does not need to retain argon or other inert gas often present between lites 103a and 103b of an IGU (though in one embodiment an inert gas is used in the newly formed volume between the EC window and the pre-existing window). This may, in effect, create a multi-lite IGU including lites 102, 103a, and 103b from both the new electrochromic window and the pre-existing window. For instance, where the pre-existing window includes a single lite 102 and the new electrochromic window includes two lites 103*a* and 103*b* separated by a spacer 104 (as shown in FIG. 1), the resulting multi-lite IGU would include, in order: a pre-existing window lite 102, spacer 104 (separating the pre-existing window lite 102 from the new electrochromic IGU), a first lite 103*a* of the new electrochromic IGU, an additional spacer 104 (separating the two lites 103*a* and 103*b* of the new electrochromic IGU), and a second lite 103*b* of the new electrochromic IGU. The pre-existing window and new electrochromic window can have any number of lites. The new electrochromic window often has one or two panes, though additional panes may be provided in certain embodiments, and panes of the EC window may themselves be laminates.

In a further embodiment, an (outer) infill frame is used to support the new electrochromic window (which may or may not have an inner frame). The infill frame may be shaped and sized to fit into an available window frame or window space. In some cases the infill frame abuts one or more mullions and/or transoms between pre-existing windows, for example where several windows are provided next to one another. The infill frame may be provided as a single piece or as multiple pieces.

The various features described in the embodiments (e.g., inner frame, infill frame, spacer, adhesive, relative position of the windows, etc.) may be combined as desired for a particular application (including both custodial and non-custodial infill designs, and replacement designs where applicable). In any embodiment, glazing blocks (also referred to as setting blocks) may be provided to help support a new electrochromic window. Setting blocks also help prevent windows from breaking or popping out during earthquakes by helping accommodate a degree of movement/deformation of the building with respect to the windows by, for example, isolating the windows from the surrounding movement/deformation of the building. Such blocks are often rubber, though other durable and deformable materials may be used. The blocks may be provided on the bottom of the window, the sides of the window, and the top of the window. Often, two or more blocks are provided for every side of the window where the blocks are present.

Figure 2:
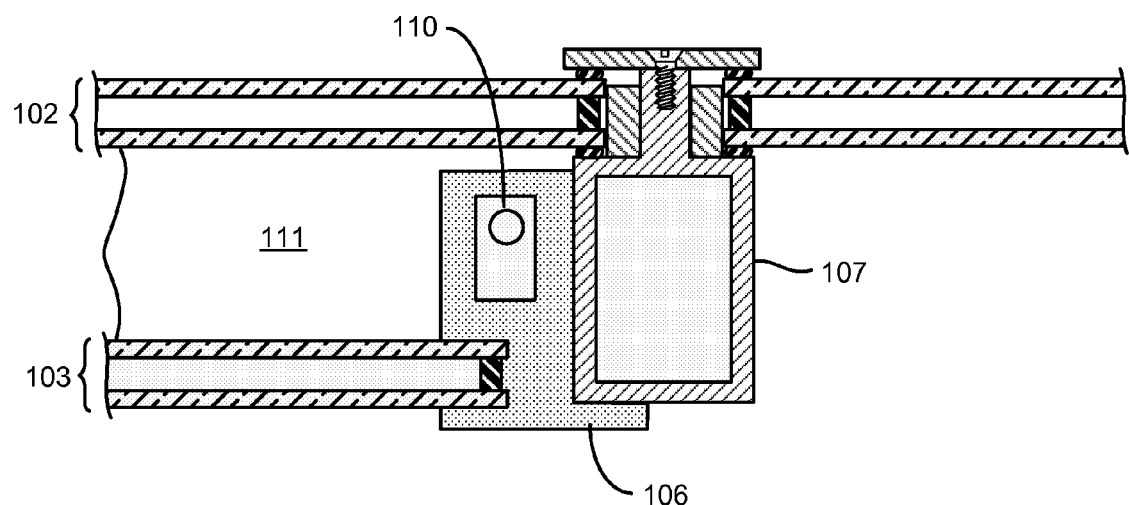
FIG. 2 depicts an embodiment of a new electrochromic IGU installed proximate a pre-existing IGU.

FIG. 2 depicts an embodiment where a new electrochromic IGU 103 is installed adjacent a pre-existing IGU 102. This figure shows a non-custodial design in which the new electrochromic IGU 103 is mounted to be stationary. The figure shows a portion of a cross-sectional view at a horizontal plane of the installation. In order to support the new electrochromic IGU 103 (also referred to as the infill IGU), an infill frame 106 is provided. The infill frame 106 rests against a mullion 107 that separates adjacent pre-existing IGUs 102, for example, along vertical sides. Likewise, proximate the top and bottom of the windows, the infill frame 106 may rest against a transom (not shown).

The infill frame 106 wraps around a corner of the mullion 107 to help provide an aesthetically pleasing frame transition for the new window. In this embodiment, a local window controller 110 is positioned inside the infill frame 106. Locally positioned controllers are discussed further below.

The infill frame 106 supports the new infill IGU 103. Between the new infill IGU 103 and the pre-existing IGU 102, a separation space is created, often referred to herein as a pocket, in this example pocket 111. Much like the space between lites of an IGU, pocket 111 between the IGUs advantageously reduces heat transfer through the windows.

In certain embodiments, e.g., when the new IGU includes and absorptive coating, e.g., an electrochromic coating, the pane with the coating may be adjacent to the pocket (is a surface that helps form the pocket). This pane may get warm as solar radiation is absorbed, thus the volume of the pocket may get warm. This may provide a thermal barrier to heat loss from the interior of the building. Though infill applications are known, embodiments herein provide certain advantages over conventional infill applications where absorptive coatings are not used. In particular, when variably tintable absorptive coatings, e.g., electrochromic windows, are used, the thermal barrier characteristics of the infill pocket can be actively controlled and managed.

Figure 3A:
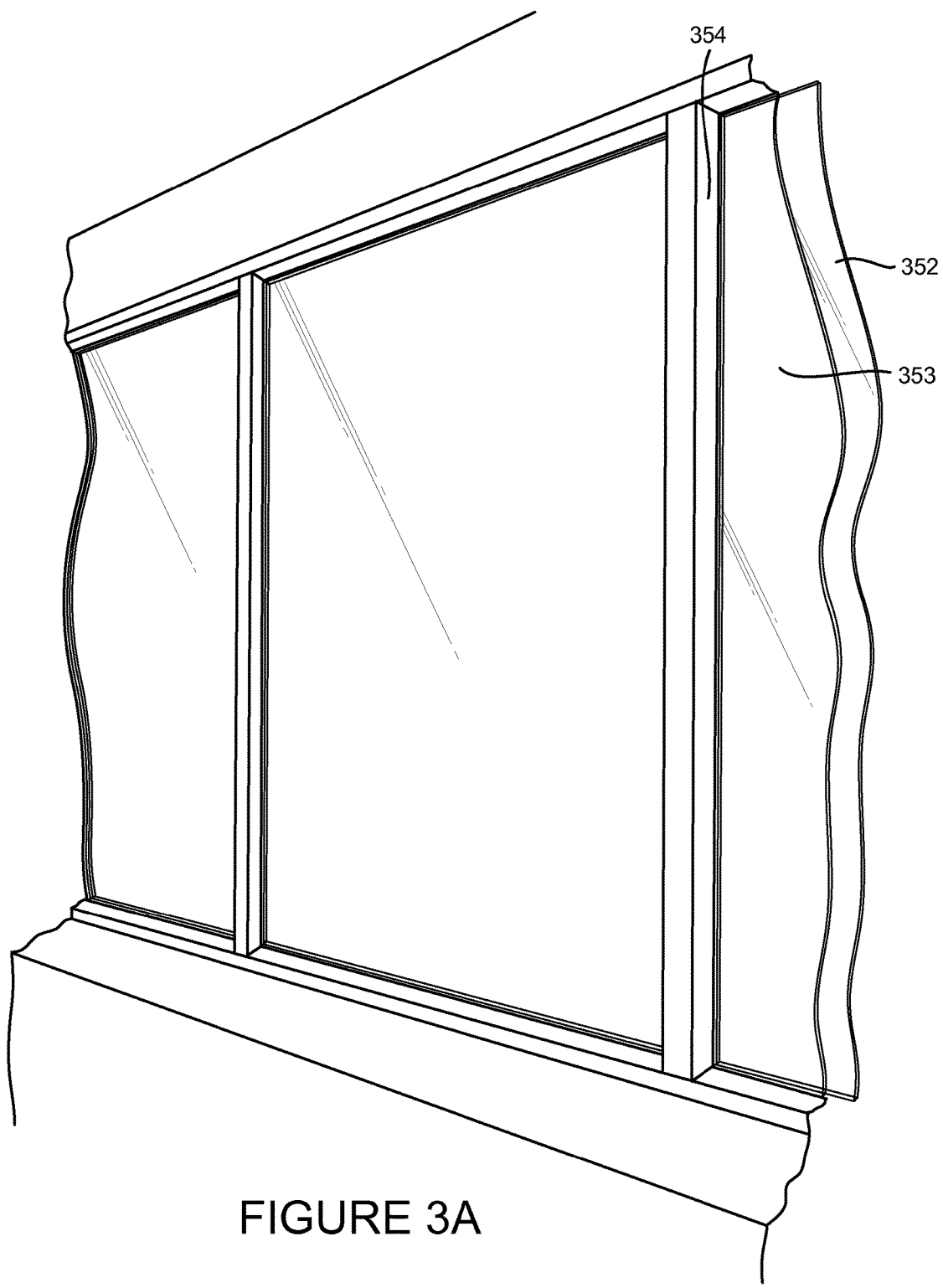
Figure 3B:
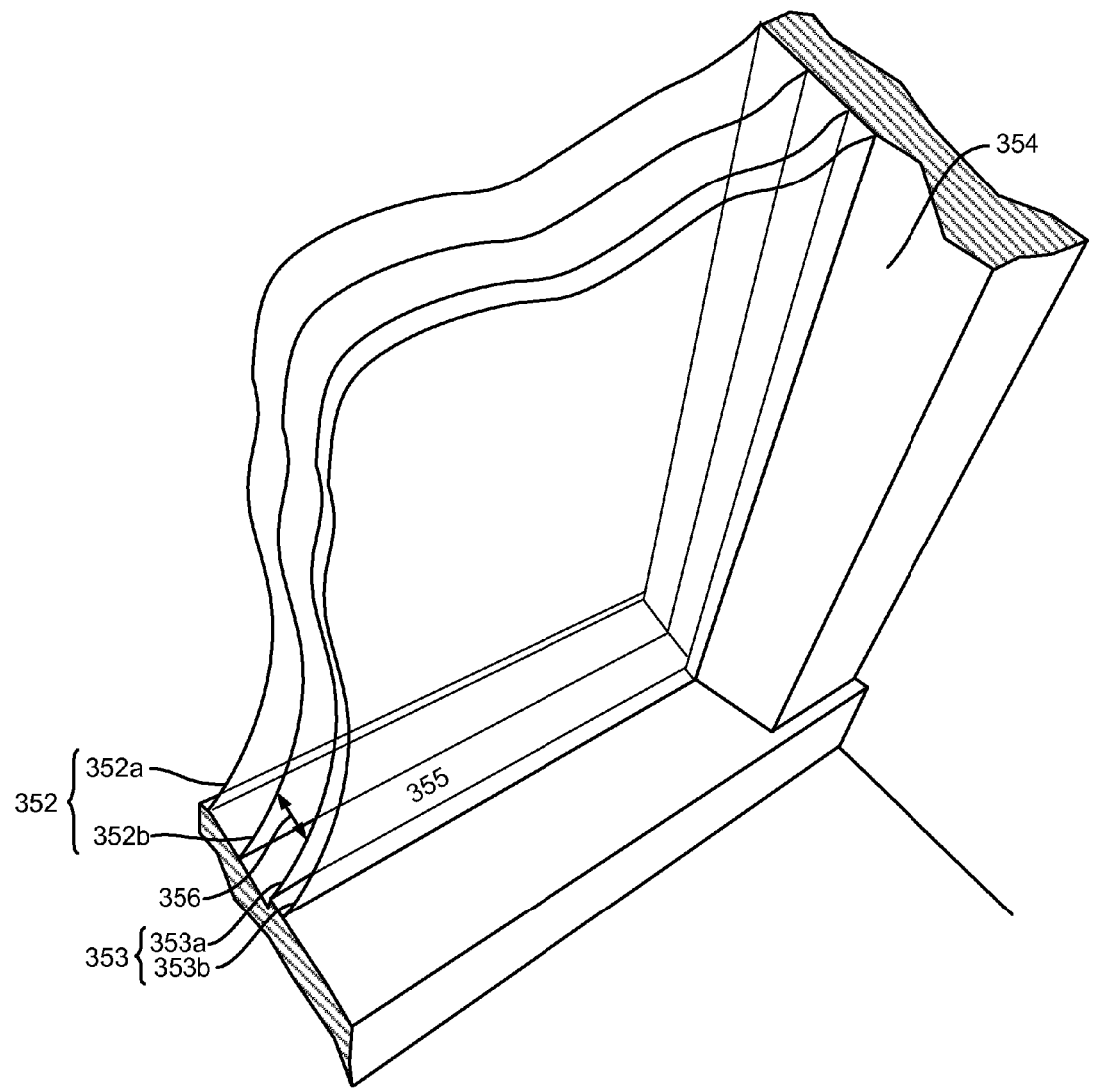

FIGS. 3A-3C show depictions of a non-custodial infill installation where new electrochromic IGUs 353 are installed over several pre-existing windows 352. The new electrochromic IGUs 353 are positioned interior of the pre-existing windows 352. FIG. 3A shows the windows as they appear to occupants in the building. From this view, it is difficult for occupants to see that the extra set of windows has been installed, which shows that these new electrochromic windows have been installed in an aesthetically pleasing manner over the old windows. A frame 354 provided proximate the edge of the new electrochromic IGUs 353 helps to establish a clean look. In alternative embodiments, framing is not needed, but rather only flashing material is applied around the perimeter of the infill IGU. In certain embodiments, the flashing material is substantially color- and texture-matched to the pre-existing framing that supports the pre-existing windows. In this way, is it difficult for occupants to see that infill windows are installed over the pre-existing windows. The flashing is typically between about 0.5 inches and about 2 inches wide, or between about 1 inch wide and 1.5 inches wide, so as to minimize loss of viewable area but still obscure the setting blocks, edge of the infill IGU and any EC controller that may be present proximate the periphery of the new electrochromic IGU 353, e.g., placed between the edge of the IGU and the framing, in the space where setting blocks reside.

FIG. 3B shows a view looking down into the region between the new electrochromic window and the pre-existing window. The new electrochromic window includes two lites 353*a* and 353*b*. The pre-existing window likewise has two lites 352*a* and 352*b*. A covering 355 is positioned between the new electrochromic window and the pre-existing window. This covering 355 can be used to hide the separation space/pocket 356 between the new electrochromic window and the pre-existing window, as well as any components that are positioned within this pocket 356 (e.g., a controller, setting blocks, wiring, etc.). The covering 355 may also help mask or obscure the frame of the pre-existing windows. The covering may be present on one, several, or all sides of the window. A frame 354 is provided proximate the edge of the new electrochromic window.

FIG. 3C shows that in this embodiment, an inner flashing material 357 that is applied to and that surrounds the new electrochromic IGU 353 extends inward about 1 inch from an infill frame/new mullion 354. This flashing material 357 is chosen to generally match the existing framing for aesthetic reasons. In this example, the flashing material 357 is aluminum, e.g., painted or anodized, with an adhesive backing. After the new IGUs 353 are installed, e.g., positioned on setting blocks and affixed to the existing window 352, the flashing 357 is added to hide the spacers of the IGUs, setting blocks, and perimeters of the new IGUs 353. Generally, it is desirable to minimize the amount of viewable area through the window that is lost when retrofitting the new windows. In this example the flashing extends minimally past the IGU spacer and primary seal (not shown), so as to maximize viewable area (though smaller than the viewable area of the pre-existing window 352).

In conventional infill applications, in order to affix the new IGU to the pre-existing window, a spacer is adhesively applied to the new IGU, and additional adhesive is applied to the spacer on the side that will mate with the pre-existing window. Then the new IGU is pressed against the existing window. This pressing against the existing window may be problematic in certain instances, e.g., the existing window may be in a high rise building. In this setting, it may be dangerous to press outwardly on a window that is high above the street. The window may lose its seal or otherwise break if the force is applied unevenly. Further, the window could develop a stress crack and fail catastrophically. The inventors have developed methods of infill installation which do not require outward force on existing windows, nor outward force on the infill window to keep it in place.

One method for installing a new window onto a pre-existing window involves the use of a vacuum pump to introduce vacuum between the new and pre-existing window to apply force to the adhesive between the spacer and glass surfaces to seal the windows together. Because this method can be completed without pressing outward on the pre-existing window (or in some cases only pressing outward on the pre-existing glass with a limited amount of force, e.g., to set the new IGU spacer into contact with the existing window), it reduces the risk of breaking or popping out either of the windows. Therefore, this method can provide a safer alternative to conventional methods of retrofitting windows, particularly in high risk environments such as high rises in crowded cities. This method is also advantageous because it can be used to effectively remove moisture from the pocket between the pre-existing window and the new window, and results in a hermetic seal such that moisture does not enter this region. In some cases the methods may be automated.

Figure 4A:
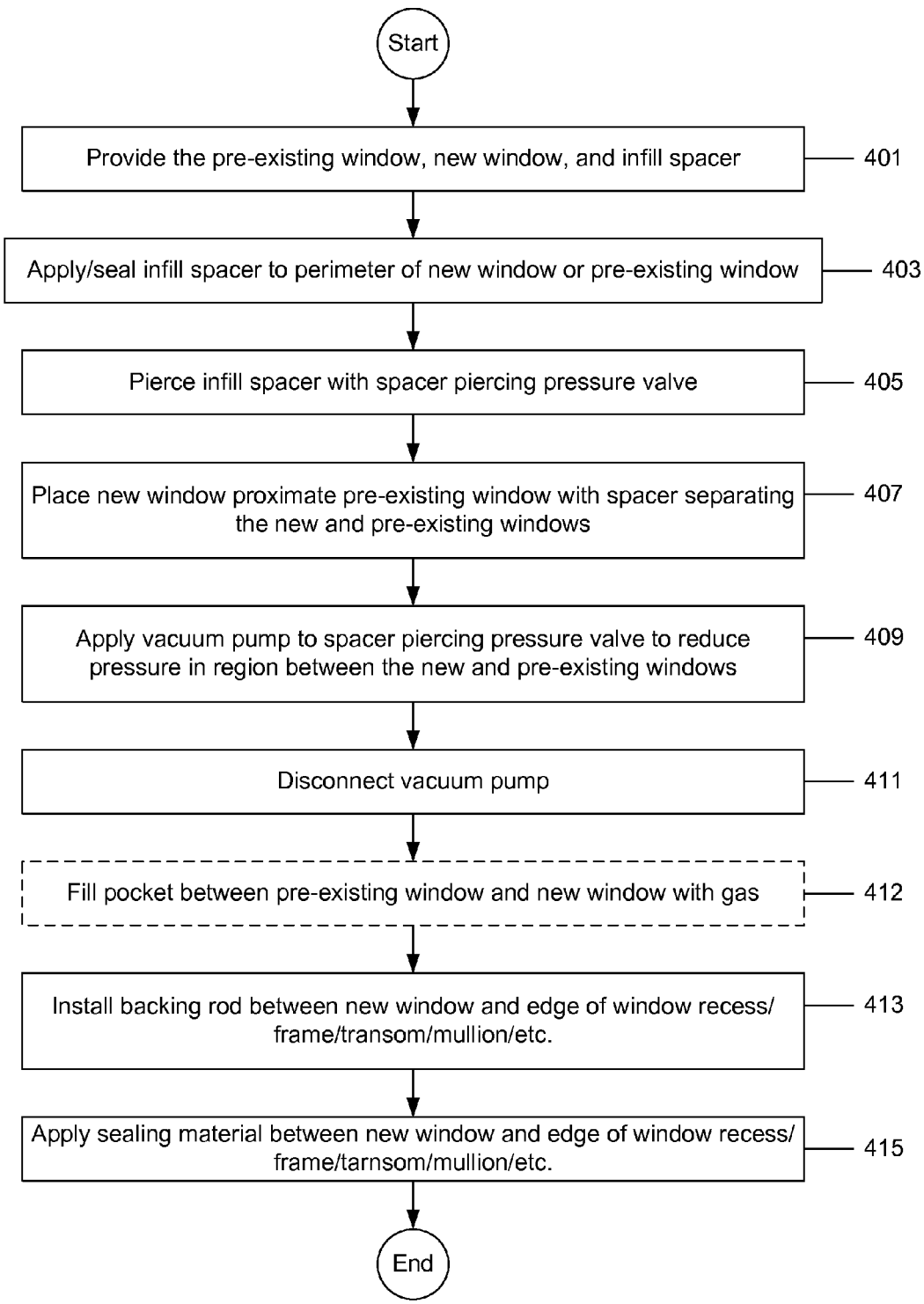
FIG. 4A is a flowchart describing a method of installing a new electrochromic window proximate a pre-existing window using a spacer piercing pressure valve.

FIG. 4A presents a flow chart for a method of installing a new window onto a pre-existing window in a non-custodial embodiment using a vacuum pump to seal the windows together. The method is explained with reference to the structures shown in FIGS. 4B-4D and 5A-5F. The new window may be an optically switchable window, or it may be a more conventional window that is not optically switchable. In some such cases the new window may include a coating (e.g., an electrochromic device or other optically switchable device in many cases) that imparts a favorable optical quality/characteristic to the window.

Figure 4B:
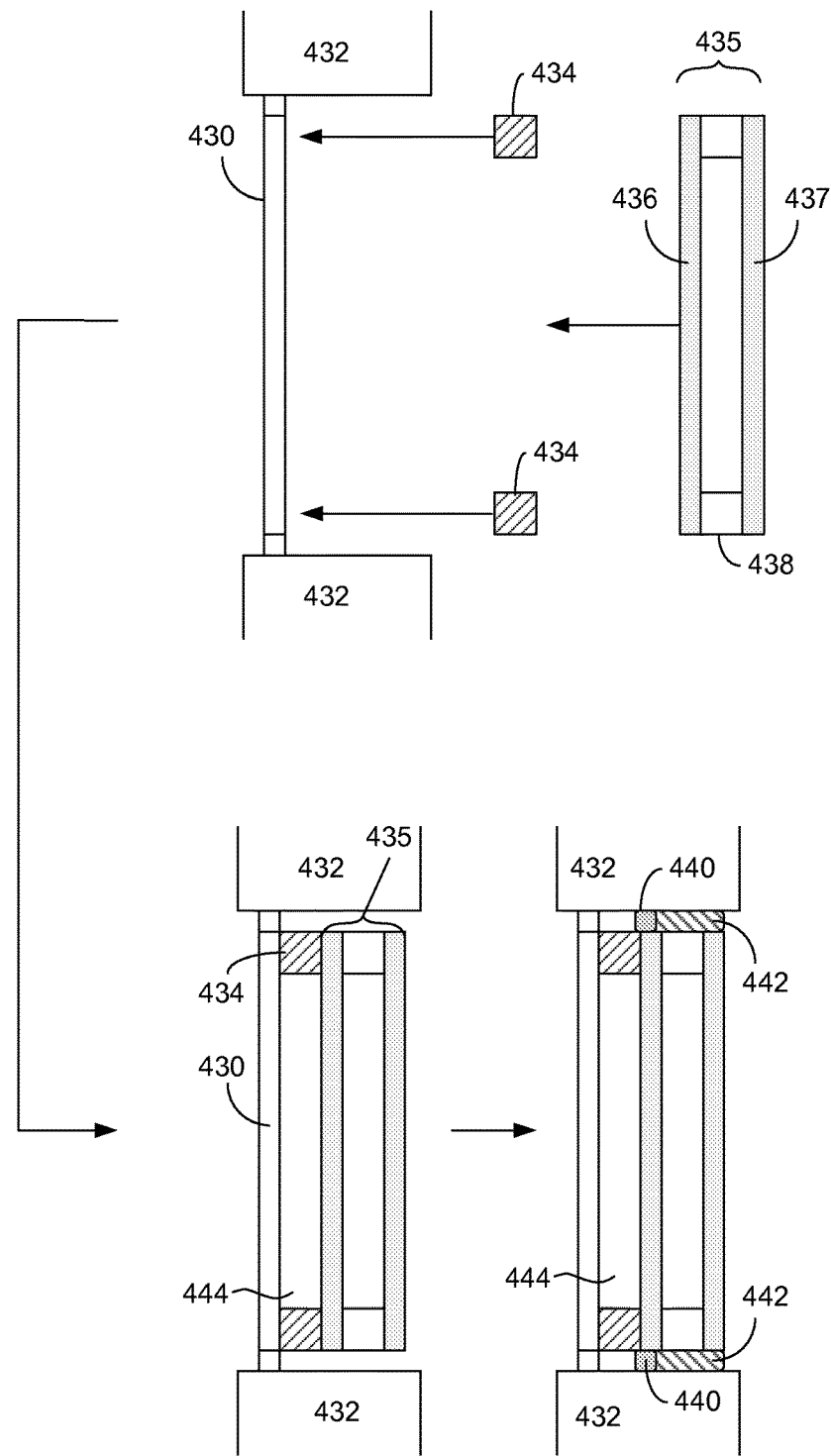
FIG. 4B illustrates cross-sectional views of an electrochromic window being installed proximate a pre-existing window according to the method of FIG. 4B.

The method begins at operation 401, where a pre-existing window 430 is provided, along with a new window 435 and an infill spacer 434. The pre-existing window 430 is installed in a window recess 432, which may be defined by a number of different surfaces including, in some examples, walls, floors, ceilings, window frames, sills, mullions, transoms, etc. The pre-existing window 430, new window 435, and infill spacer 434 are shown in FIG. 4B. The new window 435 in this example includes a first pane 436 and a second pane 437 separated by an IGU spacer 438. Where a new window is provided as an IGU, it may be on the order of about 1 inch thick in some embodiments (including both panes and the infill spacer). As noted, the new window may include only a single pane in some embodiments. Where the new window is provided as a single pane, it may on the order of about ⅜ inches thick.

Figure 4C:
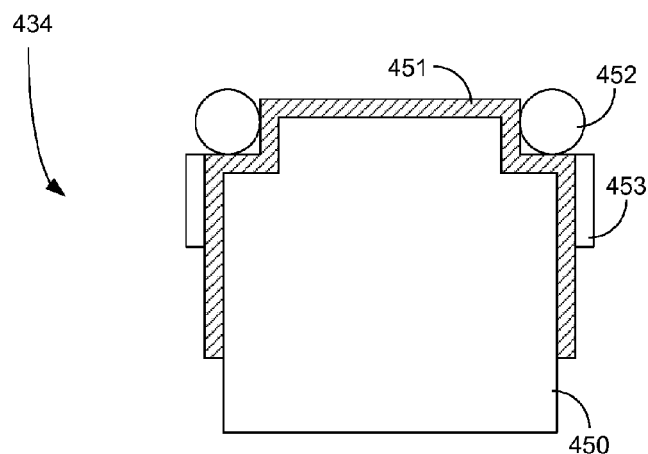
FIG. 4C shows a spacer that may be used in various embodiments.

One example of an infill spacer 434 is shown in more detail in FIG. 4C. This figure presents a cross-sectional view of the infill spacer 434. At a minimum, an infill spacer 434 includes a separation structure 450 that can be used to maintain a gap/pocket between the pre-existing window and the new window. The infill spacer functions in a similar manner as a conventional spacer commonly used in IGUs. In an IGU, a spacer is used to separate the panes from one another. In an infill design, an infill spacer is used to separate a pane of the pre-existing window from a pane of the new window. In each case, a pocket is created, defined on its faces by the panes and on its edges by the spacer. Spacers are further described with reference to FIG. 4D, below, which illustrates a process for fabricating an IGU. In some cases the infill spacer 434 includes further materials, which may already be applied on the separation structure 450 when provided to the new or pre-existing window. For example, the infill spacer 434 may include tape 451 such as Mylar tape, polyisobutylene (PIB) or other sealant 452, and an additional adhesive 453. These components may help provide a moisture-tight seal when the infill spacer 434 is installed.

While in some cases the infill spacer 434 comes as shown in FIG. 4C, in some other embodiments the method may include applying one or more of the tape 451, PIB sealant 452, and/or additional adhesive 453 onto the separation structure 450. The separation structure 450 may be made of a variety of materials including, for example, foam, plastic, metal, rubber, etc. The infill spacer 434 is typically provided as a long flexible strip. The length of the strip will correspond with the perimeter of the windows. The width of the strip is relatively small, for example between about 0.25-1 inch. In one example the infill spacer 434 has a width of about ⅜ inches. The depth of the infill spacer 434 and the new window 435 determines the minimum depth of the window recess into which the new window can be securely installed. In some examples, this minimum depth (distance between the inside-most pane of the pre-existing window and the inside-most edge of the window recess) may be about 1 and ⅜ inches (for a 1 inch thick IGU and ⅜ inch thick infill spacer). In some other examples, this minimum depth may be about ⅝ inches (for a ⅜ inch thick single pane new window and a ⅜ inch thick infill spacer). In one example, an infill spacer is a silicone foam spacer with embedded desiccant, a moisture barrier (e.g., Mylar) tape, a pre-applied adhesive on opposite sides of the spacer to attach the spacer to each lite, and a pre-applied PIB bead to make the primary seal between the spacer and each lite. An example of such a silicone foam spacer is the Triseal™ spacer made by Quanex Building Products of Houston Texas.

Figure 4D:
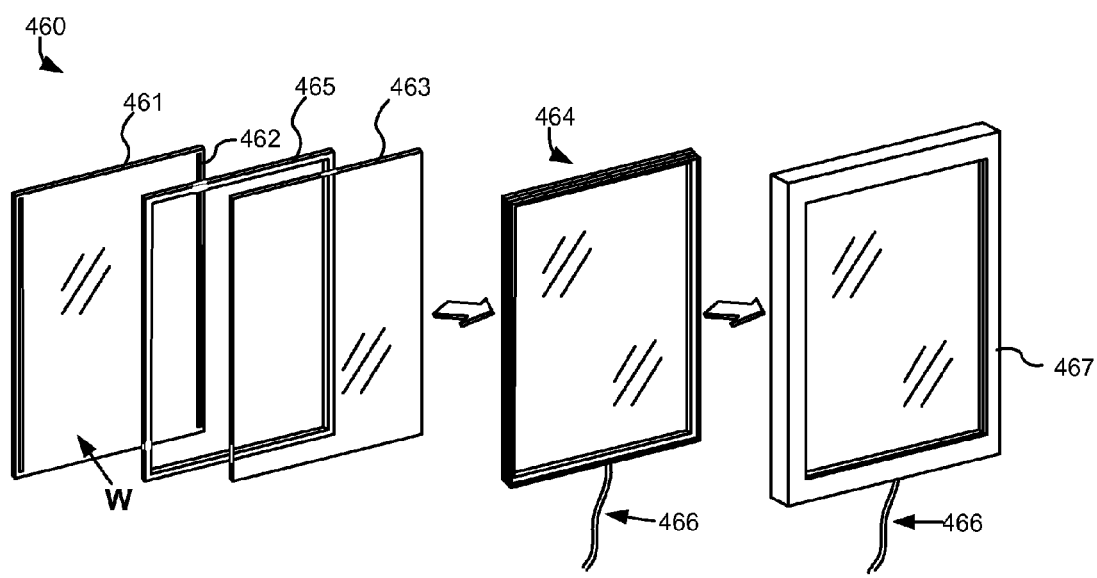
FIG. 4D depicts various parts of an electrochromic IGU.

For further context, FIG. 4D depicts an example of an electrochromic window fabrication process, 300. This figure is provided to illustrate how a spacer can be used to separate panes of glass from one another. Such spacers may be present within an IGU in a pre-existing window and/or a new window. Similarly, infill spacers may be placed between a pre-existing window and a new window as described in relation to the method of FIG. 4A. With reference to FIG. 4D, in electrochromic window fabrication process 460 an electrochromic lite, 461, having an electrochromic device (not shown, but for example on surface W) and bus bars, 462, which deliver power to the electrochromic device, is matched with another glass lite, 463. During fabrication of an IGU, 464, a spacer, 465 (sometimes referred to herein as an IGU spacer), is sandwiched in between and registered with substrates/lites 461 and 463. IGU 464 has an associated interior space defined by the faces of the windows/lites in contact with spacer 465 and the interior surfaces of the spacer 465. Spacer 465 is typically a sealing spacer, that is, it includes a spacer and sealing material between the spacer and each substrate where they adjoin in order to hermetically seal the interior region and thus protect the interior region from moisture and the like. Once the glass lites 461 and 463 are sealed to the spacer 465 via a primary seal between the spacer and each lite, secondary sealing material may be applied around the perimeter edges of the IGU in order to impart not only further sealing from the ambient, but also further structural rigidity to the IGU. IGU 464 may be wired to a power supply and/or controller via wires, such as wires, 466. As noted elsewhere herein, the IGU may also include components for receiving power and/or communication wirelessly. In some cases the IGU may be supported by a frame, 467. The IGU 464 may be separately connected to a controller (not shown) in some cases, while in other cases the controller may be provided onboard the IGU 464. The controller may also be connected to one or more sensors in the window or frame 467. In a number of embodiments herein, the frame 467 may be omitted or modified as appropriate such that the IGU can mate with a pre-existing window recess.

Returning to FIG. 4A, the method continues at operation 403, where the infill spacer 434 is applied proximate the perimeter of the new window 435 or pre-existing window 430. It may be advantageous to apply the infill spacer 434 to the perimeter of the new window 435 (rather than the pre-existing window 430) to minimize/avoid applying pressure outwards on the old window 430. The infill spacer 434 may be applied such that the PIB sealant 452 and additional adhesive 453 on each side of the separation structure 450 will come into contact with a pane in either the pre-existing window 430 or new window 435. The infill spacer 434 may be cut to an appropriate length such that it extends along all the edges of the window to which it is attached. Where the infill spacer meets itself (sometimes at a corner), Mylar tape or another kind of gas-tight tape or seal may be used to seal the ends of the infill spacer 434 together. With respect to FIG. 4B, a cross-section of the infill spacer 434 is shown as two squares. It should be understood that the infill spacer extends into and out of the page at this cross-section, and that it is positioned proximate the entire perimeter of the window to which it is attached.

In some cases, the infill spacer 434 may be applied to either the new window 435 or the pre-existing window 430 using a specialized spacer application tool that simultaneously heats/activates the seal/adhesive materials and positions the infill spacer 434 at an appropriate position with respect to the perimeter of the window to which it is applied. For instance, the spacer application tool may maintain a distance between about 0.1-1 inches between the edge of the infill spacer and the edge of the pane to which it is applied. In some cases this distance is about ¼ or ½ inch.

Figure 5A:
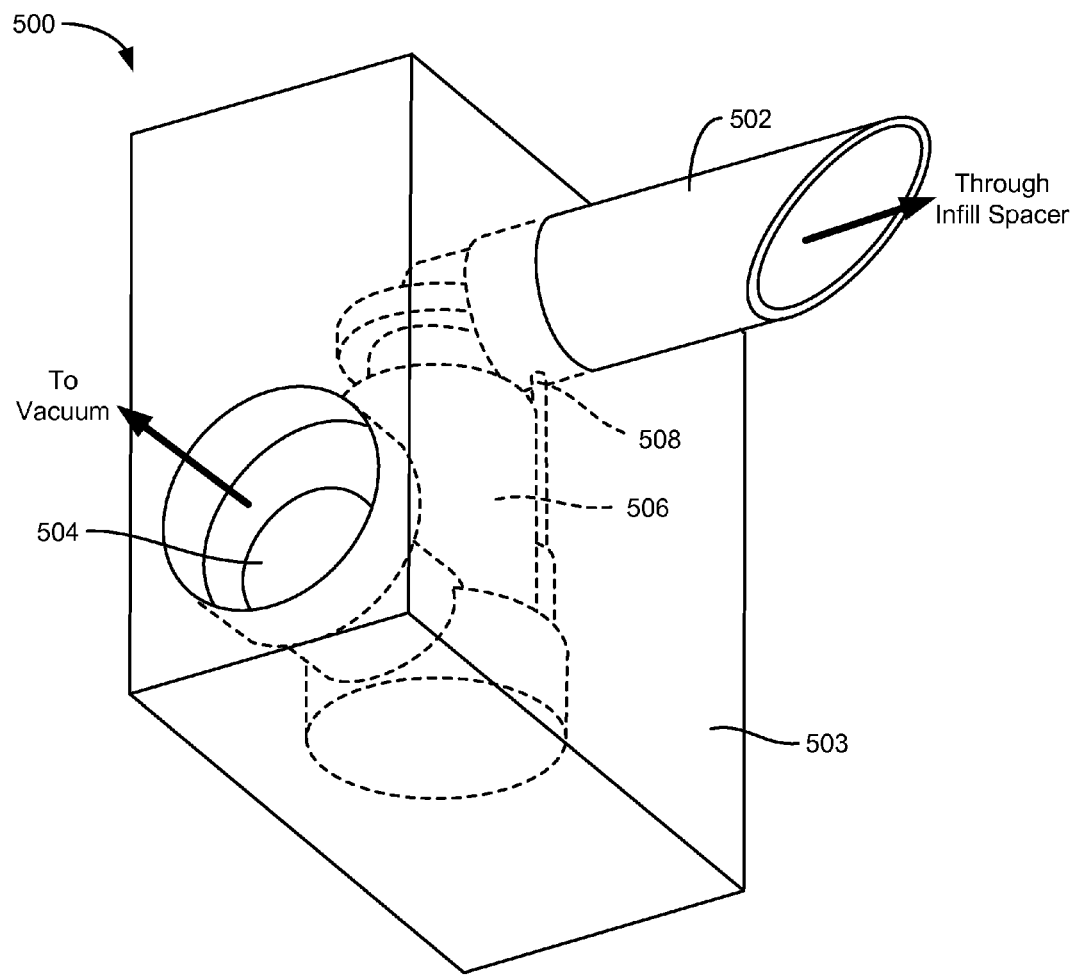
FIG. 5A illustrates one embodiment of a spacer piercing pressure valve.

Next, at operation 405 the infill spacer 434 is pierced with a spacer piercing pressure valve. One example of a spacer piercing pressure valve is shown in FIG. 5A, and a similar embodiment is shown in FIGS. 5E and 5F. FIGS. 5C and 5D illustrate spacer piercing pressure valves piercing an infill spacer 534 positioned between a pre-existing window 530 and a new electrochromic window 535 having lites 536 and 537 separated by an IGU spacer 538. A pocket 540 is formed between the pre-existing window 530 and the new electrochromic window 535. In FIG. 5A, the spacer piercing pressure valve 500 includes a hollow needle 502 used to pierce through an infill spacer 434/534. The piercing may also be done with another tool (e.g., a coring device), and the hollow needle may be placed through the hole. PIB or a similar sealant 542 may be applied to the bottom portion of the hollow needle 502, near the body 503 of the spacer piercing pressure valve 500. In some cases the sealant 542 is applied to a sealing boss 543, as shown in FIG. 5D. Adhesive 541 may also be applied to the body 503 of the spacer piercing pressure valve 500, which secures the spacer piercing pressure valve 500 to the new window, as shown in FIG. 5D. The PIB or other sealant 542 allows for a hermetic seal to be formed such that air does not leak out around the hollow needle 502.

Returning to FIG. 5A, the hollow needle 502 is in fluid communication with a check valve 506, which is in fluid communication with a vacuum port 504. A vacuum pump may be connected with the vacuum port 504, e.g., through appropriate connectors and tubing. Further details related to the spacer piercing pressure valve 500 are included below. After the infill spacer has been pierced, the spacer piercing pressure valve typically stays in place, even after installation is complete. In one embodiment, the valve may take the general form factor of a setting block so as to have similar dimensions and fit in the space between the IGU edge and the mullion, as a setting block does.

Returning to FIGS. 4A and 4B, at operation 407, the new window 435 is placed proximate the pre-existing window 430, with the infill spacer 434 positioned between the new window 435 and the pre-existing window 430. This setup is shown in the bottom left portion of FIG. 4B. FIGS. 5C and 5D also illustrates this setup, with the needle 502 of the spacer piercing pressure valve 500 shown piercing through the infill spacer 534. FIG. 5C is further described below. In various embodiments, setting blocks (not shown) may be positioned between the edges of the new window 435 and the edge of the window recess 432, as described elsewhere herein. In some implementations, the new window 435 may be temporarily secured during installation, for example using suction cups or a similar method that allows the windows to be aligned with one another. The suction cups may be placed on the interior-facing surface of the interior lite on the new window (where "interior" is understood to refer to the interior of the building, such that the suction cups are easily accessible from the inside of the building). The suction cups may be removed after the windows are aligned with one another, or at a later stage, e.g., after the installation method is complete.

Next, at operation 409 a vacuum pump is connected with the vacuum port 504 on the spacer piercing pressure valve 500. Vacuum is applied, with the check valve 506 acting as a one-way valve to permit gas to travel only in one direction. In one embodiment, the check valve can be removed and after a hermetic seal is achieved, a screw or plug can be used to close off the vacuum port. Various different materials and methods could be used to irreversibly or reversibly close off the vacuum port. This configuration allows for the pocket 444 between the pre-existing window 430 and the new window 435 to be brought to a sub-atmospheric pressure. Because this pocket 444 is maintained at a sub-atmospheric pressure, the panes defining the pocket 444 are pulled toward one another. The sub-atmospheric pressure is maintained for a duration that is sufficiently long to allow all of the PIB seals 452 and additional adhesives 453 to properly form/set between the separation structure 450 and each pane to which it is attached. Heat may be applied near the seals/adhesives to encourage them to set. In a number of embodiments, the various seals/adhesives maintain a sub-atmospheric pressure in the pocket 444 between the pre-existing window 430 and new window 435 for a much longer time, in some cases indefinitely (thus forming a vacuum glass unit (VGU) with the existing window and one pane of the new IGU). The pressure differential between the pocket 444 and the surrounding atmosphere acts to pull the lites toward each other, applying a compressive force to the spacer, thereby creating a hermetic seal.

In certain embodiments, vacuum is applied until the pocket 444 reaches a target pressure to avoid damaging the pre-existing window. The target pressure for the pocket 444 will depend on the type of pre-existing window 430 that is present. Windows that are stronger can withstand stronger vacuum, whereas windows that are weaker may fracture if the pressure becomes too low. Factors that affect the target pressure include the construction of the pre-existing window 430 (e.g., one pane vs. multi-pane), the size of the pre-existing window 430, the material of the pre-existing window 430 (e.g., tempered glass, annealed glass, etc.), the condition of the pre-existing window 430 (e.g., whether any defects are visible/present, age of the pre-existing window, etc.), characteristics of the adhesives used (particularly the adhesive between the infill spacer and each lite to which the infill spacer is affixed), and atmospheric conditions. Further information related to choosing a target pressure is included below. In a number of embodiments, the target pressure may be below about 200 Torr. In many cases, the target pressure is sufficiently low such that any moisture present in the pocket 444 is vaporized and substantially removed from the pocket 444. A relative humidity sensor may be included, for example on the vacuum pump, vacuum line, or as a part of the spacer piercing pressure valve, to monitor the moisture content in the evacuated gas. A feedback system for monitoring/controlling the evacuation process is described below in relation to FIG. 5B.

In these or other embodiments, application of vacuum may be monitored in a different way, for example by monitoring the degree to which the pre-existing window 430 and/or the new window 435 deflect and/or bend inward toward one another. For example, the application of vacuum may be stopped when either the pre-existing window 430 or the new window 435 deflect by a predefined maximum deflection value at particular location. Stopping vacuum at maximum deflection can help avoid damaging the windows through, for example, fracture or failure at the supporting structures. Some factors that may be used to determine maximum deflection of a particular window are construction and size of the window, material of the window, and condition of the window. The pre-existing window 430 and the new window 435 may have different maximum deflection values. In some cases the deflection is monitored by measuring the distance between adjacent panes of the new and pre-existing windows at a particular location on the windows or by measuring the distance to the surface of a pane of either window to the deflection detection mechanism. It may be advantageous to measure this distance/deflection near the center of the panes, which the distance between the panes will be smallest and the degree of deflection will be greatest. In certain implementations, this monitoring is accomplished using a detection mechanism (e.g., a laser range finder), which may use triangulation or another method to determine the degree of deflection by measuring the distance between adjacent panes or measuring the distance to a pane of either window. Such detection mechanisms are further described in U.S. patent application Ser. No. 13/859,623, filed Apr. 9, 2013, and titled "PORTABLE DEFECT MITIGATORS FOR ELECTROCHROMIC WINDOWS," which is hereby incorporated by reference in its entirety. This method may be combined with the other methods, as appropriate. For example, one method may apply vacuum until either the target pressure is reached and/or either window has deflected to a maximum deflection value. A maximum deflection value may be calculated from the stiffness and allowable stress of the pre-existing window and/or the new window. In this method, vacuum may be limited by an acceptable amount of stress/deflection of the pre-existing window and/or the new window.

In order to evaluate whether the new window is adequately sealed to the pre-existing window, a leak up rate may be monitored. The leak up rate is measured as a pressure change over time, and refers to the rate at which pressure increases in a sub-atmospheric region or element. In certain examples, the leak up rate may be measured by turning off the vacuum pump and monitoring the change in pressure over time or by activating a solenoid or manual valve to isolate the window and then using a vacuum pressure sensor to measure the leak up rate. In certain embodiments, a high quality seal is considered to be established where the leak up rate is greater than a predetermined lower value and a predetermined upper value (i.e., within an acceptable range). The upper and lower values are determined based on the size of the window so that a larger window would have higher acceptable lower/upper values of the leak up rate. The leak up rate is generally in terms of linear feet of the primary seal.

At operation 411 the vacuum pump may be disconnected. In certain embodiments, the pocket 444 between the pre-existing window 430 and the new window 435 may optionally be back filled with a particular gas, for example argon, krypton, xenon, or another gas (or mixture of gases) commonly used to fill IGUs. This step is shown as operation 412. Such gas may increase the R-value of the window and/or may decrease the risk of future condensation within the pocket 444. The gas may be introduced to the pocket 444 after the pocket 444 has been evacuated, in some cases after the seals have had a chance to set. The gas may be introduced using a tool that pierces the infill spacer 434, similar to the spacer piercing pressure valve 500 shown in FIG. 5A (but omitting the check valve 506 or implementing it in the opposite direction). In certain embodiments, the valve used to evacuate the pocket 444 also has a mechanism to fill the pocket 444. For example, two one-way check valves, one in either direction could be used. In other embodiments, a breather tube (sealed during evacuation) is used to introduce gas back into the pocket 444. In these valve and capillary tube embodiments, the valve/tube creates a large pressure drop when there is a pressure differential. This pressure drop helps ensure that little moisture is transported into the pocket 444. Where the pocket is filled with a particular gas, the tool used to introduce the gas may pierce through the spacer at any time before operation 413 (if space permits), and in some cases this occurs before operation 407. In embodiments where gas is specifically introduced to the pocket 444 between the pre-existing and new windows, any perforations made in the spacer or other window components to introduce such gas should be sealed (after the gas is introduced) to ensure that the gas is retained between the windows, as desired. Operation 412 may occur at other times than what is shown in FIG. 4A. In some cases operation 412 occurs between operations 409 and 411, or between operations 413 and 415.

Next, backing rod 440 may be positioned between the new window 435 and the edge of the window recess 432. The backing rod 440 may be a long thin strip of foam or other flexible/deformable material. In FIG. 4B, the backing rod 440 is shown as two squares near the top and bottom of the first pane 436 of the new window 435. It is understood that this backing rod 440 may extend around the entire perimeter of the new window 435. The backing rod 440 may be positioned such that is aligned with the first pane 436 of the new window 435 (now the middle pane of the three pane window), or it may be positioned slightly behind or slightly in front of this first pane 436. One purpose of the backing rod 440 is to provide a surface against which the sealing material 442 is applied during operation 415. This sealing material 442 is also positioned between the new window 435 and the edge of the window recess 432. In various embodiments this sealing material 442 may be structural silicone, though other materials may also be used. The seal is then allowed to set and the new window 435 is installed.

One of the advantages of the evacuation method described in FIG. 4A is that the new window can be installed without pressing outward on the pre-existing glass, or by only pressing on the pre-existing glass to a minimal degree, and that vacuum is controlled to prevent damaging the windows. One or more of the operations described herein may be performed in a way that results in some application of outward force on the pre-existing glass; however, such force is often very minimal, particularly in comparison to the force that would be needed to securely press the new window onto the pre-existing window without using vacuum. In various embodiments, the amount of outward force applied to the pre-existing window during installation may be no greater than a few psi, just enough to apply the spacer with adhesive to the existing window, to make contact. Such forces may be considered de minimis. The evacuation of the pocket applies the sealing force.

As noted above, in some cases the evacuation process may be monitored/controlled using a feedback method. In some cases, a feedback method may involve monitoring the rate at which air is removed from the pocket between the pre-existing window and the new window. One example system for implementing such a feedback method is presented in FIG. 5B. In this system, two retrofitted infill windows are being simultaneously installed, with the vacuum pump fluidically connected with each of the pockets between the pre-existing windows and the new windows. A single vacuum pump may simultaneously act on a number of different windows so long as an appropriate manifold is provided, the vacuum tubing is sufficiently long to reach all the windows, and the vacuum pump is sufficiently strong. The feedback method may be controlled by a controller, which may take various different inputs including, but not limited to, the size of the windows being acted upon (both area and thickness of the various panes), the material of the windows (e.g., tempered glass vs. annealed glass vs. plastic, etc.), the construction of the windows (e.g., single vs. multi-paned), identity/properties of the sealants/adhesives used, atmospheric pressure, etc. These inputs may be input by a user in some cases. Other inputs to the controller include a signal related to the altitude density (which may be measured using a combination of sensors including a barometric pressure sensor, a relative humidity (RH) sensor, and a temperature sensor), and real time clock (RTC). Another input to the controller is the feedback signal, which may relate to one or more of (a) a leak up rate, and/or (b) a rate at which air/gas leaves each pocket.

During operation of the vacuum pump, the rate at which air is removed from the pocket between the pre-existing window and the new window may be monitored. This rate may be monitored for each window that is being retrofitted. Once this rate is sufficiently low (e.g., once this rate reaches below about a target rate), the vacuum pump may automatically shut off. A low rate of air removal from the pocket is analogous to a low leak up rate. Therefore, a low rate of air removal from the pocket is understood to correspond to a condition where a seal is forming properly. If this rate remains high after a long time, it suggests that inadequate sealing/adhesive has been provided, and that a high quality seal will not form. After the vacuum pump is turned off, the windows are allowed to sit passively for a duration (e.g., between about 1 seconds and 10 minutes, for example between about 30 seconds and five minutes) to allow the window to relax. This flow rate measurement can be used to determine that the window is no longer relaxing. This flow rate measurement may also be used to set an acceptable leak up rate, for example, by first measuring the initial leak up rate when applying the vacuum and then measuring the volume that fills the window once the vacuum pump is no longer communicating with the volume.

After the duration of allowing the windows to sit passively, the vacuum pump may again apply vacuum to the pocket via the vacuum tubing and spacer piercing pressure valve. If the rate at which air leaves the pocket remains at an acceptably low level, a high quality seal is understood to have formed (or be forming). If the rate at which air leaves the pocket rises significantly after the vacuum is applied again, it is understood that a high quality seal has not formed. In this case, vacuum may be applied to remove air from the pocket one or more additional times. If after several attempts a high quality seal has not formed, the new window may be removed and the process may be restarted.

The rate at which air leaves the pocket between the pre-existing window and the new window may be monitored in a variety of ways. In one example, this rate may be measured by monitoring the duty cycle percentage on a cycling solenoid valve while keeping the vacuum level constant. In another example, the rate may be measured by monitoring the cycling rate of a cycling solenoid valve. In general, lower cycling rates correspond to lower rates of air removal. In another example, an anemometer or other air speed measuring device may be used to monitor the rate of air removal. In yet another example, a rotameter may be used to measure the air speed. In some such cases, the air speed is measured by monitoring a speed of rotation of a particular component, or the height of a pill or other indicator in a tube.

In a particular embodiment, the feedback system may be used to estimate the size of the windows. Based on this size estimation, the system may designate an appropriate target pressure, target deflection, or target rate of air removal from the pocket. For example, the vacuum pump may apply an initial vacuum pressure to the pocket. The rate at which air leaves the pocket in response to this initial vacuum pressure may be measured over an initial period. After this initial period, the rate at which air enters the pocket (the leak up rate) may be measured. This leak up rate, combined with the initial vacuum pressure and the duration over which it was applied, may indicate the size (e.g., volume) of the pocket between the pre-existing window and the new window. Based on this size estimate, the feedback system may determine an appropriate rate of air removal that would indicate formation of a high quality seal. This size estimate may also determine a safe limit for the vacuum pressure applied to the pocket. After the leak up rate is measured, the vacuum pump may again apply vacuum to the pocket, ensuring that the vacuum pump applies vacuum within estimated tolerance levels. The rate at which air leaves the pocket can be monitored, and once the rate reaches below about a target rate (the target rate being based on the estimated size of the window as described), application of vacuum may be ceased. After an appropriate waiting duration, vacuum may again be applied and the rate at which air leaves the pocket can be monitored to evaluate whether a high quality seal has formed. If a high quality seal has formed, the rate at which air leaves the pocket will remain low after the waiting duration when no vacuum is applied.

In some embodiments, the leak up rate is measured while applying vacuum using a flow meter such as, for example, a rotameter or a mass flow controller. When the measured flow rate is sufficiently low (i.e., below a predetermined lower limit), then the leak up rate is also sufficiently low. A determination of a low leak up rate can help ensure that the moisture has been evacuated, which can improve the reliability of the window.

Furthermore, in some embodiments a component of the feedback system may directly measure the relative humidity of air leaving the pocket between the pre-existing window and the new window. To this end, a relative humidity sensor may be included on the spacer piercing pressure valve, vacuum tubing, vacuum pump, or on another component in fluidic communication with these components. This may help ensure that very little moisture is left in the pocket, thus avoiding future condensation issues.

One of the components in the feedback system (e.g., the spacer piercing pressure valve, controller, or other component) may include a display for indicating the status or progress of the installation method. For instance, an indicator may be used to communicate to a user/installer whether the process is proceeding as desired. In one example, one or more lights may be used to indicate whether the process is proceeding as desired. In a particular example, a green light indicates that the process is complete and within the limits for quality checks, while a yellow light may indicate that the process is operating outside of a desired range, and a red light may indicate that the process has failed. Similar indication systems are also contemplated to be within the scope of the disclosed embodiments.

The target pressure, as noted above, depends on a variety of factors. Such factors include, for example, the size of the windows (both area and thickness), the material of the windows (e.g., annealed glass vs. tempered glass vs. plastic, etc.), the construction of the windows (e.g., single pane vs. multi-pane), properties of the adhesive(s) used, local atmospheric pressure, relative humidity, etc. The atmospheric conditions may be measured by sensors that may be included on the spacer piercing pressure valve, controller, or another component that may be provided in an installation kit. In some cases, a pre-existing table may be used to select a target pressure that is used during installation. The table may take a number of factors into account including those described herein. The table may be based on empirical test results and/or theoretical models. A similar pre-existing table may be used to select a target leak up rate for a particular window. These tables may be used to provide feedback to a user during evacuation. In one example, different lights or other signals may be used to communicate to a user/installer the status of the evacuation process. For instance, one signal (e.g., a yellow light) may be used to signal that the evacuation process is ongoing and within tolerance levels, a second signal (e.g., a yellow light) may be used to signal that the evacuation process is complete and within tolerance levels, and a third signal (e.g., a red light) may be used to signal that the evacuation process has encountered an error.

The target pressure may be sufficiently low to ensure that moisture is substantially vaporized and removed, but not so low that either window is likely to break. Because the factors listed above affect the strength of the glass and the degree of vacuum pressure the glass can sustain, they are relevant for determining the target pressure. For example, tempered glass is much stronger than annealed glass, and can therefore withstand stronger vacuum, compared to annealed (non-tempered) glass. As a result, the target pressure may be lower when the pre-existing window is made of tempered glass compared to when the pre-existing window is made of annealed glass. Similarly, larger windows may be able to withstand relatively lower pressures due to the larger area over which the glass can bend/deflect. With respect to construction, a pre-existing window that is multi-paned may be relatively stronger than a similar single pane window. As a result, the target pressure may be lower in cases where the pre-existing window includes multiple panes as opposed to a single pane. With respect to the properties of the adhesives, a lower target pressure may be used in cases where the adhesives provide relatively stronger seals. Local atmospheric pressure may also come into play, with installations at low atmospheric pressures (e.g., in the mountains) utilizing lower target pressures. The vacuum pump acts to create a low pressure environment in the pocket between the pre-existing window and the new window. This results in a pressure differential between the pocket and the environment outside this pocket (both outside and inside the building). One of the windows (typically the pre-existing window) may break if this pressure differential becomes too great. All other factors being equal, a lower atmospheric pressure results in a lower pressure differential. Therefore, in cases where the atmospheric pressure is relatively lower, the target pressure may also be relatively lower.

In certain embodiments, the IGU to be applied to the existing window is constructed with the evacuation infill installation method shown in FIG. 4A in mind. For example, the pane of the IGU that is to mate with the infill spacer and create the infill pocket may be chosen to be thicker than the other pane(s) of the IGU (to reduce the likelihood that this pane will break during evacuation). In another embodiment, the pane of the IGU that is to mate with the infill spacer and create the infill pocket may be chosen to match one or more characteristics of the existing window, e.g., thickness, type of glass (float, tempered, strengthened), plastic, and the like. This may ensure that the panes defining the infill pocket are affected about equally during evacuation.

In certain embodiments, an overall time limit may be observed while evacuating gas from the pocket between the pre-existing and new windows. The duration of this time limit will depend on many factors including the target pressure (and all factors that affect the target pressure) and the strength of the vacuum pump used. In certain embodiments, the overall time limit over which gas is evacuated from the pocket between the windows is between about 0.25-5 hours, for example between about 0.5-1 hour. The overall time limit may be particularly beneficial in cases where there is an error with the feedback system. The time limit may help minimize the risk that the pressure within the pocket will reach a level that is unacceptably low (at which point the pre-existing and/or new window may become damaged).

Retainers may be used in some cases to prevent a new window from moving from its position. The retainers may remain permanently installed to reduce the risk that a new window will fall away from a pre-existing window in the case that the seals/adhesives attaching it to the pre-existing window fail over time. Retainers described herein are not intended to provide active force against the new window to mechanically secure the window in place, as a fastener would, but rather are a safety measure to prevent the new window from moving once it is installed. The sealing spacer holds the new window in place, and the retainer is installed as a failsafe to keep the new window from moving should the adhesive seal fail at some point.

Figure 6A:
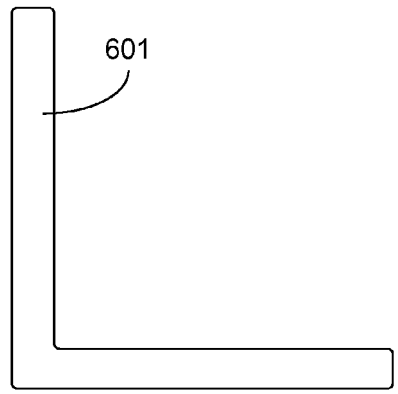
FIG. 6A illustrates multiple views of a retainer that may be used to retain a new electrochromic window in a pre-existing window recess.
Figure 6A:
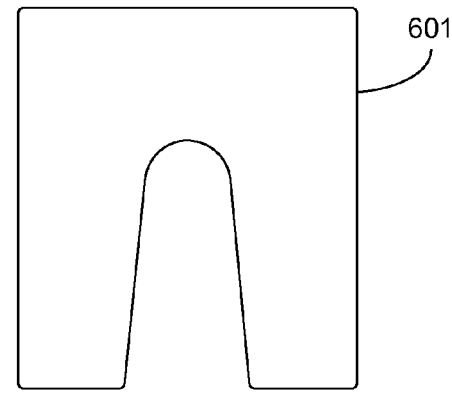
Figure 6A:
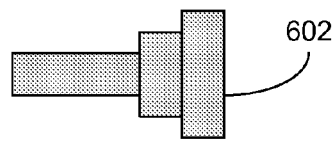
Figure 6A:
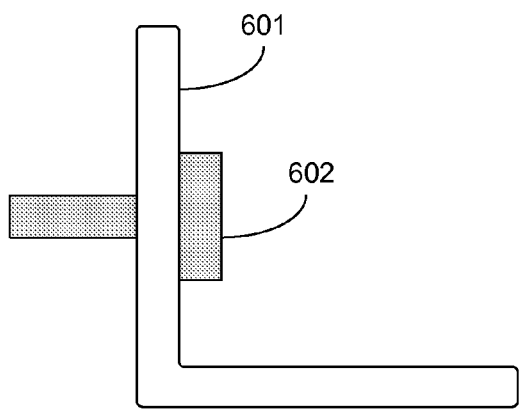
Figure 6A:
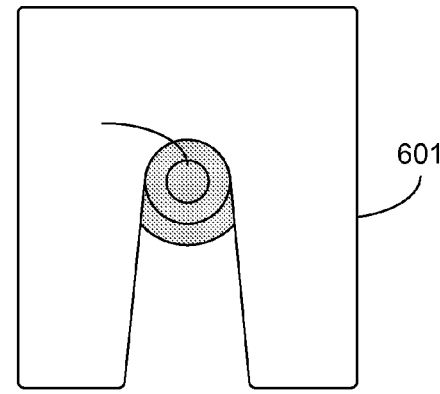

FIG. 6A illustrates one embodiment of a retainer 601 shown from two different views. Also shown is a shoulder screw 602. Other types of fasteners/rods can also be used to secure the retainer. In the bottom portion of FIG. 6A, the shoulder screw 602 is shown engaged with the retainer 601. Retainer 601 in this example includes two main portions that extend perpendicularly outward from one another, as shown in the first view. At least one of these main portions includes a cutout, as shown in the second view. In this example the cutout is tapered. The shoulder screw 602 can fit through the cutout to engage with the retainer 601. The head of the shoulder screw 602 is larger than the cutout on the retainer 601 at the portion of the cutout where the shoulder screw 602 sits when engaged. This difference in size is visible in the bottom right portion of FIG. 6A.

Figure 6B:
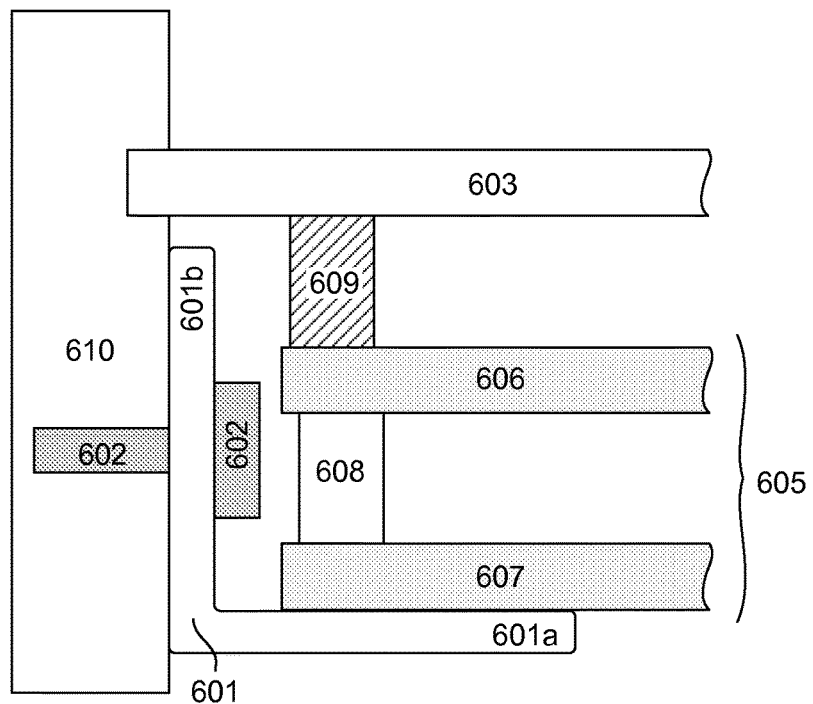
FIG. 6B illustrates a new electrochromic window installed in a pre-existing window recess proximate a pre-existing window, where the new electrochromic window is retained by the retainer shown in FIG. 6A.

FIG. 6B illustrates this same retainer 601 and shoulder screw 602 installed on a window recess element 610 and retaining a new window 605. The retainer 601 includes a first portion 601a and a second portion 601b. The second portion 601b of the retainer 601 (and optionally the first portion 601a) includes a cutout through which the shoulder screw 602 passes. The window recess element 610 may be a structural component of a window opening/recess, for example a portion of wall/ceiling/floor/sill/framing element/mullion/transom, etc. The new window 605 includes a first pane 606 and second pane 607 separated by a spacer 608. The new window 605 is separated from a pre-existing window 603 by an infill spacer 609. The retainer 601 helps maintain the new window 605 in place, preventing it from falling inwards (into a building) in the event that the seals/adhesives (not shown) attaching the new window to the pre-existing window break down or fail over time. There is no force applied to the new window by the retainer, it is merely there to prevent the new window from moving should the adhesive sealant fail. Thus, it is not a fastener, but a retainer.

In various embodiments, a number of such retainers may be used with a new infill window. In one example, at least two retainers are provided. In another example, at least two retainers are provided on each side of the window where such retainers are provided (e.g., four total retainers, provided along two sides of the new window). In these or other embodiments, retainers may be provided along each side of the new window. The screws or other fasteners may be installed such that they do not contact the panes 606 and 607 of the new window 605, but rather only fasten the retainer to the framing. To this end, in certain embodiments the screws do not extend inward (toward the center of the window recess) any farther than setting blocks used to support the new window.

With respect to the method described in FIG. 4A, the retainers may be installed after the new window is placed proximate the pre-existing window in operation 407. The retainers may be installed before operation 415, and in some cases before operation 413, operation 411 and/or operation 409. In order to install the retainer 601, the shoulder screw 602 is installed into the window recess element 610 (this operation may occur before operation 407 of FIG. 4A in some cases). After the new window 605 is positioned proximate the pre-existing window 603 (separated by the infill spacer 609), the retainer 601 may be slid proximate the edge of the new window 605. As noted above, this may be repeated for a number of retainers at different locations on the new window (e.g., top, bottom, and/or sides). The first portion 601a of the retainer may sit adjacent the second pane 607 of the new window 605, extending parallel to the panes 606 and 607 of the new window 605. The second portion 601b of the retainer may sit adjacent the window recess element 610, extending perpendicular to the panes 606 and 607 of the new window 605. The retainer 601 may be slid proximate the edge of the new window 605 in a manner that causes the shoulder screw 602 to engage with the cutout on the second portion 601b of the retainer 601. The shoulder screw 602 effectively locks the retainer 601 into place when the retainer 601 is properly positioned. In this way, the shoulder screw 602 and retainer 601 can work together to prevent the new window 605 from falling away from the pre-existing window 603, should the sealant holding the infill window in place fail. The inventors have found that with their vacuum assisted method of applying the new infill window to the pre-existing window, there is no need for a mechanical fastener to hold the infill window in place, but out of the abundance of caution a retainer is prudent in case the adhesive holding the infill fails for some unforeseen reason. This should not be the case, as the weight of the new infill window may be supported by e.g., setting blocks positioned in the pre-existing window recess, and thus the adhesive seal need not support the weight of the infill window in any way. Also, since the volume created by the infill may be vented, pressure should not build up within the volume.

Figure 6C:
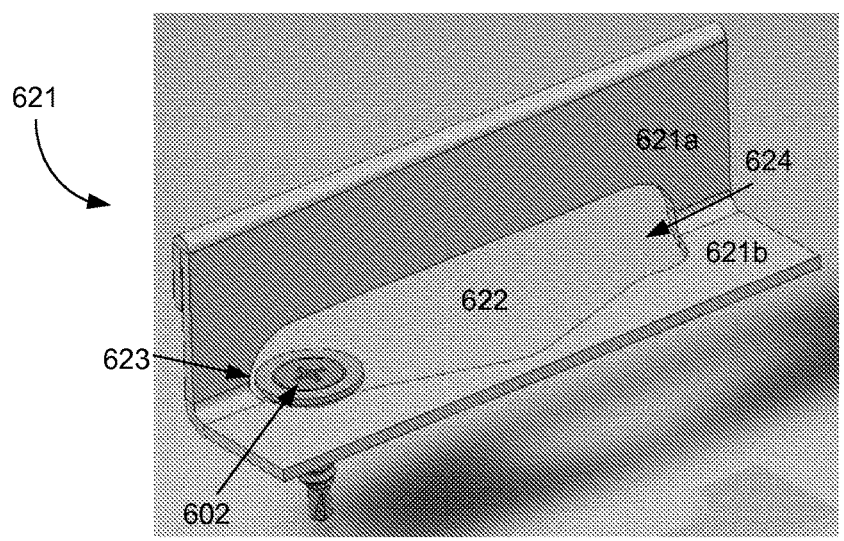
FIG. 6C depicts an additional embodiment of a retainer that may be used in some embodiments.

FIG. 6C illustrates another embodiment of a retainer 621. In this example, the retainer 621 includes a first portion 621a and a second portion 621b that extend perpendicularly from one another. The first portion 621a is installed such that it is parallel with the panes of the windows, and the second portion 621b is installed proximate the edge of the new window, perpendicular to the panes of the windows. The second portion 621b engages with screw 602. Retainer 621 includes a cutout 622 defined on its edges by both the first and second portions 621a and 621b of the retainer 621. The shape of the cutout 622 on the first portion 621a may be relatively uniform/straight, while the shape of the cutout on the second portion 621b may be tapered (with the widest portion near the center and narrower portions near the ends 624 of the cutout 622. This retainer 621 may be installed in the same manner as the retainer described above, except that because the retainer includes a cutout that is tapered in two directions, it can be slid in either direction (parallel to the face of the window panes) to engage the screw 602. In other words, while FIG. 6C shows the screw 602 situated toward the left hand side of the cutout 622, the retainer may also be slid the opposite direction such that the screw 602 is situated at the right hand portion of the cutout 622. When such retainers 621 are installed adjacent the sides of an IGU (as opposed to the top/bottom of the IGU), it may be advantageous to ensure that the screw 602 is situated in the topmost portion of the cutout 622, such that the retainer 621 will not fall out of place over time due to gravity.

Figure 6D:
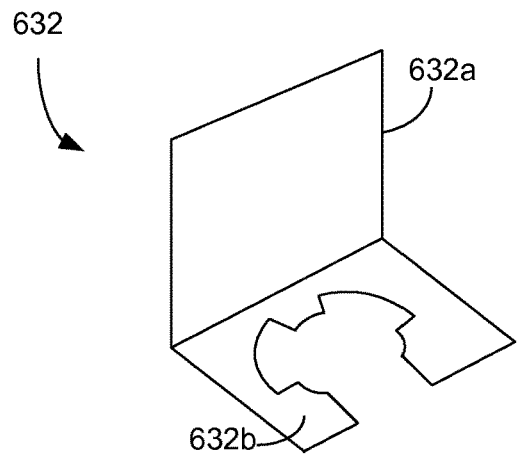
FIGS. 6D and 6E depict an additional embodiment of a retainer that may be used in some embodiments.
Figure 6E:
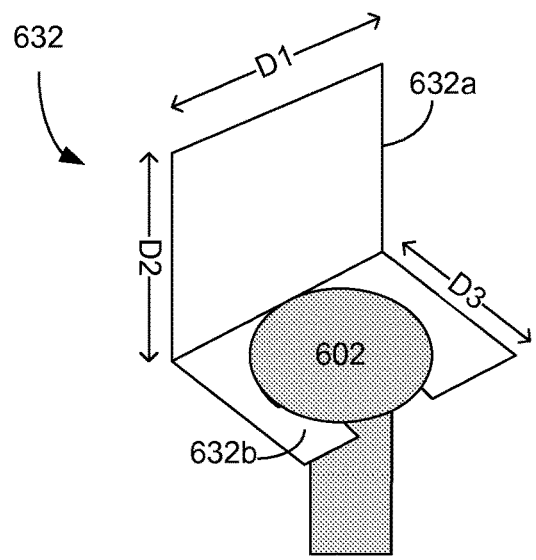

FIG. 6D depicts an embodiment of a retainer 632. In this example, the retainer 632 includes a first portion 632a and a second portion 632b that extend orthogonally from one another. The second portion 632b includes a cutout that snaps to engage with, e.g., a screw. The first and second portions 632a and 632b in FIG. 6D meet along a seam that extends the width of the retainer 632. When installed, first portion 632a is situated proximate the face of a new window, parallel with the pane(s) of the window. The second portion 632b engages with a screw or other fastener 602 (shown in FIG. 6E), for example by snapping around the shaft of the screw/fastener 602. The screw/fastener 602 may be installed in a window recess element similar to what is shown in FIG. 6B. The second portion 632b of the retainer 632 is shaped as a retainer ring. In this example, an e-ring retainer shape is used, though other types of retainer ring shapes may also be used in other embodiments. The first and second portions 632a and 632b are connected in a strong/reliable manner such that if a new window begins to fall away from a pre-existing window, the first portion 632a of the retainer 632 will retain the new window and prevent it from falling out. The second portion 632b remains engaged with the screw 602 to ensure that the new window does not fall out. The retainer need only meet any lateral forces the window might impart if the adhesive seal should fail, and, since there may be multiple retainers per infill, this may be accommodated e.g., using a snap ring type securement of the retainer to the screw in the framing. FIG. 6E illustrates the retainer 632 shown in FIG. 6D snapped onto a screw 602. The screw 602 may extend into a window recess element such as element 610 of FIG. 6B. FIG. 6E also includes labels for particular dimensions (D1, D2, and D3) of retainer 632.

In certain embodiments, a retainer may be configured to have particular dimensions, as explained in the context of FIG. 6E. For example, with respect to the portion of the retainer that is oriented parallel to the panes of the windows (e.g., first portions 601a, 621a, and 632a), these portions may extend inward toward the center of the window recess for a distance between about 0.25-2 inches in some cases between about 0.5-1 inch. This dimension is labeled D2 in FIG. 6E. These first portions 601a, 621a, and 632a may also extend along the edge of the perimeter of the new window for any distance, though in some cases this distance is between about 0.5-2 inches, in some other cases between about 2-6 inches. In some other examples, this distance may span substantially the entire edge of an IGU, e.g., and the retainer may have several clip portions so as to clip onto several screws, for example. This dimension is labeled D1 in FIG. 6E. With respect to the portion of the retainer that is oriented parallel to a surface of the window recess element (and perpendicular to the window panes, e.g., second portions 601b, 621b, and 632b), these portions may extend under/on top of/alongside the edge of the new window to a distance between about 0.25-2 inches, in some cases between about 0.5-1 inch. This distance should be sufficiently long such that the retainer can engage with the screw or other fastener installed in the window recess element, and sufficiently short such that it fits in the space provided (e.g., the size of the retainer is limited due to the presence of the pre-existing window). This dimension is labeled D3. Dimensions D2 and D3 should be sufficiently long to ensure that the retainer can adequately capture/support the new window in the event that the new window starts to fall away from the pre-existing window. There is greater flexibility with the dimension D1.

One reason retainers are advantageous is that they are installed without applying force on the new infill window, and thus no force on the pre-existing window. Similarly, if a new window does come away from a pre-existing window and the retainers keep the new infill window in place, the retainers can accomplish this without applying any force on the pre-existing window. Conventional infill systems use mechanical fasteners that impart a force onto the infill and thus, indirectly, the pre-existing window. The inventors have found that application of force onto the pre-existing window is to be avoided, and thus mechanical fasteners should be replaced with retainers, where no force is applied to the new infill window and thus the pre-existing window.

Many of the preceding embodiments have been in the context of infill windows where a new window is sealed to a pre-existing window, thereby creating an enclosed pocket between the pre-existing window and the new window. This enclosed pocket can include a controlled atmosphere where moisture has been removed. In some other embodiments, the pocket between the pre-existing window and the new window is vented rather than sealed. By venting this pocket, any moisture that leaks into the pocket over time can be actively or passively removed. While venting increases the risk that moisture will enter the pocket, it also makes it easier to remove such moisture. In some embodiments, air may be forced through a vented pocket between a pre-existing window and a new window. The forced air may also help heat or cool a window, as appropriate, for example to avoid thermal shock damage as discussed further below. For example, a new window having an optically switchable device such as an electrochromic device may absorb solar radiation when the device is in a darkened tint state. Forced air flowing between the new window and the pre-existing window can be used to remove heated air from the pocket between the windows and remove the heat from the windows. In cold weather, the forced air can be routed to heat the interior of a building. Windows that utilize forced air designs are further described in PCT Patent Application No. PCT/US15/14453, filed Feb. 4, 2015, and titled "FORCED AIR SMART WINDOWS," which is hereby incorporated by reference in its entirety. While the embodiments in the '453 application relate to multi-pane windows that are vented between the outer and inner panes, these same techniques/ structures/methods may be used to implement a vented infill window, where the space that is vented is situated between the pre-existing window and the new window.

Certain apparatus and methods described herein comprise techniques that pass air over at least one lite of an insulated glass unit, e.g., a tinted electrochromic coated lite of an IGU, in order to remove heat and therefore, lessen the heat load on the lite, and any optically switchable device (e.g., electrochromic coating) on the substrate of the lite, and/or other components of the IGU. In some implementations, air may be passed through a region between a lite of a pre-existing window and a lite of a new electrochromic window. In these or other implementations, air may be passed through a different region, for example inboard of a new electrochromic window. In certain embodiments, air that has been heated by the IGU lite is used to warm the interior of the structure. In certain embodiments, the heated air is used to drive a turbine to generate electricity. The electricity thus generated may be stored in a battery on the forced air window assembly.

Figure 6F:
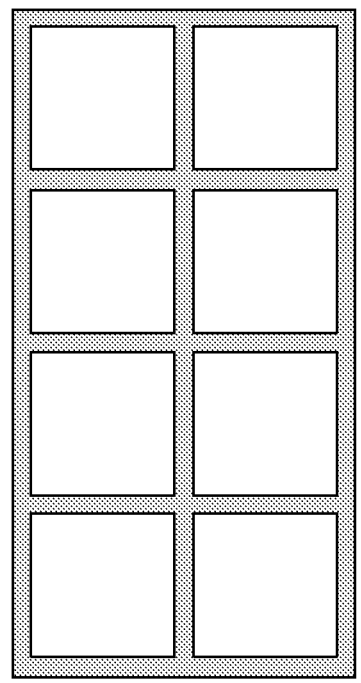
FIG. 6F illustrates a grid that may be positioned between a new electrochromic window and a pre-existing window in certain embodiments.
Figure 6G:
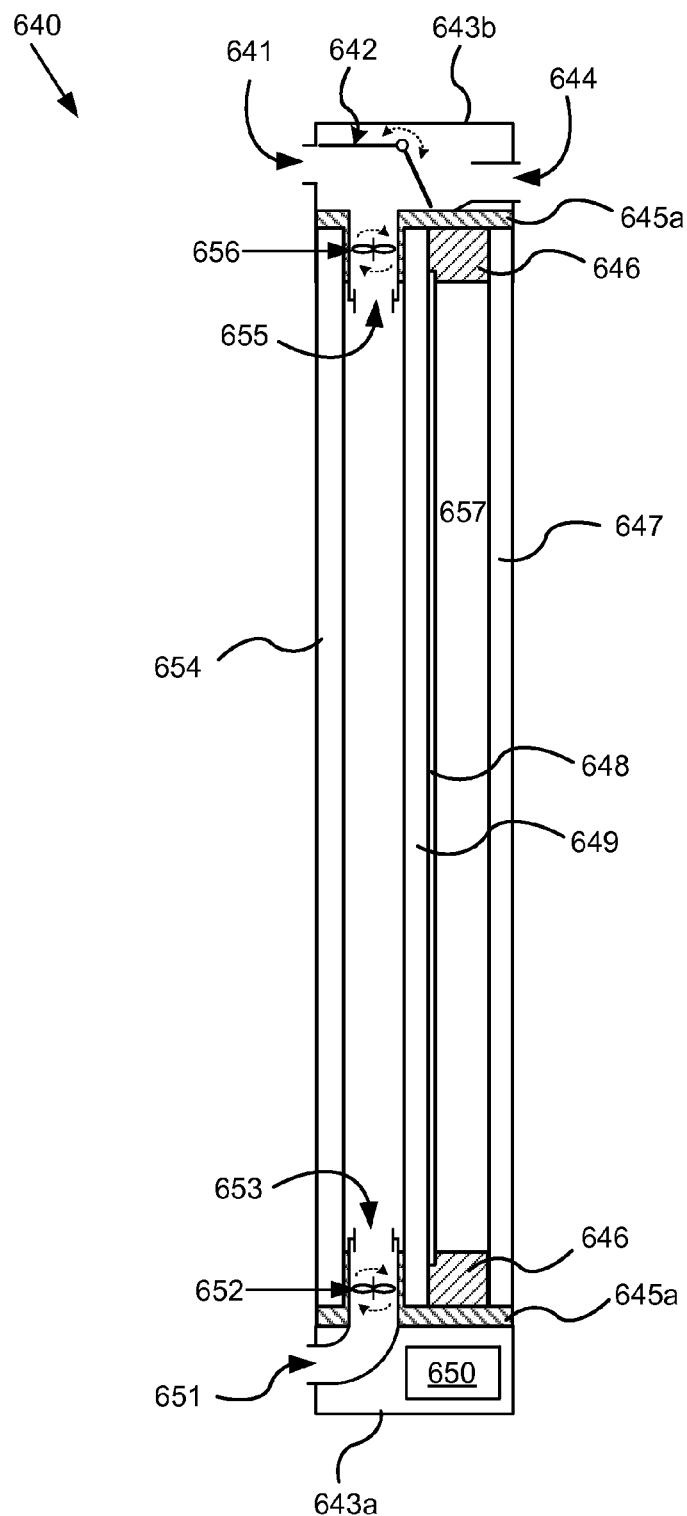
FIG. 6G is a drawing of a cross section view of a forced air electrochromic window, according to embodiments.

FIG. 6G depicts a cross section view of a forced air electrochromic window, 640, according to certain embodiments. The forced air electrochromic window 640 comprises an IGU subassembly. That is, the IGU subassembly comprises an electrochromic device coating 648 on an interior surface 212 of a first electrochromic lite 649, and a second lite 647. For simplicity, the spacer, primary seal and secondary seal of the IGU subassembly are depicted as a unitary structure, 646. An interior sealed volume 657 of the IGU subassembly is formed by the sealing of the mating surfaces of the spacer and the first and second lites, 649 and 647. At least the sealed interior volume 657 is isolated from the ambient environment. In addition to the IGU subassembly, the forced air electrochromic window 640 further comprises a third lite, 654, comprising a substrate made of a substantially transparent material, e.g., glass, plastic, plexiglass or the like. The third lite 654 is spaced substantially parallel to, and registered with the IGU subassembly, and affixed or adhered with sealant, and/or a sealing member, 645*a*. Any or all of the lites may be laminate structures themselves, but in this depiction each is a single lite.

Thus, for example, the IGU subassembly depicted in FIG. 6G may be applied to a pre-existing window, e.g., represented by lite 654. The framing, ventilation and other components of the forced air system may be attached to existing framing and/or fabricated using the existing framing, e.g., ventilation holes, fans, ducts, etc. may be added to existing framing to make a ventilated EC infill application.

Although the forced air electrochromic windows of certain embodiments are shown in a vertical outer wall of a structure with the third lite facing toward the Sun, these forced air electrochromic windows could also be in other orientations (e.g., having the third lite and the IGU subassembly in reverse positions, or in a horizontal orientation in a skylight) and/or may be in an interior wall. In various cases, the concepts presented in FIGS. 6G-6J may be implemented when installing a new electrochromic window proximate a pre-existing window. In one embodiment, the new electrochromic window may include the various components shown in the embodiments of FIGS. 6G and 6J. In some other embodiments, one or more of the components (e.g., lites and associated hardware) shown in FIGS. 6G and 6J may be provided in a pre-existing window. Thus, the various lites shown in FIGS. 6G and 6J may be lites from a pre-existing window or a newly installed electrochromic window. Although FIGS. 6G and 6J illustrate the electrochromic device coating 648 on lite 649, it is understood that such a device may be located on any lite. Often, the electrochromic device coating 648 is provided on a new electrochromic window having one, two, or more lites.

In certain embodiments, a forced air electrochromic window comprises two or more vent modules in communication with an interior space between an electrochromic lite of an IGU subassembly and a third lite. The third lite 654 may be provided together with the new electrochromic window, or it may be provided in a pre-existing window such that the vents act on the pocket between the pre-existing window and the new window. In some cases, one or more of these vent modules may comprise one or more air movement devices, e.g., one or more fans, for actively moving the air through the interior space between an electrochromic lite and a third lite. In one case, the one or more air movement devices comprise one of a blade fan, a bladeless fan, and an air pump. In some cases, one or more air movement devices from the structure and outside the forced air electrochromic window can be configured to feed air into one or more of the vent modules or output air from one or more of the vent modules. In certain embodiments, the vented air may be used to generate electricity by turning a turbine connected to a generator. The generated electricity may be stored in a battery, e.g., in one of the venting modules.

In FIG. 6G, for example, the forced air electrochromic window 640 comprises two vent modules, 643*a* and 643*b*. The two vent modules, 643*a* and 643*b*, are in cooperation with components of the window 640 with sealant, and/or the sealing member 645*a*. Although the vent modules 643*a* and 643*b* are shown configured at the top and bottom of the window 640, these modules could also be configured at either side, for example. The vent modules 643*a* and 643*b* allow forced air to be passed through the interior volume between electrochromic lite 649 of the IGU subassembly and the third lite 654. The forced air can be introduced into the interior volume either from the exterior or the interior of the structure (e.g., building) in which window 640 is installed. In cases where the third lite 654 is a lite of a pre-existing window, it may be easier to vent air to/from the interior of the building, though the pre-existing window and associated hardware/framing can also be modified to allow the air to vent to the exterior of the building or for example into existing framing, such as commonly used aluminum extruded hollow framing. For example, by venting warm air from the airspace heated by the absorptive EC coating into what would otherwise be cold aluminum, additional heat loss from a building via the metal framing is avoided. In certain embodiments, one or both of the vent modules, 643*a* and 643*b*, may comprise an air movement device (e.g., a fan) for actively moving air through the interior space between an electrochromic lite 649 and a third lite 654. For example, both of the vent modules 643*a* and 643*b* in FIG. 6G comprise air movement devices 652 and 656, depicted as fans, for moving air through the interior space between electrochromic lite 649 and the additional third lite 654. Other forms of air movement devices may be used. In certain cases, the structure outside of the forced air electrochromic window 640 may comprise air movement device(s) that can be configured to feed air into one or both of the vent modules 643*a* and 643*b* and/or air movement device(s) that can output air from one or both of the vent modules 643*a* and 643*b*. For example, a fan in the frame surrounding the window 640 can direct air into one of the vent modules.

In the example illustrated in FIG. 6G, the vent module 643*a* comprises first and second apertures, 651 and 653 respectively, which allow air to pass through the vent module 643*a*, e.g., from the exterior and into the interior space or from the interior space to the exterior. Similarly, vent module 643*b* comprises first, second, and third apertures, 655, 641 and 644 respectively. Aperture 644 allows air to pass, to or from the interior of the structure. In certain embodiments, one or more of the apertures in the vent modules may be omitted or differently configured, for example to vent the air as desired for a particular application. Vent module 643*b* also includes a diverter, 642, which swivels on a pivot as depicted. Diverter 642 allows air movement through 641 and 655 (in first position), or through 655 and 644 (in second position), depending upon the position of the diverter 642. In the illustration, the diverter 642 is in the first position. In some cases, this diverter 642 may be omitted. In the case of an infill application, the diverter may divert warm air outside, into existing framing to avoid heat loss from the building interior via the e.g., metal framing, or back into the interior to augment the building's heating system.

In the example illustrated in FIG. 6G, the vent module 643*a* further comprises a controller, 650, for controlling air movement devices 652 and 656, and for controlling one or more actuators (not shown) configured to move diverter 642 into the aforementioned venting positions. Controller 650 may be configured to control only vent modules 643*a* and 643*b*, or may also be configured to control tint levels of the electrochromic device coating 648. One embodiment of a forced air electrochromic window comprises an EC window controller that is configured to control tint levels of one or more electrochromic lites and also configured to control one or more vent modules of the forced air electrochromic window. The EC window controller may be programmed with instructions to tint the one or more electrochromic lites based on user input or preferences, and/or to ameliorate thermal stress on the one or more electrochromic lites.

Figure 6H:
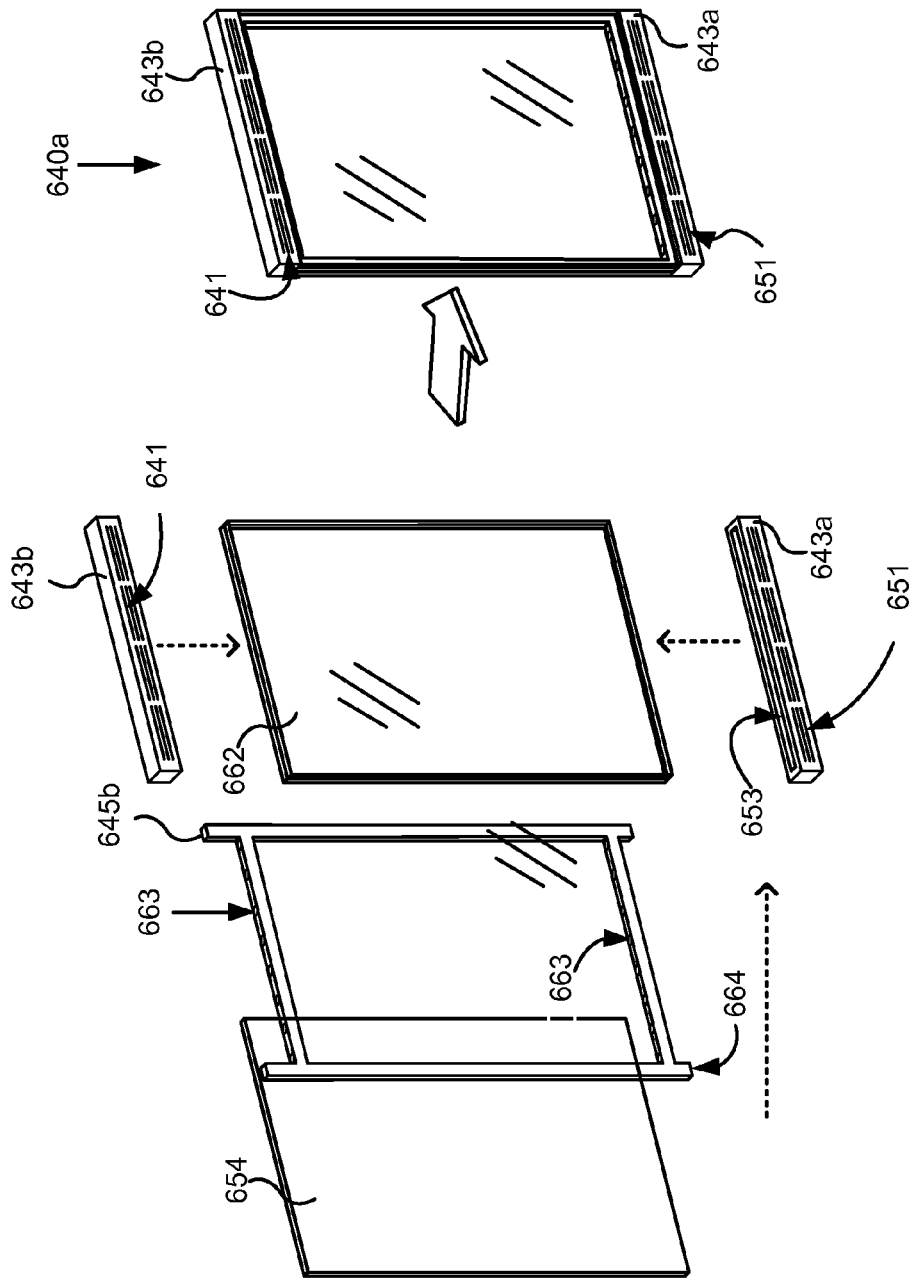
FIG. 6H is simplified illustration of fabrication of a forced air electrochromic window, according to an embodiment.

FIG. 6H is simplified illustration depicting fabrication of a forced air electrochromic window 640*a*, according to an embodiment. The dotted arrows denote the assembly of components/subassemblies that form (denoted by large solid arrow) the forced air electrochromic window 640*a*. Forced air electrochromic window 640*a* comprises similar components to those in forced air electrochromic window 640 described with respect to FIG. 6G. Forced air electrochromic window 640*a* comprises an IGU subassembly 662. The IGU subassembly 662 may include two lites separated by and sealed to a spacer, where at least one of the lites includes an electrochromic device coating thereon. The IGU subassembly may be a new electrochromic IGU that gets installed proximate a pre-existing IGU. A third lite 654 is also provided. This third lite 654 may be e.g., a pre-existing window, or it may be provided together with the new electrochromic window IGU subassembly 662. Vent modules 643*a* and 643*b*, and a sealing member 645*b* are also provided. The sealing member 645*b* may be an infill spacer as described elsewhere herein. Vent modules 643*a* and 643*b* are individual components that cooperate with the IGU subassembly 662, sealing member 645*b*, and third lite 654 to vent the space between the IGU subassembly 662 and the third lite 654. Once assembled, sealing member 645*b* is registered between the third lite 654 and the first lite of the IGU subassembly 662. The sealing member 645*b* may be made of metal or foam and may have a smaller width and length than the third lite 654 and the first lite of the IGU subassembly 662.

In some embodiments, the sealing member may comprise protrusions configured to engage with the vent modules, the IGU subassembly and/or the third lite so that the components may be assembled to form the forced air electrochromic window. In the illustrated example shown in FIG. 6H, sealing member 645*a* comprises four vertical protrusions 664 configured to engage with vent modules 643*a* and 643*b*. In some embodiments, sealing member 645*b* comprises both horizontal and vertical protrusions, where the horizontal protrusions are configured to engage with the IGU subassembly and/or the third lite. In this example, a sealing adhesive such as, for example, polyvinylbutryal (PVB), polyisobutylene (PIB), or other adhesive used in primary seals of conventional IGUs may be used to seal the mating surfaces of the sealing member 645*b*, the third lite 654, and the IGU assembly.

In some embodiments, the sealing member (in some cases an infill spacer) may also comprise intake and/or exhaust apertures in one or more sections mating with the vent module(s). These apertures are configured to pass air between the interior space created by the inner perimeter of the sealing member and between the third lite and the first lite of the IGU subassembly. For example, in FIG. 6H, sealing member 645*b* comprises eight apertures 663 in each of its horizontal sections for venting or otherwise passing air between the interior volume created by the inner perimeter of sealing member 645*b*, and lites 649 and 654, and the vent modules 643*a* and 643*b*. As another example, sealing member 645*a* in FIG. 6G comprises aperture 655.

In certain embodiments, the vent module(s) of the forced air electrochromic window comprise one or more intake and/or exhaust apertures. In some cases, the apertures may comprise structures such as louvers, screens, flaps and the like to prevent entry of rain, noise, or foreign objects such as insects, birds etc., and/or to direct the flow of air entering or exiting the apertures. As depicted in FIG. 6G, for example, intake and/or exhaust apertures 651 and 641 comprise louvers. Flaps or other structures may also aid in venting the interior space between lites 649 and 654 to prevent fogging. The vent module(s) and/or sealing member (e.g., in the apertures in the horizontal sections which allow flow) may include desiccant to prevent moisture from accumulating in the aforementioned interior volume. Generally, the interior volume of the IGU subassembly of the forced air electrochromic window is unaffected by moisture because it is hermetically sealed and/or provided with desiccant protection. As discussed in further detail below, condensed moisture in the interior volume between the third lite 654 and the first lite 649 of the IGU subassembly may also be removed by forced air circulation through the interior space. Also, forced air through this interior space may prevent moisture condensation.

Although certain embodiments describe a forced air electrochromic window with a third lite having dimensions, e.g., length and width, that are substantially the same as the dimensions of the lites of the IGU subassembly, other embodiments may have a third lite with larger or smaller dimensions. In one embodiment, third lite 654 has a length and width that are substantially the same as the length and width of the lites of IGU subassembly 662. In another embodiment, the third lite 654 may be smaller in length and width than the first lite 649 of the IGU subassembly. In such an embodiment, additional framing or other structure (e.g., components of a pre-existing window recess in some cases) may surround third lite 654 and be part of, or be in cooperation with sealing member 645*b*. In another embodiment, third lite 654 may be larger in length and width than first lite 649 of the IGU assembly 662. In various cases, the third lite 654 is a lite in a pre-existing window. The pre-existing window can have any number of lites. In various cases where the third lite 654 is a lite in a pre-existing window, the dimensions of the third lite 654 may be slightly larger than the dimensions of the lites in the new electrochromic IGU subassembly 662, such that the new IGU subassembly 662 fits in front of the pre-existing window in a pre-existing window recess.

In the embodiment depicted in FIG. 6H, there is nothing visible on the sides of the window; that is, extending past the glass edges on either side. The sealing member 645*b* structure allows a parallel spaced and registered relationship between the third pane 654 and the adjacent pane of the IGU subassembly 662. In this example, the vertical components of sealing member 645*b* do not extend beyond the vertical edges of panes of the IGU subassembly or the third pane 654. In a sense, forced air electrochromic window 640*a* can be thought of as a triple paned IGU, where one of the two interior volumes is hermetically sealed (or at least fully desiccated) and the other of the two interior volumes is vented and allows active airflow therethrough in order to cool the relevant components, for example the electrochromic IGU subassembly 662, e.g., a lite and/or interior space therein. In certain embodiments the vented interior volume is actively vented, that is, air is forced through the interior volume to remove heat therefrom. The vents may be directed toward the interior of the building, the exterior of the building, or both.

All the components depicted in FIG. 6G, but for lite 654, may be fabricated as a standalone assembly that is attached to a pre-existing window 654. The assembly is dimensioned so as to fit within existing framing holding window 654. The venting modules circulate air through the airspace created between the IGU subassembly and window 654. In this way heat buildup and condensate in the newly created airspace can be avoided. Moreover, heat generated by the absorptive properties of the EC coating can be used by the building occupants or, e.g., if the vents are not in use, can be used as a thermal barrier to heat loss from the interior of the building.

Figure 6I:
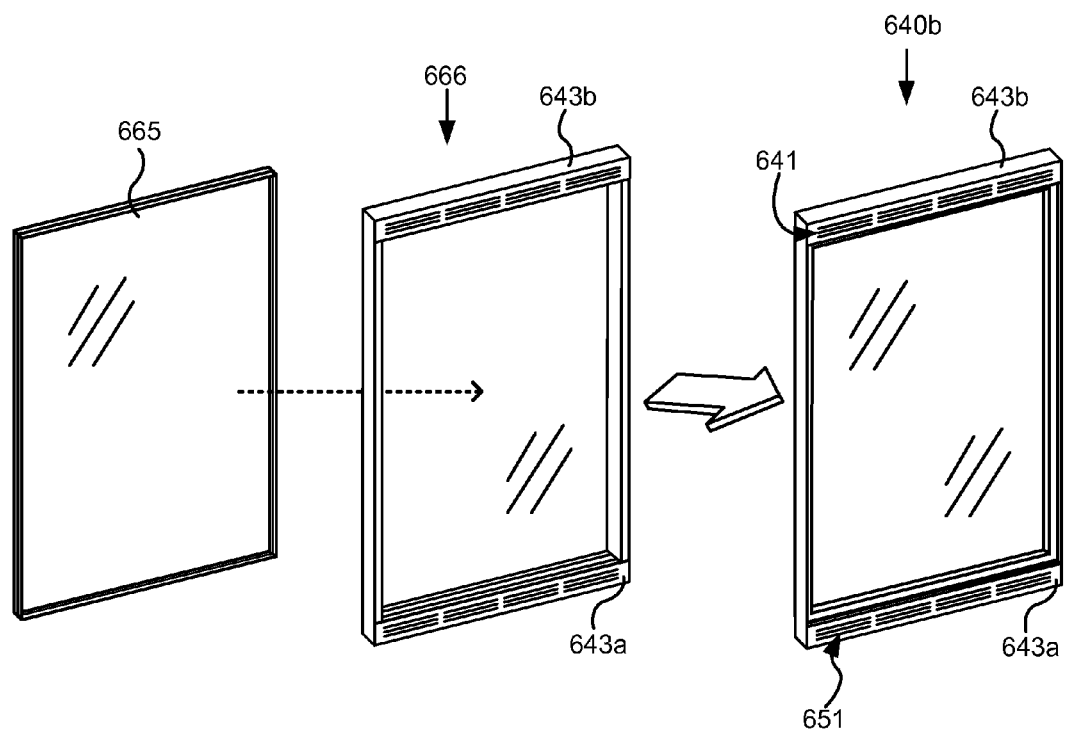
FIG. 6I is simplified illustration of fabrication of a forced air electrochromic window, 400b, according to an embodiment.
Figure 6J:
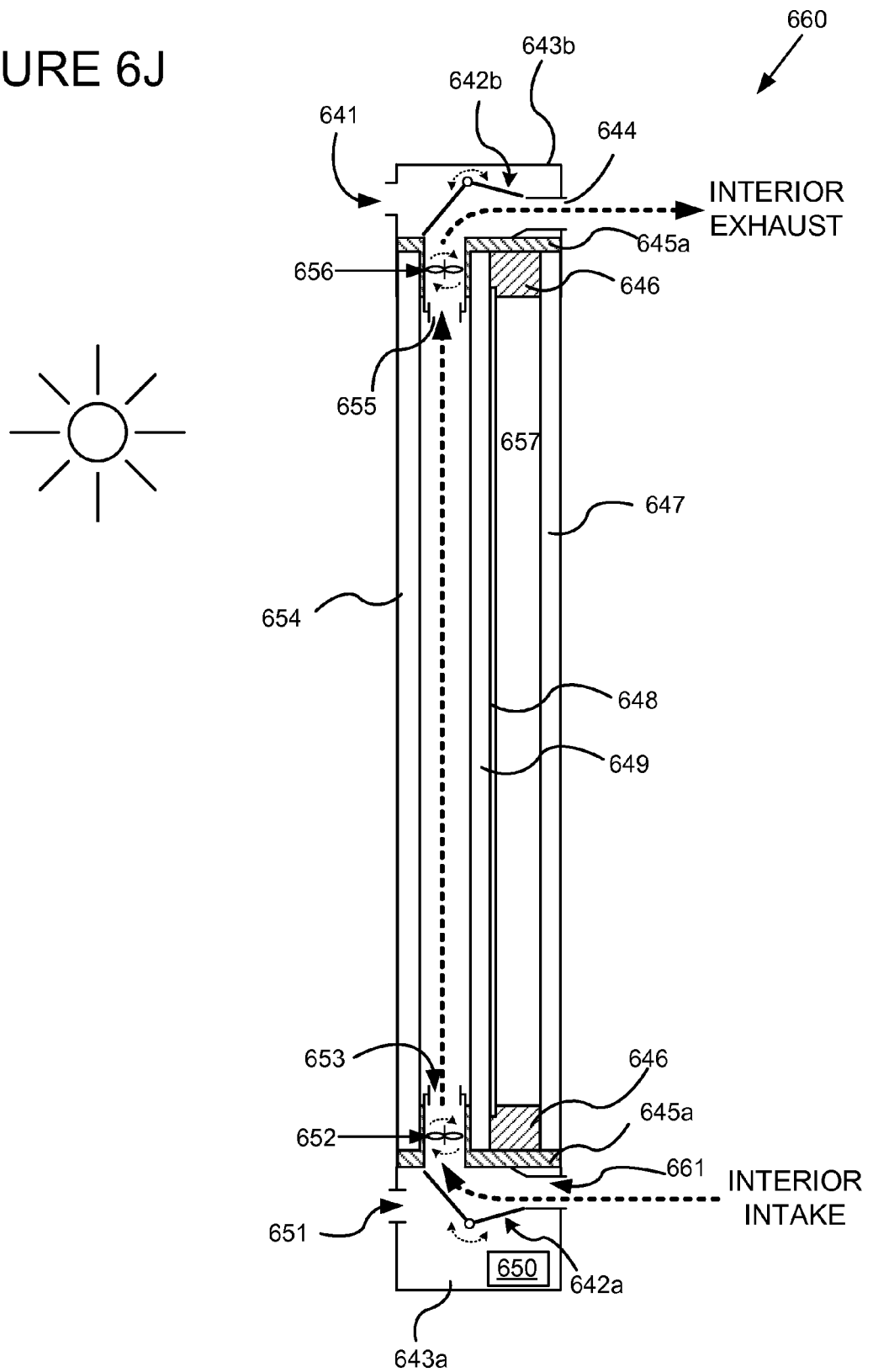
FIG. 6J is a drawing of a cross sectional view of a forced air electrochromic window depicting a mode of operation with two diverters, according to embodiments.

FIG. 6I depicts another embodiment of a simplified fabrication of a forced air electrochromic window, 640b, comprising an IGU subassembly, 665, and a frame subassembly, 666. The dotted arrow denotes the assembly of IGU subassembly 665 with frame subassembly 666 to form (denoted by large arrow) the forced air electrochromic window 640b. Forced air electrochromic window 640b comprises some of the components in forced air electrochromic window 640 described with respect to FIG. 6G. Forced air electrochromic window 640b further comprises a third lite and vent modules 643a and 643b are provided. As stated above, the third lite 654 described in relation to FIGS. 6G-6J may be provided along with a new electrochromic window, or it may be provided as a pre-existing window. Thus, assembly 640b may be applied to an existing window as an infill installation; allowing venting of the newly created volume between the existing window and assembly 640b.

In FIG. 6I, frame subassembly 666 forms a frame comprising the third lite and vent modules 643a and 643b. In this example, the sealing member (not shown) is part of frame subassembly 666. During assembly, IGU subassembly 665 is inserted into the frame subassembly 666, which is configured to receive the IGU subassembly 665. This embodiment may provide a technical advantage of convenience by providing a convergent fabrication technique where two components, IGU subassembly 665 and frame subassembly 666, are combined in a single step to form the forced air electrochromic window 640b. This forced air electrochromic window 640b may then be installed as an infill proximate a pre-existing window. Because window assembly 640b has framing all the way around the perimeter of the IGU component, the framing may be fitted inside framing of the existing window without the need, e.g., of flashing to hide perimeter elements such as setting blocks and controllers.

In an alternative embodiment, a similar frame subassembly 666 may be provided, but without the third lite. The frame subassembly 666 may be installed on a new electrochromic window, which may be provided as a single lite or multiple lites, in some cases an IGU. In one example, the new electrochromic window IGU subassembly 665 is provided together with the frame subassembly 666. This vented electrochromic IGU can then be installed proximate a pre-existing window as described herein, with the vents acting on the space between the new electrochromic IGU and the pre-existing window.

Returning to the embodiment of FIG. 6I, this embodiment may provide additional convenience of customizability in having a pre-fabricated frame subassembly 666 comprising vent modules that can be fitted with electrochromic, thermochromic or other optically switchable glass, including in IGU form, at the discretion of the end user. Moreover, in certain embodiments, the frame subassembly 666 may not have a third pane pre-installed. These embodiments may provide the technical advantage of allowing high customizability to end user. In these cases, the end user can select an IGU subassembly with a particular combination of optically switchable components and/or a third lite to be assembled into the forced air electrochromic window. In these cases, the end user can select different combinations of optically tinting components, e.g., electrochromic or thermochromic, along with the mate lite that best compliments the tinting glass component, e.g., in color, material, thickness, coated or not, and the like. Pre-fabricated frame subassemblies, such as 666, may also be prefabricated in a variety of sizes.

As mentioned above, forced air electrochromic windows of certain embodiments optionally comprise a controller. FIGS. 6G and 6J depict forced air electrochromic windows that comprise a controller 650. Although not depicted as components of the forced air electrochromic windows 640a and 640b in FIGS. 6H and 6I, controllers may optionally be included as components of these windows 640a and 640b. In some cases, the controller of the forced air electrochromic window may be located in a venting module, in the frame, in the sealing member, in the spacer, or other components internal to the forced air electrochromic window. Alternatively, a controller may be located external to the forced air electrochromic window. A controller, whether external to the venting modules or not, may be configured to control the venting functions as well as one or more electrochromic device coatings' switching functions.

In certain embodiments, a forced air electrochromic window may comprise wiring to provide electrical communication for powering and control of the electrochromic device coating. In some cases, this wiring may be combined with wiring for one or more air movement devices (e.g., fans) of the vent modules, if such air movement devices are included in the vent modules. In other embodiments, the controller and/or the electrochromic device coating may be wirelessly powered and/or controlled. In these cases, the forced air electrochromic window may be a standalone unit without needing wiring to the unit. Forced air electrochromic windows may include onboard storage such as batteries and/or supercapacitors.

In certain embodiments, a forced air electrochromic window may comprise one or more photovoltaic cells, for example, as components of the vent modules. These photovoltaic cells may be used to power and control, for example, the one or more air movement devices and/or the electrochromic coating of the IGU subassembly.

Although certain examples comprise an IGU subassembly comprising an electrochromic device coating on a single EC lite (e.g., lite 649), the IGU subassembly may be a "dual EC lite" unit comprising an electrochromic device coating on two substrates of the IGU subassembly. For example, a forced air electrochromic window may comprise an IGU that is a "dual EC lite" unit, where each of IGU lites 649 and 647 have an electrochromic device coating.

FIG. 6J is a drawing of a cross sectional view of a forced air electrochromic window, 660. Forced air electrochromic window 660 comprises an extra second diverter, 642a, in vent module 643a, thus both vent modules, 643a and 643b, have the capability to vent air flow to and from the exterior and interior of the structure and through the interior space between third lite 654 and EC lite 649.

Forced air electrochromic window 660, comprises components similar to those in forced air electrochromic window 640 described with reference to FIG. 6G. Forced air electrochromic window 660 comprises an IGU subassembly as described herein. The IGU subassembly comprises an electrochromic device coating 648 on a surface of a first lite 649, a second lite 647, and a unitary structure, 646, comprising the spacer, primary seal and secondary seal of the IGU subassembly. In other embodiments, the electrochromic device coating 648 may be provided on the second lite 647. An interior sealed volume 657 of the IGU subassembly is formed by the sealing of the mating surfaces of the spacer and the first and second lites, 649 and 647, respectively. Forced air electrochromic window 660 further comprises a third lite, 654, spaced substantially parallel to, and registered with the IGU subassembly, and affixed or adhered with sealant, and/or a sealing member, 645*a*. Forced air electrochromic window 660 further comprises two vent modules, 643*a* and 643*b*, comprising air movement devices 652 and 656 respectively, depicted in the form of fans. Vent module 643*a* comprises first, second, and third second apertures, 651, 653, and 661, respectively, which allow air to pass through the vent module 643*a*. Vent module 643*a* further comprises a controller 650 and a first diverter 642*a*, which swivels on a pivot as depicted. Vent module 643*b* comprises first, second, and third apertures, 655, 641 and 644, respectively. Vent module 643*b* further comprises a second diverter, 642*b*, which swivels on a pivot as depicted. First diverter 642*a* allows air movement through apertures 653 and 661 when the diverter 642*a* is in a second position (depicted in FIG. 6J), or through 651 and 653 when the diverter 642*a* is in a first position. Second diverter 642*b* allows air movement through apertures 641 and 655 when the diverter 642*b* is in a first position or through apertures 655 and 644 when the diverter 642*b* is in a second position. In FIG. 6J, the second diverter 642*b* is in a second position.

The forced air electrochromic window 660 in FIG. 6J is depicted in the interior intake-interior exhaust mode of operation, which is one of at least four modes of operation of the forced air electrochromic window 660. This configuration may be particularly useful in the context of infill windows, because the exterior intake and exhaust can be omitted, which means that a new electrochromic window can be installed proximate a pre-existing window without modifying the pre-existing framing components. In such cases, the diverters may be omitted. In other cases, existing framing may allow, or may be modified to allow, the intake and exhaust components to vent to the exterior of the building, in which case the diverters may be more useful. To configure the forced air electrochromic window 660 in this interior intake-interior exhaust mode, the first diverter 652*a* is moved into a second position and the second diverter 652*b* is moved into a second position. To configure the forced air electrochromic window 660 in an exterior intake-exterior exhaust mode, the first diverter 652*a* is moved into the first position and the second diverter 652*b* is moved into the first position. To configure the forced air electrochromic window 660 in an interior intake-exterior exhaust mode, the first diverter 652*a* is moved into the second position and the second diverter 652*b* is moved into the first position. To configure the forced air electrochromic window 660 in an exterior intake-interior exhaust mode, the first diverter 652*a* is moved into the first position and the second diverter 652*b* is moved into the second position.

Referring back to FIG. 6J, in another mode of operation, interior air is pulled into vent module 643*a* with air movement device 652 and/or air movement device 656 and the diverter 642*b* is in the second position to allow air to exhaust through apertures 655 and 644 to the interior of the structure. In this mode of operation, air is pulled in from an interior intake as depicted by the dotted arrowed line. Air passes through third aperture 661 and second aperture 653 of vent module 643*a*, through the interior space between first lite 649 (EC lite) and third lite 654, and then exits through the first aperture 655 and third aperture 644 of vent module 643*b* to the interior of the structure at the interior exhaust as depicted by the dotted arrowed line.

This mode of operation depicted in FIG. 6J may be useful, e.g., on a sunny but very cold winter day, where interior air would efficiently cool the EC device (once warm), and the warm air produced would be beneficial to help warm the interior of the structure. Also, this configuration has the added benefit of using interior air to initially warm first lite 649 which may aid in faster tinting of the EC device. Once tinted to block the Sun's energy, first lite 649 may become very warm or hot, and thus the interior air may be further used to cool the EC lite 649, and then the warmed air may be exhausted to the interior to help warm the interior of the structure.

In certain embodiments, a forced air electrochromic window includes at least one electrical energy generator. The electrical energy generator may be a typical electrical generator which is driven by a turbine. The turbine may be one of the air movement devices. For example, referring to FIG. 6J, air movement device 652 may be an electric fan, while air movement device 656 is a turbine connected to the shaft of an electrical generator (not shown). Air movement device is actively powered to force air through the vented volume and the air thus heated after traversing the interior volume spins the turbine 656 in order to generate electricity. The electricity may be stored in a battery (not shown) e.g., in one of the venting modules. In this way the removal of heat from the electrochromic assembly may be used not only, e.g., for heating the interior of the building but also to generate (and store) a supply of electricity to aid in, e.g., switching the electrochromic device film and/or powering the (active) air movement device 652. One embodiment is an apparatus as described herein, further including an electrical generator and optionally a storage battery to store the electricity generated by the generator. In certain embodiments, the electricity generated is used to power the EC controller and/or air movement devices of the apparatus. The electricity may be used directly or stored in a battery before being used.

One of ordinary skill in the art would appreciate that the various modes of forced air movement with windows described herein do not have to be, e.g., in the precise flow paths outlined. For example, using window 660, the four modes of circulation described, exterior intake-exterior exhaust, interior intake-exterior exhaust, exterior intake-interior exhaust and interior intake-interior exhaust, may be implemented in a number of ways and combinations. For example, in one embodiment, e.g., on a very cold sunny day where the EC lite 649 is not yet tinted, interior air may be forced through the interior space between lites 654 and 649 in order to warm EC lite 649 to make switching more facile than it otherwise would be. In this embodiment, the interior air used to warm EC lite 649 is vented either to the exterior for a period of time. The EC device coating, 648, is tinted to absorb the solar radiation. A sensor measures the temperature of the exhaust air. When the temperature of the exhaust air reaches a pre-determined level, e.g., warmer than the interior air, then the exhaust air is diverted into the interior to warm the interior. Another temperature sensor, inside the structure, e.g., a thermostat, may reach a level that is higher than the comfort level set by an occupant. This may trigger the window's diverter to again direct the exhaust flow to the exterior of the building. Thus, e.g., controller 650 may have logic to automatically carry out the commands to the appropriate diverter(s) of the window based on temperature inputs and/or user settings.

In a related embodiment, a hollow grid may be positioned in the pocket between the pre-existing window and the new window, and air/gas may be optionally forced to move through this grid. FIG. 6F illustrates one example of such a grid. In these embodiments, the pocket may be either vented or sealed. One advantage of this approach is that a large window can be made to appear as several smaller windows. Such internal grids are not typically used with electrochromic IGUs because they are likely to damage an electrochromic device if placed into contact with the device. In infill retrofitting applications, however, the pocket between the pre-existing window and the new window is often free of any electrochromic devices, so there is no risk of damaging the device by including a grid in this region. The grid may attach to the pre-existing window and/or the new window, for example through adhesives. In these or other cases, the grid may be secured using support members that may be installed in a window recess (e.g., as part of a wall, floor, ceiling, sill, frame, transom, mullion, etc.). In some other cases the grid may sit between a pre-existing window and a new window, without any additional support. Forced air through the grid may be used to cool the pocket, for example the grid may be constructed of an efficient heat conductor such as aluminum. Cool air is passed through the grid so as to aid in removing heat from the pocket. The heated air exiting the grid may be used to heat the interior of the building or expelled to the exterior of the building. In other embodiments, heated air may be circulated through the grid to keep the pocket warm, e.g., to aid in forming a thermal barrier to heat loss from the interior of the building and/or to aid an electrochromic coating in the infill IGU to switch in colder weather. In certain embodiments, warm or cool air may be passed through the grid to apply cooling or heating to the pocket in order to mitigate thermal shock in the infill application. A more detailed description of mitigation of thermal shock follows.

(ii) Wiring Considerations

In many embodiments, a new electrochromic window is powered via an electrical connection. This electrical connection may be made via wires or other connectors. The wires or other electrical connectors may be positioned within and/or pass through an inner frame surrounding the electrochromic window. They may also be positioned within and/or pass through an infill frame. Further, the wires or other electrical connectors may be positioned within and/or pass through the separation space between the new electrochromic window and the pre-existing window, including for example within a spacer separating the new window from the pre-existing window. In this embodiment, a cover may be provided between the new window and the pre-existing window to obscure or hide the wires, other connectors, spacer, etc. Details related to wiring in the context of an electrochromic IGU are further discussed in U.S. patent application Ser. No. 14/196,895, which is incorporated by reference above.

(iii) Wet Laminating

In some implementations, an electrochromic or other optically switchable device may be introduced to a pre-existing window using wet lamination techniques. Such techniques may generally involve placing an electrochromic lite (e.g., a lite having an electrochromic device thereon) in close proximity with a pre-existing lite and introducing a liquid adhesive material between the electrochromic lite and the pre-existing lite and allowing the adhesive material to set. In various cases the adhesive material may be cured, for example via heating, catalyst, and/or exposure to UV radiation.

In order to prevent the adhesive material from spilling out from between the lites, tape or another barrier may be provided along/near the perimeter of the windows. This tape/barrier keeps the adhesive material between the lites, where it is desired. The separation distance between the pre-existing lite and the new optically switchable lite is typically quite small, for example between about $1/32$ and $1/8$ inch. In one example, the separation distance is about $1/16$ inch or less. In order to introduce the adhesive material to the gap between the pre-existing window and the new window, a long thin tube/nozzle may be provided. This tube/nozzle may move within the gap to uniformly distribute the adhesive material.

Example adhesive materials include, but are not limited to, liquid resins, liquid ethylene vinyl acetate (EVA), etc. In some cases, an adhesive material may impart a desirable characteristic to the retrofit window, for example an optical property such as color, opacity, scattering, and/or reflectivity. Wet lamination techniques are further described in U.S. Pat. No. 8,164,818, which is hereby incorporated by reference in its entirety.

B. Custodial Infill Designs

Custodial versions of the infill design have two primary considerations: (1) the frame designs for the optically switchable window and for the pre-existing window, and (2) a mechanism for wiring the optically switchable window to a controller or other source of power and data.

(i) Framing Considerations

The custodial design will typically include a structure to allow the new optically switchable window to move away from the pre-existing window to allow access to the interior space between the two windows. In one embodiment, a hinge may be provided on any of the four sides of the new optically switchable window and a frame or other structure supporting the new window. The hinge allows the new window to swing open away from the pre-existing window. In another embodiment, the new electrochromic window may slide open to allow access to the pre-existing window behind the new window. The sliding may occur in a direction within the plane of the window.

Regarding the framing of the custodial-type designs, in various embodiments there will be an interior frame around the optically switchable window and an exterior frame that it mates with. The exterior frame may be affixed to the building structure around the pre-existing window. One feature of the existing building structure that may be widely used in the custodial (and non-custodial) infill versions involves a mullion, which is a large extruded piece of e.g., aluminum that is often hollow and defines a vertical boundary between two windows. Another feature of the existing building structure that may be used involves a transom, which is a large extruded piece of material that is often hollow and defines a horizontal boundary between two windows. The interior and/or exterior frames can be built into the space defined between adjacent mullions and transoms. FIGS. 7A, 7B, 8A, and 8B, below, illustrate an embodiment having an interior frame (referred to as an inner frame) around the new electrochromic window and an exterior frame that mates with the inner frame, and which is affixed to a building (not shown) proximate a pre-existing window. The inner frame and the exterior frame are most easily seen in FIG. 7B.

In some cases, the installation process for installing a new window in a custodial infill design may be completed without pressing outward on the pre-existing glass. For the reasons discussed above, such methods may be safer than methods that involve pressing outward on the pre-existing glass. The techniques discussed above in relation to non-custodial designs may also apply to custodial designs. For example, the various frames may be installed in a manner that engages with the structure(s) that form the window recess (e.g., walls, ceilings, floors, sills, frames, mullions, transoms, etc.), rather than engaging with the glass of the pre-existing window.

(ii) Wiring Considerations

Regarding the wiring, various implementations are available. The wiring is provided to supply power to the new electrochromic window such that the electrochromic device(s) can undergo optical transitions. In custodial infill designs, the wiring should be configured in a way that permits movement of the new electrochromic window. As mentioned with regard to the non-custodial infill embodiments, the wiring may be located in/pass through various components including, for example, an inner frame surrounding the new optically switchable window, an exterior frame supporting the new window, a spacer between lites of the new window, etc.

In one embodiment shown in FIGS. 7A, 7B, 8A, and 8B, the new optically switchable IGU 703 opens up by swinging on hinges. Wiring 715 passes through a hollow pin/cylinder 716 that forms a part of the hinge. The hollow pin 716 extends between a frame 706 associated with the new optically switchable IGU 703 and an exterior frame 707 affixed to the pre-existing window curtain or other structure (e.g., the mullion, transom, etc.). The pre-existing window curtain or other structure holds a pre-existing window 702 (visible in FIG. 8B).

Figure 7A:
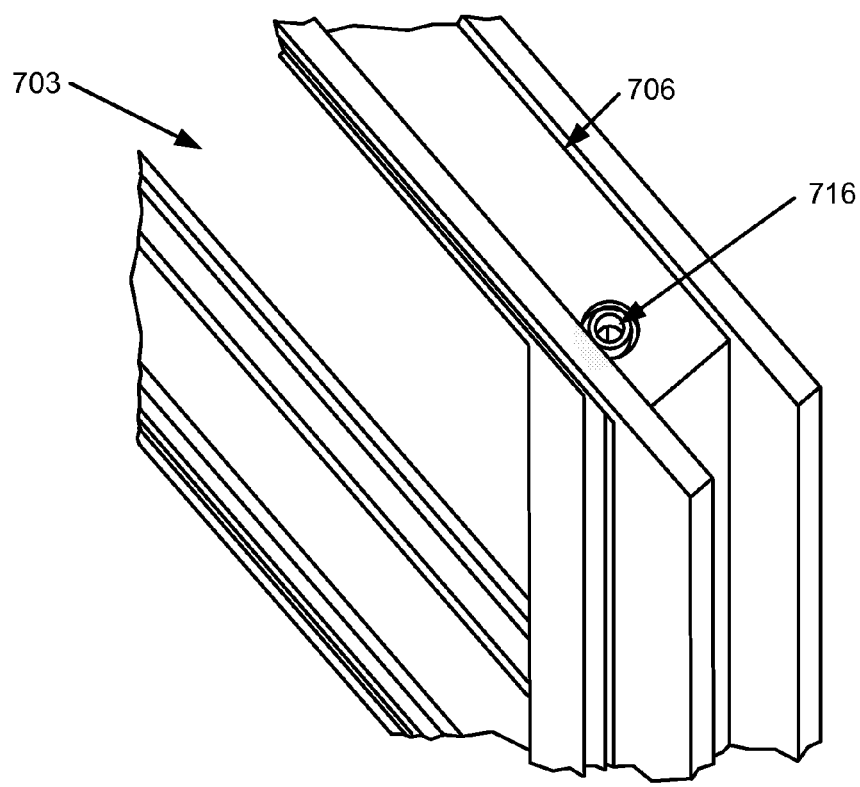
FIGS. 7A, 7B, 8A, and 8B show embodiments where a new electrochromic IGU is provided in an inner frame that mates with an exterior frame that is adapted to fit in a pre-existing window recess.

FIG. 7A shows one possible location of the hollow pin 716 on the inner frame 706 for the new optically switchable IGU 703.

Figure 7B:
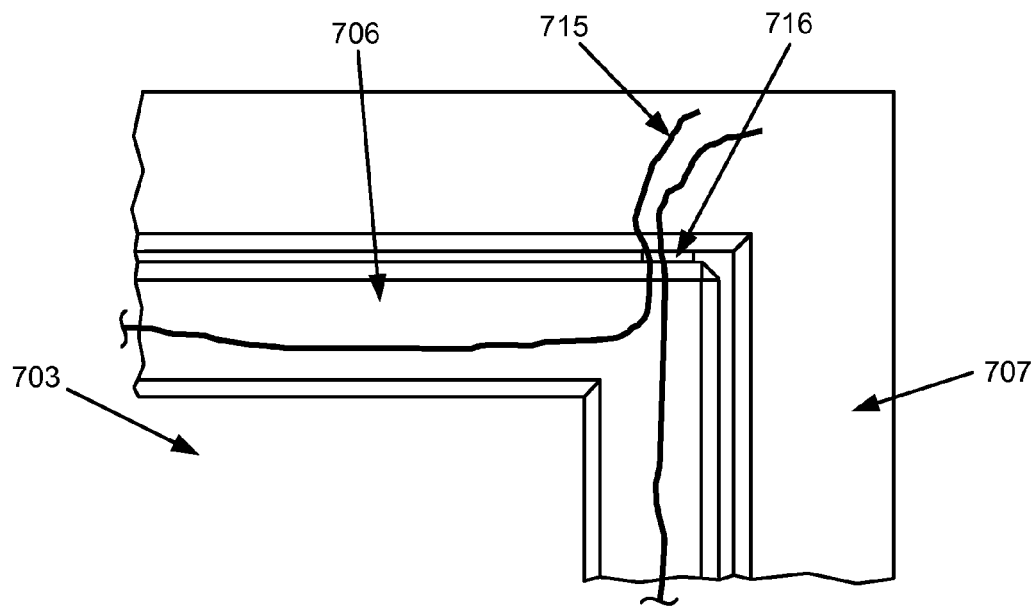

FIG. 7B shows the inner frame 706 surrounding the new optically switchable IGU 703 supported in the exterior frame 707 attached to the building (not shown). The hollow pin 716 forms a portion of the hinge structure, and extends from the exterior frame 707 to the inner frame 706. Wires 715 pass from the exterior frame 707, through the hollow pin 716, and into the inner frame 706, where they can be routed to provide power to bus bars on the new optically switchable IGU 703.

Figure 8A:
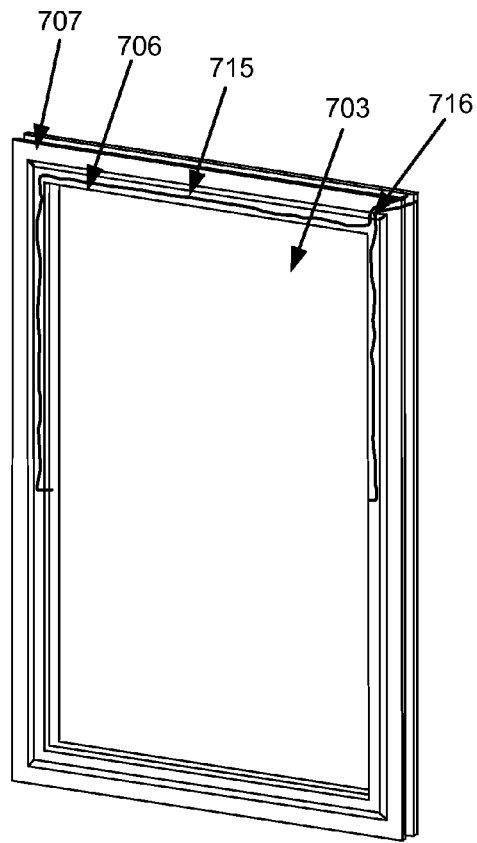
Figure 8B:
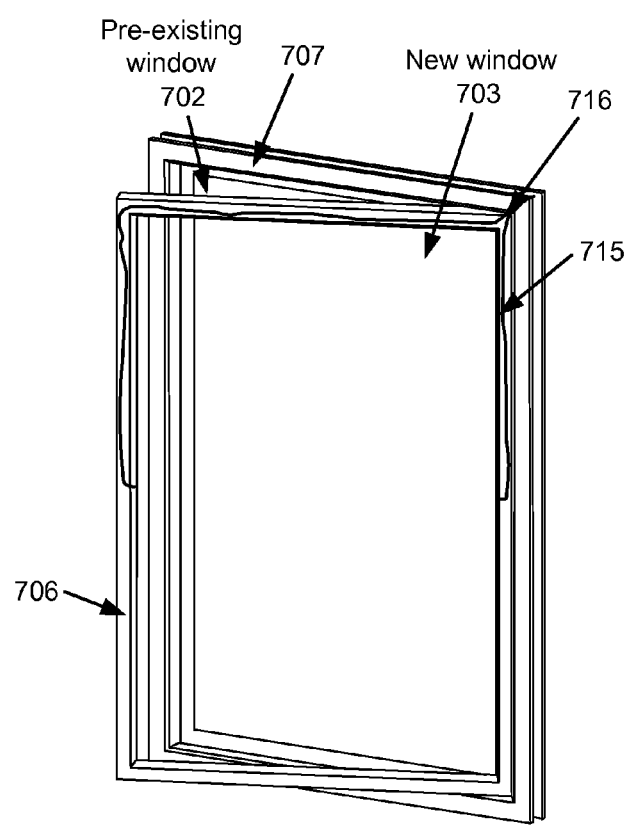

FIGS. 8A and 8B show the embodiment of FIGS. 7A and 7B where the new optically switchable window 703 is in a closed position (FIG. 8A) and where the new optically switchable window 703 is in an open position (FIG. 8B). In FIG. 8B, the pre-existing window 702 is visible behind the open new optically switchable window 703.

FIGS. 7A, 7B, 8A and 8B illustrate an embodiment in which the new optically switchable IGU 703 swings open for custodial access. There is an inner frame 706 that surrounds the perimeter of the new optically switchable IGU 703 and an exterior frame 707 in which the inner frame 706 is oriented. Each frame 706 and 707 may be a piece of extruded metal or other material. A set of hinges allows the inner frame 706 to swing into/out of the exterior frame 707. One or both hinge structures may include a hollow pin/cylinder 716 through which wiring 715 may pass from the exterior frame 707 to the inner frame 706. The new optically switchable window 703 may swivel about this pin/cylinder 716. The wiring 715 may be positioned within, or at least pass through, hollow spaces in each of the inner and exterior frames 706 and 707, respectively. The wiring 715 in the inner frame 706 connects with the bus bars to power optical transitions on the new optically switchable IGU 703. The wiring 715 may pass through or under a spacer (not shown) that separates panes of an optically switchable IGU 703, or another structure may be provided to pass electricity through the spacer. In other embodiments the new window optically switchable IGU 703 may be a laminated optically switchable device having only a single pane, and no spacer is present in the new window. The wiring 715 in the exterior frame 716 may connect with a controller, external power source, etc.

The wiring may all pass through a single hinge, or through multiple hinges. For example, while the figures above show wires passing only through a single hinge at the top right of the windows, in similar embodiments wiring may pass through hollow pins/cylinders in both the top and bottom hinge structures. Further, in certain embodiments the optically switchable window may swing open from the top or bottom, and the hinges may be positioned on the sides of the windows to allow such movement. In this case the wiring may pass through one or both of the hinges on the sides of the windows.

In another embodiment, wires are passed through a framing component in the inner frame around the new optically switchable window, but the wires do not pass directly through a hinge point. The wires may pass into the inner frame on the same side as the hinge, such that the wires experience only minimal movement when the new window is opened. The wires may pass directly into a side of the inner frame. Similarly, U.S. Pat. No. 8,643,933, which is hereby incorporated by reference, describes methods for providing power to a movable electrochromic window. In one example, the window opens on a hinge, and electricity is provided to the window via a ribbon cable. In another embodiment, the window that slides open only receives power when in a closed position. In another embodiment, the window slides open and power is provided through rails at the sides of the window. These examples are explained in further detail in U.S. Pat. No. 8,643,933.

III. Local Controllers

In various embodiments, a new optically switchable window may be provided/installed with a controller that is local to the new window. Where multiple new electrochromic windows are provided, each window may have an individual local controller. Local controllers are beneficial for a number of reasons including better control of individual windows, reduced line loss, etc. Window designs incorporating local controllers are further discussed in U.S. Pat. No. 8,213,074, and U.S. Provisional Patent Application No. 62/085,179, which are herein incorporated by reference in their entireties. Window controllers are further discussed in the following Applications, each of which is hereby incorporated by reference in its entirety: U.S. Provisional Patent Application No. 61/991,375, filed May 9, 2014, and titled "CONTROL METHOD FOR TINTABLE WINDOWS"; P.C.T. Patent Application No. PCT/US15/29675, filed May 7, 2015, and titled "CONTROL METHOD FOR TINTABLE WINDOWS"; P.C.T. Patent Application No. PCT/US14/43514, filed on Jun. 20, 2014 and titled "CONTROLLING TRANSITIONS IN OPTICALLY SWITCHABLE DEVICES"; and U.S. Provisional Patent Application No. 62/248,181, filed Oct. 29, 2015, and titled "CONTROLLERS FOR OPTICALLY-SWITCHABLE DEVICES." In many cases, the local controller includes circuitry for driving and controlling optical transitions on the optically switchable window. One or more memory components may also be provided in the local controller, for example to store information relevant to the associated IGU (e.g., size, optical switching parameters, lifetime information, cycling information, etc.). In a number of cases, a local controller may include one or more sensors (e.g., interior and/or exterior light sensors, occupancy sensors, motion sensors, interior and exterior temperature sensors, etc.). Various other components may be provided as desired.

In one example, the controller is provided as part of the IGU of the new optically switchable window. In another example, the controller is provided in the inner frame associated with the optically switchable window. In another embodiment, the controller may be provided as a mountable unit that can be mounted on a lite of the new window. In certain cases, the controller may be provided outside the optically switchable window and its frame. In one example, the controller is provided in the exterior frame adjacent to the mullion as shown in FIG. 2, for instance. In yet another approach, the controller could be provided at a region remote from both the optically switchable window and its frame and the exterior frame that it mates with. For instance, the controller may be mountable on a wall proximate the window. In some cases a ribbon cable or other electrical connection feeds up through the interior of the mullion, or similarly, sideways through a transom.

Figure 9:
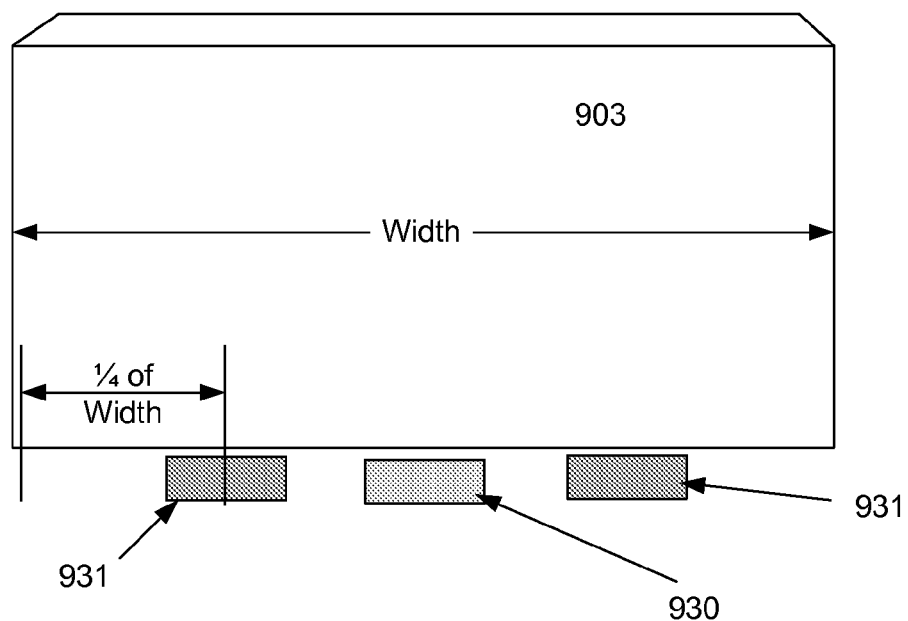
FIG. 9 illustrates a new electrochromic IGU that may be installed in a pre-existing window recess, with setting blocks and a local controller provided below the new electrochromic IGU.

In one particular embodiment shown in FIG. 9, a controller 930 is positioned within a frame (e.g., inner frame, exterior frame, infill frame, etc.) supporting a new electrochromic window 903, between setting blocks 931 that support the new electrochromic window 903 within the frame. In FIG. 9, only the new electrochromic window 903, two setting blocks 931, and a local controller 930 are shown. The pre-existing window, as well as all framing components, are omitted. In certain embodiments, the setting blocks 931 and/or controller 930 may be hidden by a covering, as shown and described in relation to FIG. 3B, for example.

In one embodiment, the controller hidden behind the covering (and from the exterior view, hidden by the existing window frame, e.g.) may have one or more manual controls that are accessible via one or more apertures in the covering that register with the one or more manual controls. In other embodiments, a portion of the covering may include a touch control panel, such as a thin stick on type control pad, which is wired through the covering and to the controller between the setting blocks. In one embodiment, as a step in the installation process the controller is placed in the desired (final) position, the covering cut for that side of the installation, the touch pad applied to that portion of the covering including making an aperture for the wiring through that portion of the covering. The wiring connection from the control pad to the controller is established and then the covering applied to conceal the setting blocks and controller. In yet other embodiments, the covering portion along the side having the controller in between the setting blocks does not cover all or a portion of the controller, and the controller may have manual controls thereon and/or is communicated with wirelessly. In other embodiments, the covering completely conceals the controller and no apertures are provided, but the covering is transparent to wireless control signals transmitted to and from the controller.

In certain implementations, the controller may be combined with the spacer piercing pressure valve described herein. Because the spacer piercing pressure valve typically stays in place after piercing an infill spacer, it may be advantageous to implement this tool together with the controller, which can also remain installed in a retrofitted window. In such embodiments, the combined tool/controller may be designed to fit in the region between the infill spacer and the edge of the window recess. The combined tool/controller may reside partially or wholly between the adjacent panes of the pre-existing window and the new window. The bulk of the combined tool/controller would reside outside of the region bounded by the infill spacer, with just the needle on the spacer piercing pressure valve portion of the combined tool/controller extending through the infill spacer. The tool/controller may remain behind one or more framing elements/retainer clips/coverings/etc. that hide it from view.

A. Onboard Controllers

In some embodiments, the local window controller may be provided onboard a new window. In such examples, the controller may be positioned such that it is attached directly to the new window. In some cases, the controller is mounted on a pane of the new window. The controller may be positioned such that it is accessible or non-accessible by a user. In some cases, the controller may be positioned wholly or partially between panes of a new window implemented as an IGU. The controller may or may not extend beyond the edges of the IGU. In some cases, the controller may be positioned wholly or partially within a secondary seal that surrounds an IGU spacer. Onboard controllers may simplify installation of infill optically switchable windows since there is no need to separately install the window controller. Further, it may be particularly convenient to ensure that the new optically switchable window is configured to receive communication and/or power wirelessly. Wireless communication and power delivery can be used to minimize or eliminate the need to run wires to the new optically switchable window. Wireless power delivery is further discussed in U.S. patent application Ser. No. 12/971,576, filed Dec. 17, 2010, and titled "WIRELESS POWERED ELECTROCHROMIC DEVICES," which is hereby incorporated by reference in its entirety.

In one example a new window is an optically switchable window having an onboard controller configured to receive wireless power and wireless communication. This new window can be installed onto a pre-existing window, for example using the method shown in FIG. 4A (or any of the other methods described herein). The new window will be usable without having to install any wires running to the window. This greatly simplifies installation/setup of new electrochromic windows. In some cases, the window controllers may auto-configure themselves using a mesh network or similar network technology, as described in U.S. Provisional Application No. 62/085,179, which is incorporated by reference herein in its entirety. In another example a new window is an optically switchable window having an onboard controller configured to receive wireless communication. This new window can be installed onto a pre-existing window, for example using the method shown in FIG. 4A (or any of the other methods described herein). Power lines may be installed to bring power to the onboard window controller and power optical transitions on the new window. Advantageously, there is no need to install any communication wires in this embodiment.

IV. Spacer Piercing Pressure Valve

As described above, in certain embodiments a special tool may be used to remove air from a pocket that is formed between a pre-existing window and a new window installed adjacent to the face of the pre-existing window. FIG. 5A illustrates one example of such a tool, which may be referred to as a spacer piercing pressure valve 500. The tool operates by using a hollow needle 502 (sometimes referred to herein as a tube) to pierce through a spacer (e.g., an infill spacer positioned between a pre-existing window and a new window) and attaching the vacuum port 504 on the body 503 to a vacuum pump to remove air from the pocket. The spacer piercing pressure valve 500 includes a check valve 506 to ensure that gas passes through the tool in only one direction. The spacer piercing pressure valve 500 may remain in place after the pocket is brought to sub-atmospheric pressure, and even after installation of the new window is complete. When left remaining after installation of the new window, a spacer piercing pressure valve 500 can be used during maintenance of the window, for example, to remove moisture from the pocket, to introduce inert gas into the pocket, etc.

The body of a spacer piercing pressure valve may be constructed of any suitable material, though typically it is made of aluminum. It may also be constructed of plastic, though the needle portion is typically steel, such as stainless steel.

FIG. 5C illustrates the spacer piercing pressure valve 500 piercing through an infill spacer 534 positioned between a pre-existing window 530 and the first pane 536 of the new window 535. The new window 535 also includes a second pane 537, which is separated from the first pane 536 by an IGU spacer 538. FIG. 5D illustrates a similar setup. In FIG. 5D, a few additional features are shown including the sealing boss and PIB sealant thereon, as well as an adhesive provided between the new window and the spacer piercing pressure valve. In this example, the spacer piercing pressure valve physically contacts an edge of the new window, with adhesive joining them together. While both FIGS. 5C and 5D show the spacer piercing pressure valve below the panes of the windows, it is understood that these figures may represent any edge of the windows. In various cases a spacer piercing pressure valve may pierce an infill spacer on a top portion, side portion, or bottom portion of the spacer. Of course, multiple spacer piercing pressure valves may also be provided, optionally at different locations around the perimeter of the windows.

Needle 502 may have a diameter that is (a) sufficiently large to allow for rapid removal of air from the pocket between the pre-existing window and the new window, and (b) sufficiently small to fit through the relevant spacer while ensuring good seal/leakage characteristics. Needles that are too small will prolong the duration of the evacuation process, while needles that are too large may not fit through a spacer, or may encounter other problems. In certain implementations, the needle 502 may have a diameter between about 0.05-0.25 inches, for example about 0.125 inches in one embodiment. Example durations for pumping down the pressure in the pocket are provided above. In certain embodiments, the needle 502 may be provided with a sealing boss (not shown in FIG. 5A) that may include sealant (e.g., PIB or a similar sealing material) to ensure formation of an air tight seal through the infill spacer. An example sealing boss is shown in FIG. 5E, discussed further below.

The spacer piercing pressure valve may further include a capillary tube 508 (sometimes referred to as a pressure drop path) that permits gas to flow in either direction. The capillary tube 508 functions to accommodate changes in volume for the air/gas within the pocket between the pre-existing window and the new window. For example, as the window is exposed to solar radiation, the air/gas between the pre-existing window and the new window may expand in volume. In order to accommodate this change, air/gas may pass through the needle 502 of the spacer piercing pressure valve 500, and out through the capillary tube 508. Conversely, as the air/gas in the pocket cools down and contracts in volume, additional air/gas may flow through the capillary tube 508 into the pocket. The capillary tube 508 is typically very small and/or tortuous such that a significant pressure drop is achieved across the capillary tube 508. For instance, the capillary tube 508 may have an inner diameter of between about 0.01 inches to 0.02 inches and a length between about 6.0 and 12.0 inches in one embodiment. The inner diameter of the capillary tube 508 is generally much smaller than the inner diameter of the needle 502. This difference in diameter helps ensure that the pressure in the pocket can be reduced (using the vacuum pump) and maintained at a sub-atmospheric pressure for at least as long as it takes to set any seals/adhesives and install any framing components. In certain embodiments, the inner diameter of the capillary tube 508 is less than about 1000% of the inner diameter of the needle 502, or otherwise uses the inner diameter of conventional capillary tubes used to vent IGUs. The small diameter of the capillary tube also ensures that little to no condensation is able to enter the pocket as the volume of the pocket equilibrates with changing atmospheric pressure and thermal expansion/contraction.

The capillary tube 508 may vent to the interior or exterior of the building in some cases. It may be advantageous to vent to the interior (vs. exterior) of the building because the air on the interior of the building is more controlled in terms of humidity, temperature, pollutants, etc. In certain cases, it may be advantageous to the exterior of the building if the exterior environment has cold and/or dry air. This venting to the exterior may help keep the pocket between the pre-existing window and the new window dry or help dry out any moisture that has condensed in the pocket. In some other cases, the capillary tube 508 may vent to a balloon (not shown) that may expand and contract as needed. The balloon can be used to form a closed system, where the air transfers between (a) the pocket between the pre-existing window and the new window, and (b) a balloon in fluid communication with the capillary tube 508. This configuration allows for tight control over the gas that enters the pocket.

Figure 5B:
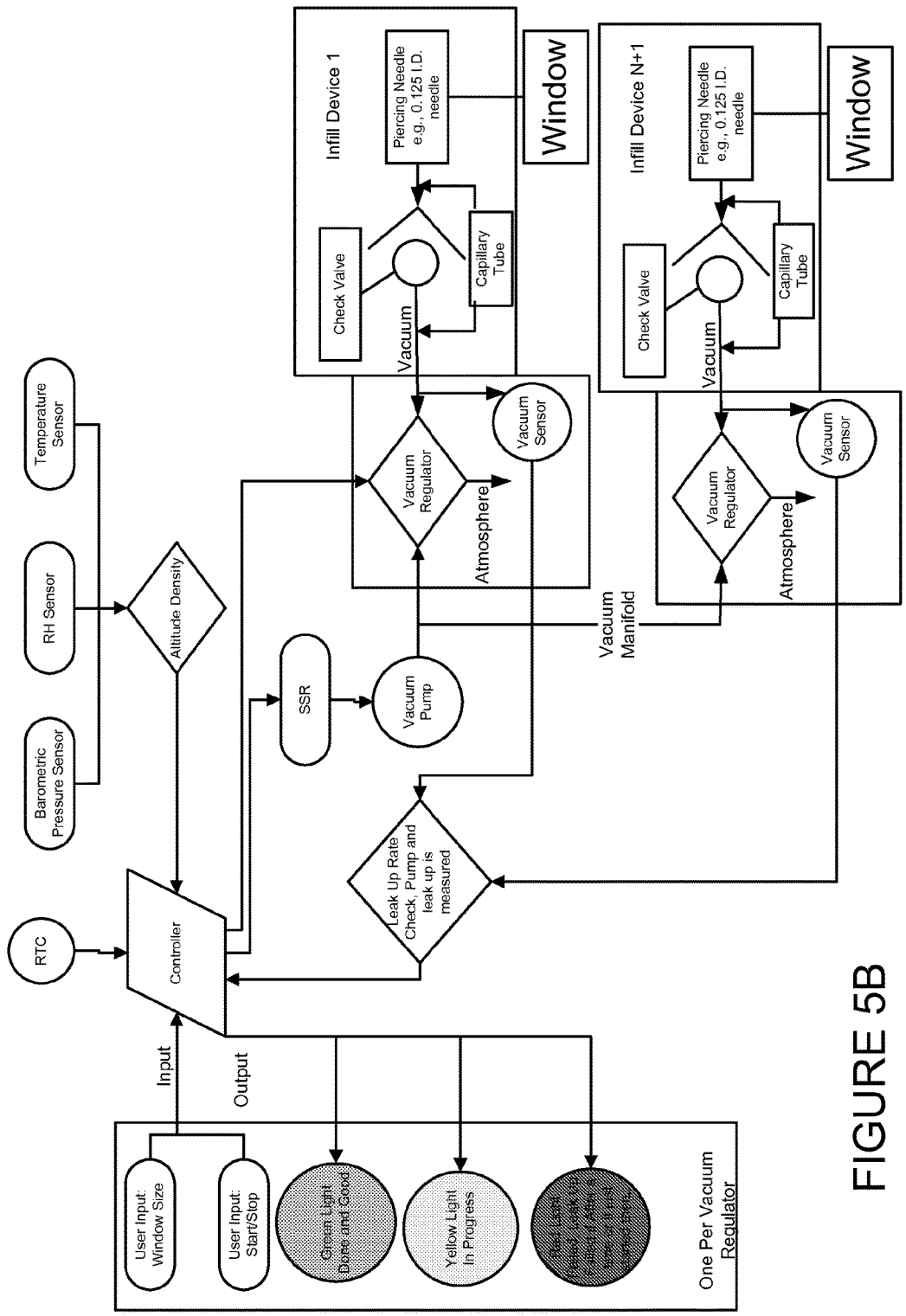
FIG. 5B illustrates a feedback system that may be used when installing a new electrochromic window proximate a pre-existing window.
Figure 5C:
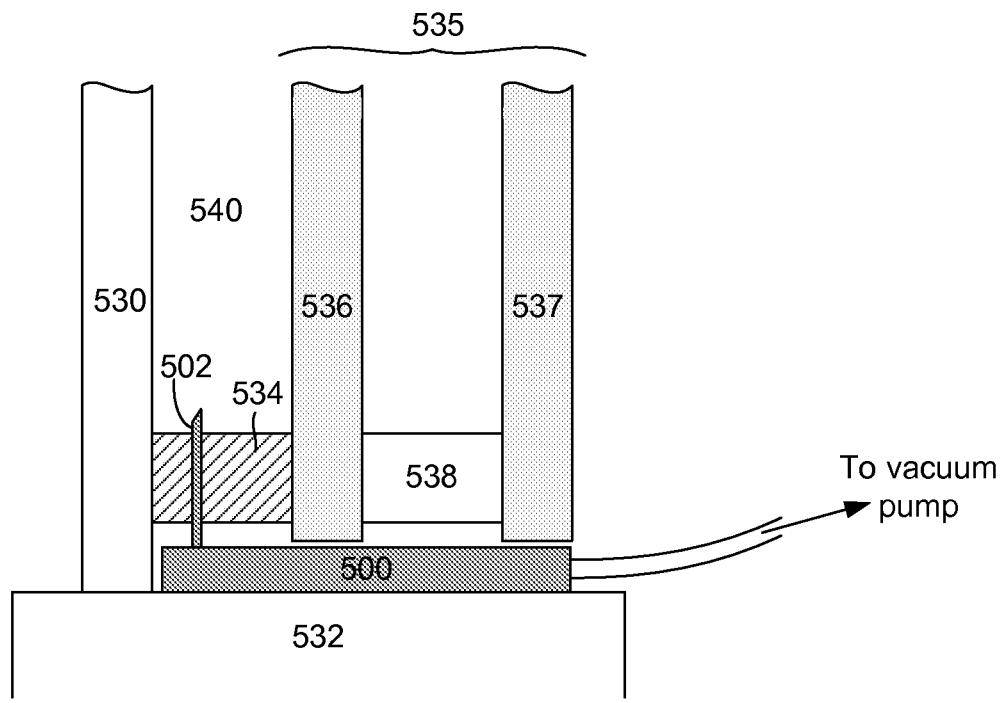
FIGS. 5C and 5D depict a spacer piercing pressure valve piercing through a spacer positioned between a new electrochromic window and a pre-existing window.
Figure 5D:
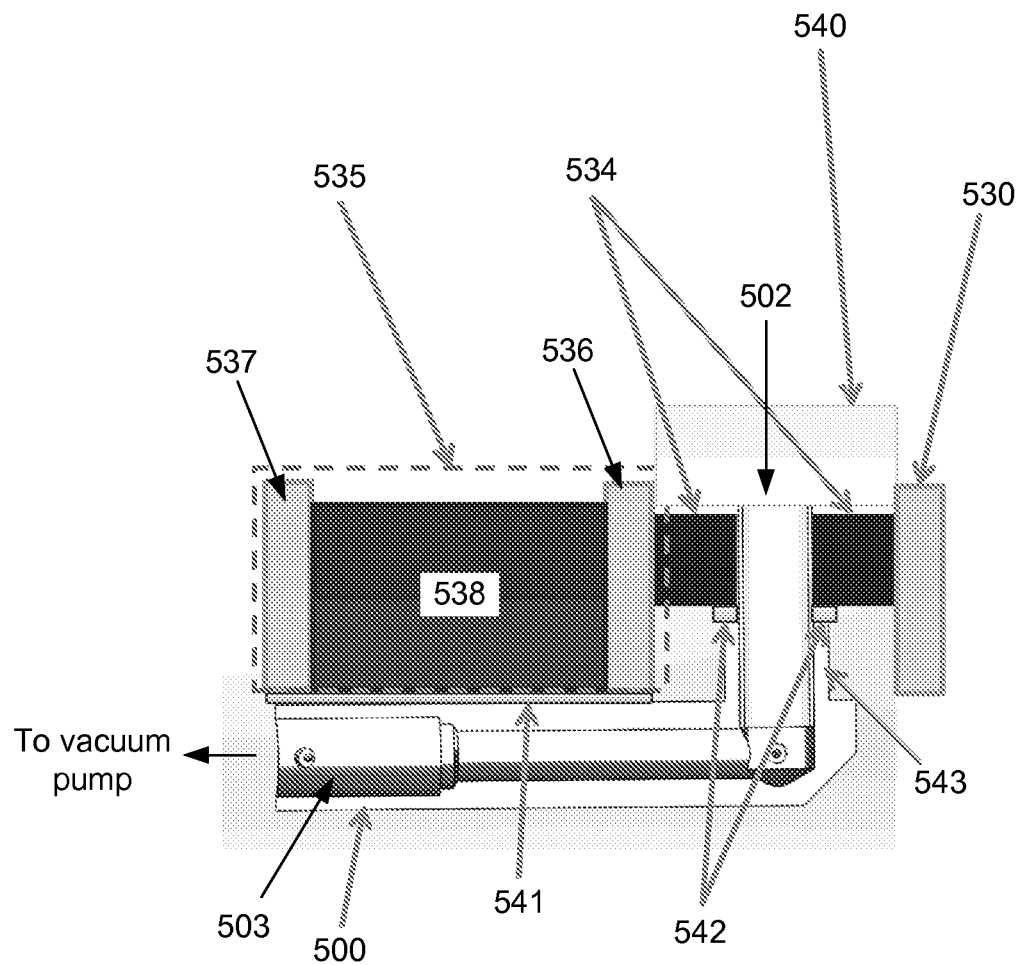
Figure 5E:
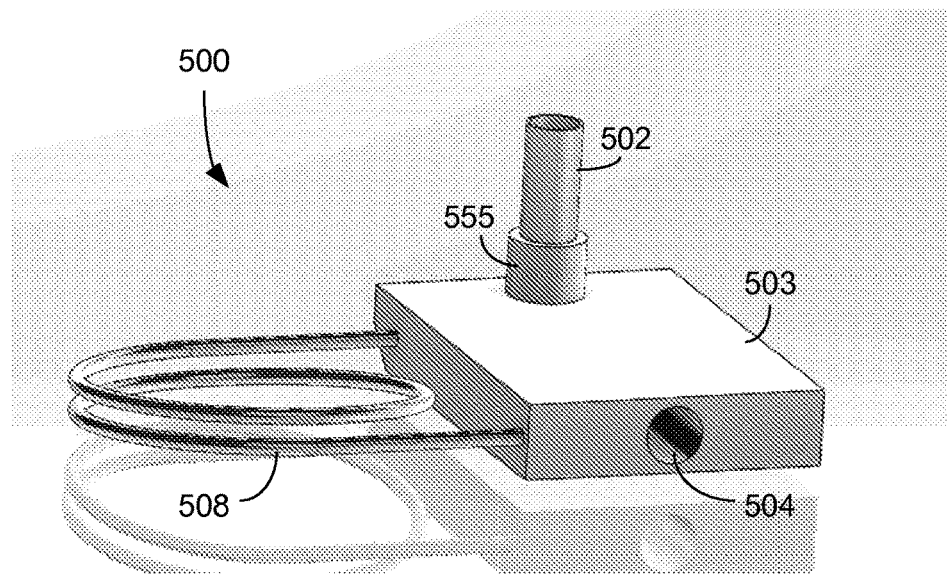
FIGS. 5E-5H show an additional embodiment of a spacer piercing pressure valve.
Figure 5F:
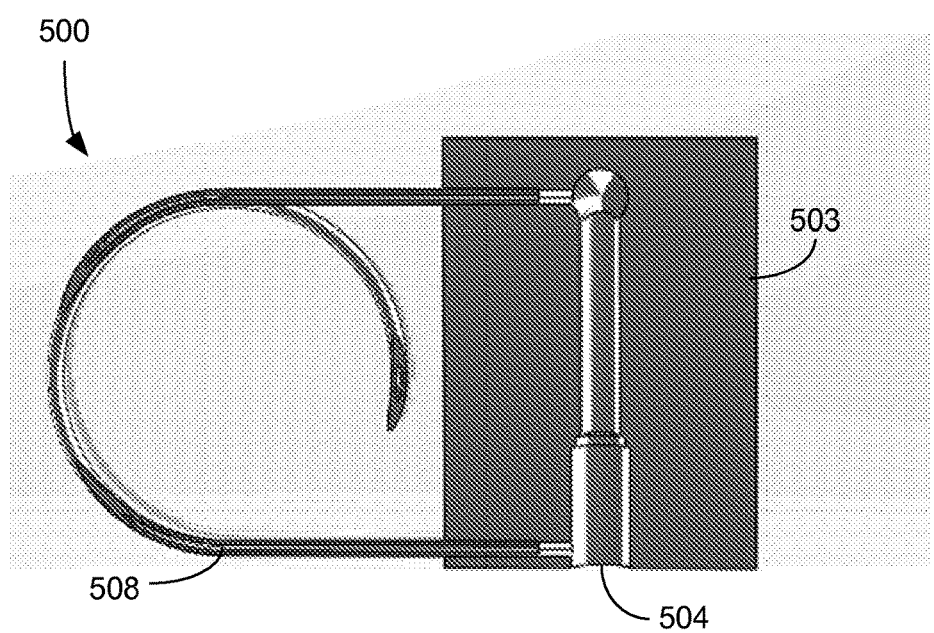
Figure 5G:
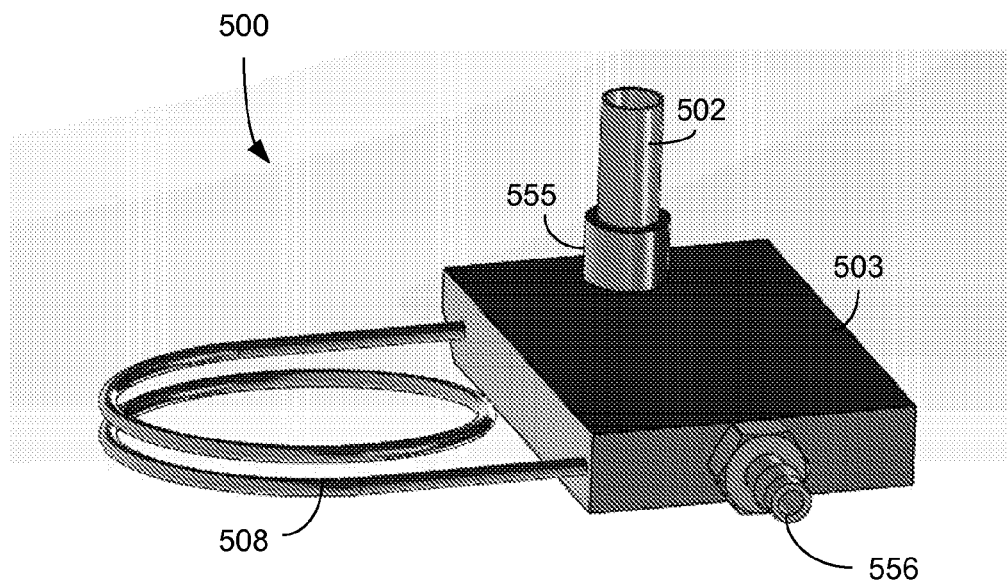
Figure 5H:
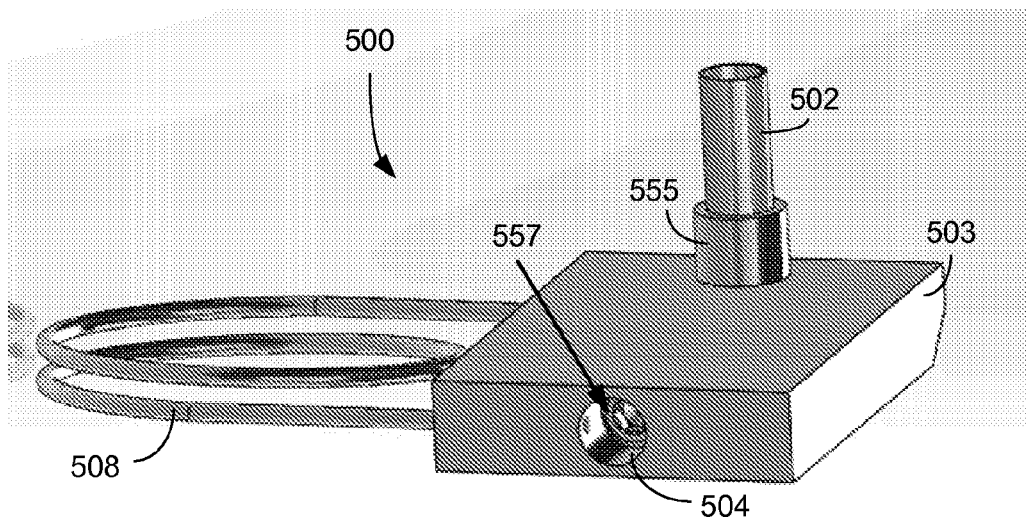

Another example of a spacer piercing pressure valve 500 is shown in FIGS. 5E-5H. FIGS. 5E, 5G, and 5H show the spacer piercing pressure valve 500 in a perspective view, while FIG. 5F shows a cross-sectional view illustrating the internal passages therein. Like the one shown in FIG. 5A, the spacer piercing pressure valve 500 of FIGS. 5E-5H includes a body 503, a vacuum port 504, a needle 502, and a capillary tube 508. As shown in FIG. 5F, the body 503 includes an internal passage that fluidically connects the hollow needle 502 to the vacuum port 504. In this embodiment, the internal passage does not include a check valve. Instead, the vacuum port 504 is adapted to hold a vacuum port block 557 (as shown in FIG. 5H) and a vacuum port adapter 556 (as shown in FIG. 5G). The vacuum port block 557 can be placed in vacuum port 504 to ensure that when the vacuum port block 557 is installed, the only fluidic path into the pocket between the pre-existing window and the new window is through the capillary tube 508. In one example, the vacuum port block may include a set screw. The set screw is turned sufficiently into its threaded hole so that the aperture connected to the capillary is unobstructed by the set screw, while the set screw blocks the large vacuum port formerly used to evacuate the pocket during installation. A check valve employs an active method of closing off communication to the pocket from the pump/interior atmosphere so that there is only communication through the capillary tube. Alternatively, a passive method could be used such as closing off the capillary tube, such as a large diameter capillary tube, with a set screw or other obstruction that is installed after the window has been evacuated. The fluid path for the capillary tube will bypass the set screw when it is in place so that there would be no fluid path through the set screw.

Also visible in FIGS. 5E, 5G, and 5H is a sealing boss 555. The sealing boss may have PIB or another similar sealant placed on it to seal against the infill spacer to make an air-tight seal. As shown in FIG. 5G, a vacuum port adaptor 556 can be included on the vacuum port 504 to facilitate hookup to vacuum tubing.

In order to use the spacer piercing pressure valve shown in FIGS. 5E-5H, it is installed through an infill spacer as described above. The vacuum port block 557 may be removed such that there is a direct fluid path through the body 503 of the spacer piercing pressure valve 500 connecting the hollow needle 502 with the vacuum port 504. This fluid path has an internal diameter that is sufficiently large to allow the pocket between the pre-existing window and the new window to be de-pressurized within a reasonable time period. In one example where only accounting for the pressure/volume/time and without consideration for the pressure drop and conductance loss, a time period for de-pressurization was approximately 0.1 sec to evacuate the window with an average vacuum pump.

Next, the vacuum port adapter 556 may be installed in the vacuum port 504. The vacuum port adapter 556 may be connected to a vacuum pump (not shown) via vacuum tubing (not shown). The vacuum pump may be turned on, and the pocket between the pre-existing window and the new window may be evacuated as described herein, either using an automated feedback system or manually. After the pocket is evacuated as desired, the vacuum port adapter 556 may be removed and the vacuum port block 557 may be replaced. Replacing the vacuum port block 557 ensures that the only fluidic path into the pocket is through the capillary tube 508.

In some embodiments, the vacuum port block 557 may be a check valve, which may remain installed (without any need to remove the check valve). In this case, the spacer piercing pressure valve may be implemented as shown in FIG. 5A. The check valve may be a low pressure (e.g., less than about 1 psi) cracking pressure check valve. Other cracking pressures may be appropriate in particular applications.

In more general terms, the capillary tube 508 may be referred to as a pressure drop path. This pressure drop path is not necessarily implemented as a tube. In various implementations, the pressure drop path may be configured to be internal to the body 503 of the spacer piercing pressure valve 500. In one example, the pressure drop path may be a long/tortuous fluid path molded or cast into place within the body 503. In another example, the pressure drop path may be shorter, with a smaller internal diameter that results in a similar pressure drop to capillary tubes commonly used for pressure equilibration of IGUs, often in the context of IGUs that are installed at altitudes about 2,500-5,000 feet higher than where they were manufactured. In another example, the pressure drop path may be implemented such that it includes two check valves, one permitting flow in either direction. In such an embodiment, the check valves may be positioned in parallel fluid paths (or parallel portions of a single overall fluid path) to ensure that air/gas can enter/exit the pocket as needed to accommodate changes in volume. In a further example, the pressure drop path may be implemented as a portion of porous media, the porous media enabling a pressure drop between the pocket and the surrounding environment. However the pressure drop path is implemented, it should be configured to achieve/maintain a significant pressure drop between (a) the pocket between the pre-existing window and the new window, and (b) the local atmospheric pressure. In one embodiment, an appropriate pressure drop is about 29 mmHg. An appropriate pressure drop is dependent upon various factors listed herein with respect to the target pressure for evacuating the pocket. For example, an appropriate pressure drop may be based on a multi-variable calculation based on one or more of properties of the insulated glass unit, properties of the capillary tube, and environmental conditions such as humidity, temperature, pressure, etc.

In certain case, the pressure drop path (e.g., capillary tube) is designed with physical parameters (e.g., with certain inner and outer diameters of the capillary tube) to restrict large particles and water from passing through and allow the IGU to equilibrate the pressure and temperature between the inside of the IGU and the external environment in an reasonable amount of time such as, for example, 48 hours. The pressure drop path is also designed with physical parameters (e.g., length of a capillary tube) that are appropriate to reduce the transport of water to the inside of the IGU, to enable pressure equilibration, and be of a manageable length to use with the installation. In the capillary tube example, the length of the capillary tube may be designed to be long enough to reduce the transport of water while being short enough to enable pressure equilibration and while having a length that is manageable for use with the IGU.

In certain implementations, the hollow needle 502 may be configured to be a non-coring needle. In this way, the hollow needle 502 may pierce the infill spacer without clogging/plugging the internal diameter of the hollow needle 502. In another implementation, a non-coring cap may be used when placing the hollow needle and then removed once the hollow needle is through the spacer.

As discussed in relation to FIG. 5B, the spacer piercing pressure valve 500 can be used to achieve a particular target pressure in the pocket between the pre-existing window and the new window. A feedback system may be used to ensure that the air is evacuated at an appropriate rate and to an appropriate extent. In some cases, the spacer piercing pressure valve may include a controller or similar component that is configured to control the application of vacuum to the pocket. In some other embodiments, this controller may be provided separately (or not at all). Such controller may also be configured to drive optical transitions on a new electrochromic or other optically switchable window, or it may lack this functionality and be provided only for the purpose of controlling the application of vacuum. Combined controller/spacer piercing pressure valves are discussed further herein.

In some embodiments, the spacer piercing pressure valve may be configured to measure the rate at which air or other gas is passing through it. In some similar embodiments, another component (e.g., vacuum pump, vacuum sensor, controller, etc.) may be used to measure this rate. In either case, once the rate at which air leaves the pocket falls to a target level, the vacuum may be discontinued. A low rate of air leaving the pocket while vacuum is applied is understood to correspond to conditions where there is a low leak rate. The spacer piercing pressure valve (or vacuum pump/controller/other component) may be configured to restart application of vacuum after a certain period. If the rate at which gas leaves the pocket is still low, a high quality seal has formed.

V. Mitigation of Thermal Shock and other Thermally Induced Stresses

Thermal shock and other thermally induced stresses can arise in a retrofitted window in several different ways. For example, thermal shock is often driven by an external condition or event that causes a high spatial and/or temporal thermal gradient in the window. In many cases, thermal shock is the result of a high thermal gradient between the center of the window and the edge of the window where it contacts a frame and/or a portion of a building in which the window is installed. Retrofitted windows as described herein may present an elevated risk of experiencing thermal shock and other thermally induced stresses due to the fact that the new windows may, in various embodiments, have an optically switchable device (e.g., electrochromic device) that may rapidly absorb solar radiation in a darkened tint state and have air/gas pockets between panes that can trap heat to a greater degree compared to other windows. Such risks may be mitigated as described herein.

The thermal shock to be avoided is a level of thermal stress (and associated thermal strain) induced by a rapid change in temperature (or a thermal gradient) sufficient to cause a monolithic glass pane or IGU pane to crack or experience other damage such as spalling, inelastic deformation, etc. As used herein, the term "thermal shock" is intended to cover all types of damaging thermal stresses or strains induced by exposure of a pane or window to thermal effects. In this context, "monolithic" glass panes include those with a single substrate or those with multiple substrates laminated together. In some cases, the damaging internal stress or strain may be caused by local changes in the thermal expansion of material volume within a glass pane. For example, if one side of a glass pane is expanding (e.g., due to high temperatures) while the other side is not, damaging thermal shock may result.

The high thermal gradient in an optically switchable window can be introduced by absorption of solar radiation. For example, a high thermal gradient can be introduced when a window goes from a low solar exposure state to a high solar exposure state. Some window coatings such as electrochromic device coatings periodically produce low-transmissivity (tinted) states that increase the absorption of solar radiation by the window. The absorbed solar radiation is rapidly converted into thermal energy, which may induce thermal shock and other thermal stresses in some cases.

One example of a situation where a high thermal gradient may induce thermal shock is exposure of a new electrochromic window to solar radiation during sunrise in a cold climate. Before sunrise, the window is typically quite cold (due to low outside temperatures and in many cases relatively low inside temperatures). As the sun rises and solar radiation begins impinging on the new electrochromic window, a controller of the electrochromic device may cause the window to transition to a relatively opaque state (or the window may already be in an opaque state). Due to the window's tinted state, it may absorb solar radiation very quickly. As a result, the center of the electrochromic window may heat rapidly, while the edges of the electrochromic window and the pre-existing window may be relatively cooler (due to their contact with an infill frame or other building component or IGU component). This center-to-edge thermal gradient can create significant internal stress and strain, which can induce thermal shock and may cause the window to break or otherwise become damaged. In addition, the electrochromic window may expand due to the high temperatures while the pre-existing window does not, which can cause damaging thermal shock. In the non-custodial case, for example, the gas in the pocket between the pre-existing and new window may be heated, thereby increasing the pressure in the pocket and the tension in the adhesive layer between the spacer and the windows. In order to avoid damage from thermal shock and other thermal stresses, a window controller may be configured to operate the electrochromic device (or other optically switchable device) in a way that mitigates the risk that thermal shock or other high thermal stresses will occur. Typically, this involves controlling the electrochromic device to reduce or avoid creation of a high thermal gradient at the window. The controller may be configured to perform two basic functions in this regard: (1) detecting or predicting a triggering condition, and (2) taking action to mitigate the risk of thermal shock or other high thermal stresses in response to the triggering condition.

Trigger conditions are conditions that if left unchecked could produce high thermal stresses and could progress to a condition that could produce thermal shock. Some trigger conditions are predicted based on an expected event that is likely to induce thermal shock, while others are conditions detected in real time at or near the window location (and do not involve prediction). Examples of trigger conditions that can be predicted include, but are not limited to, events that occur with predictable regularity (e.g., sunrise, sunset, seasonal solar variations, etc.), predicted weather changes, and shading by nearby objects (e.g., buildings, trees, overhangs, etc.). Examples of trigger conditions that can be detected include real time temperature gradients that occur spatially or temporally. Sensors (e.g., thermocouples) may be provided at different locations on a window/IGU/inside a building/outside a building/etc. to provide different temperature readings in some cases. In some embodiments, temperature at one or more location on an electrochromic device may be inferred by monitoring the current vs. voltage characteristics of the electrochromic device. Similarly, a combination of temperature at the window and transmissivity of the coating may serve as a triggering event. In one embodiment, an electrochromic window includes a photovoltaic film that may be used to directly measure the solar energy impinging on the window. For example, if the photovoltaic film were transparent and covering the electrochromic stack, a measurement of the energy generated by the photovoltaic film could be used to determine an average energy density over the surface of the window. As noted above, windows that are retrofitted to include electrochromic windows may be more susceptible to thermal shock in some cases. Further, infill windows that are installed to include both a pre-existing window and a new window experience certain issues that may not arise for more conventional windows. For example, in a non-custodial infill retrofit design, the strength of all of the panes, including the pre-existing pane, are relevant for preventing damage. As such, a controller configured to mitigate thermal shock in a window installed using such a design may include instructions that take the characteristics of the pre-existing window into account. Such characteristics include, for example, the size and thickness of the windows, the material of the windows (e.g., tempered glass vs. annealed glass vs. plastic), the construction of the windows (e.g., single vs. multi-pane), and atmospheric pressure. These characteristics may be taken into account when determining/predicting/measuring whether a trigger condition is present.

In response to a determination that a trigger condition is satisfied, a window controller (or other controller) may take certain actions to mitigate the risk that thermal shock will damage the window. Such actions can take many forms, and will generally be executed upon or shortly after detection of the triggering condition or prediction that the triggering condition is imminent. In some cases, the controller may execute an operation to mitigate the risk of thermal shock within about 30 minutes (e.g., within about 10 minutes or within about 1 minute in some cases) after detecting the trigger condition.

In one approach, the controller action involves transitioning to and/or maintaining a very high transmissivity state in the window. The transmissivity may be brought above a pre-determined threshold, for example at least about 40%, at least about 45%, or at least about 50% transmissivity. Other thresholds may be appropriate in other contexts. The predetermined threshold value may range between about 30-70% transmissivity. The transmissivity of a window is conventionally defined as the ratio of the directly transmitted light after passing through the participating medium (e.g., electrochromic window) to the amount of light that would have passed the distance occupied by the medium in a vacuum. The risk of thermal shock is reduced in a window that is relatively transparent, that is, non-tinted so as not to absorb solar radiation.

In another approach, the controller action may involve transitioning more slowly than would otherwise occur. A slower optical transition can lessen the likelihood of thermal shock damage. The slower transition may be accomplished by first transitioning the window to an intermediate optical state that has a transmissivity that is between the starting and ending optical states.

In a related approach, the controller action may involve preventing a transition that would otherwise take place. This approach may be used to override a default mode of operation for the electrochromic or other optically switchable window. The override may last for a duration that is sufficiently long to avoid a thermal shock incident.

In yet another approach, the controller action may involve thermally heating or cooling the window to avoid thermal shock. These approaches are outlined above in relation to non-custodial infill designs, though these same approaches may also be used in other cases.

In another approach, the controller action may involve transitioning the window to, or maintaining, an optical state that is relatively opaque (very low transmissivity). This approach may be useful in certain cases, for example where the temperature inside a building increases rapidly, such as during a fire.

Particular algorithms may be used in some cases to avoid damage arising from thermal shock. The algorithms may implement the techniques described above. Further information related to mitigation of thermal shock is described in U.S. patent application Ser. No. 14/352,973, filed Apr. 18, 2014, and titled "MITIGATING THERMAL SHOCK IN TINTABLE WINDOWS," which is hereby incorporated by reference in its entirety.

VI. Installation System

Various infill installation methods described herein may be facilitated through the use of an installation system/kit, which may include a number of components used during installation of new windows onto pre-existing windows, for example using the method shown in FIG. 4A. Certain embodiments herein relate to installation systems that include these components.

In one implementation, an installation system includes (a) a spacer piercing pressure valve, (b) a vacuum pump, and (c) tubing to connect the vacuum pump with the spacer piercing pressure valve. In another implementation, an installation system may further include any components used in performing the feedback method described in relation to FIG. 5B. Such additional components may include one or more vacuum regulators, vacuum sensors, other sensors (e.g., barometric pressure sensor, relative humidity sensor, and/or a temperature sensor), a detection mechanism for measuring the deflection of the panes and/or distance between the panes, a vacuum manifold, and a controller configured to control the vacuum pump down process using feedback as described herein. Any one or more of the listed components may be combined with components (a)-(c) listed above in an installation system.

In many cases, an installation system may be sold as a kit, providing a convenient avenue for retrofitting a building to include optically switchable windows. Oftentimes, the optically switchable windows will be purchased separately so that they can be size matched for particular pre-existing windows.

Other Embodiments

Although the foregoing embodiments have been described in some detail to facilitate understanding, the described embodiments are to be considered illustrative and not limiting. It will be apparent to one of ordinary skill in the art that certain changes and modifications can be practiced within the scope of the appended claims.

What is claimed is:

1. A method of installing a new window registered with a pre-existing window in a building, the method comprising:
   providing a spacer having an adhesive applied to surfaces facing the pre-existing window and the new window, the spacer positioned between the pre-existing window and the new window, the spacer being provided proximate a peripheral region of the pre-existing window and the new window, wherein a pocket is formed between the pre-existing window and the new window and is defined at its edges by the spacer;
   piercing the spacer with a tube; and
   applying vacuum to the pocket to adhere the spacer to the pre-existing window and the new window, via a vacuum pump in fluidic communication with the tube, wherein gas leaving the pocket passes through a check valve after passing through the tube, and wherein vacuum is applied until a pressure within the pocket is reduced to about a target pressure or until a deflection of a lite of the pre-existing window or the new window is at about a maximum deflection and wherein the target pressure is determined at least in part based on characteristics of the pre-existing window including at least one of an area of the pre-existing window, a thickness of the pre-existing window, and/or a material of the pre-existing window.

2. The method of claim 1, wherein the tube is a hollow needle and the new window is an optically switchable window.

3. The method of claim 2, wherein the hollow needle and check valve are provided together in a spacer piercing pressure valve, further comprising leaving the spacer piercing pressure valve to remain installed through the spacer during operation.

4. The method of claim 1, wherein the pocket is maintained at a sub-atmospheric pressure for a duration sufficient to allow the adhesive on the spacer to set.

5. The method of claim 1, wherein the method is completed without applying more than 20 psi of force outward on a face of the pre-existing window.

6. The method of claim 1, further comprising using feedback from at least one of a vacuum sensor and/or an optical detection mechanism to monitor and control application of vacuum to the pocket.

7. The method of claim 6, wherein the pre-existing window and new window each comprise one or more lites, and wherein the optical detection mechanism measures a deflection of one of the lites and/or a distance between the lites of the pre-existing window and the new window.

8. The method of claim 1, wherein the target pressure is determined at least in part based on the area of the preexisting window, the thickness of the pre-existing window, and the material of the pre-existing window.

9. The method of claim 1, wherein the target pressure is between about 50-300 Torr.

10. The method of claim 1, further comprising ceasing application of vacuum and monitoring a leakup rate.

11. The method of claim 10, wherein ceasing application of vacuum and monitoring the leakup rate are optionally performed periodically, and wherein vacuum is no longer applied after the leakup rate reaches a value that is lower than a target leakup rate.

12. The method of claim 1, further comprising monitoring a leak up rate while applying vacuum using a flow meter.

13. The method of claim 1, further comprising installing a retainer, wherein the retainer is installed without applying force on the new window.

14. The method of claim 13, wherein the retainer comprises at least a first portion and a second portion, the first and second portions extending substantially perpendicularly from one another, wherein during installation of the retainer, the first portion of the retainer is positioned proximate and parallel to a lite of the new window, and the second portion of the retainer is slid over, under, or alongside an edge of the new window, and wherein the second portion of the retainer engages with a fastening member positioned in a window frame in which the pre-existing window and new window are installed.

\* \* \* \* \*